United States Patent
McCauley et al.

(10) Patent No.: US 10,923,921 B2
(45) Date of Patent: Feb. 16, 2021

(54) WIRELESS POWER TRANSFER SYSTEMS FOR SURFACES

(71) Applicant: WiTricity Corporation, Watertown, MA (US)

(72) Inventors: Alexander P. McCauley, Sunnyvale, CA (US); Arunanshu M. Roy, Cambridge, MA (US); Noam Katz, Lincoln, RI (US); Andre B. Kurs, Chestnut Hill, MA (US); Morris P. Kesler, Bedford, MA (US)

(73) Assignee: WiTricity Corporation, Watertown, MA (US)

( * ) Notice: Subject to any disclaimer, the term of this patent is extended or adjusted under 35 U.S.C. 154(b) by 0 days.

(21) Appl. No.: 15/956,797

(22) Filed: Apr. 19, 2018

(65) Prior Publication Data
US 2018/0241221 A1    Aug. 23, 2018

Related U.S. Application Data

(63) Continuation of application No. 14/745,041, filed on Jun. 19, 2015, now Pat. No. 9,954,375.
(Continued)

(51) Int. Cl.
*H02J 50/70* (2016.01)
*H02J 50/12* (2016.01)
(Continued)

(52) U.S. Cl.
CPC .............. *H02J 5/005* (2013.01); *H01F 38/14* (2013.01); *H02J 50/12* (2016.02); *H02J 50/40* (2016.02);
(Continued)

(58) Field of Classification Search
CPC .. H02J 5/005; H02J 50/00; H02J 50/90; H02J 7/025; H02J 50/12; H02J 50/40;
(Continued)

(56) References Cited

U.S. PATENT DOCUMENTS

| | | |
|---|---|---|
| 645,576 A | 3/1900 | Tesla |
| 649,621 A | 5/1900 | Tesla |

(Continued)

FOREIGN PATENT DOCUMENTS

| | | |
|---|---|---|
| CA | 142352 | 8/1912 |
| CN | 102239633 | 11/2011 |

(Continued)

OTHER PUBLICATIONS

"Intel CTO Says Gap between Humans, Machines Will Close by 2050", *Intel News Release*, (See Intel.com/.../20080821comp.htm?iid=S . . . ) (Printed Nov. 6, 2009).
(Continued)

*Primary Examiner* — Patrick C Chen
(74) *Attorney, Agent, or Firm* — Fish & Richardson P.C.

(57) ABSTRACT

The disclosure features wireless energy transfer sources that include at least two source resonators and a power source, where: each of the at least two source resonators has a nominal impedance when a device resonator is not positioned on or near any of the at least two source resonators, the nominal impedances of each of the at least two source resonators varying by 10% or less from one another; and the at least two source resonators are configured so that during operation of the wireless energy transfer source, when a device resonator is positioned on or near a first one of the at least two source resonators: (a) the impedance of the first source resonator is reduced to a value smaller than the nominal impedances of each of the other resonators by a factor of 2 or more.

17 Claims, 35 Drawing Sheets

Related U.S. Application Data

(60) Provisional application No. 62/015,078, filed on Jun. 20, 2014.

(51) Int. Cl.
| | | |
|---|---|---|
| *H02J 50/90* | (2016.01) | |
| *H02J 5/00* | (2016.01) | |
| *H02J 50/40* | (2016.01) | |
| *H01F 38/14* | (2006.01) | |
| *H04B 5/00* | (2006.01) | |

(52) U.S. Cl.
CPC .............. *H02J 50/70* (2016.02); *H02J 50/90* (2016.02); *H04B 5/0037* (2013.01); *H04B 5/0087* (2013.01)

(58) Field of Classification Search
CPC ................ H02J 50/70; H01F 2038/143; H01F 2038/146; H04B 5/0037; H04B 5/0087
See application file for complete search history.

(56) References Cited

U.S. PATENT DOCUMENTS

| | | |
|---|---|---|
| 787,412 A | 4/1905 | Tesla |
| 1,119,732 A | 12/1914 | Tesla |
| 2,133,494 A | 10/1938 | Waters |
| 3,517,350 A | 6/1970 | Beaver |
| 3,535,543 A | 10/1970 | Dailey |
| 3,780,425 A | 12/1973 | Penn et al. |
| 3,871,176 A | 3/1975 | Schukei |
| 4,088,999 A | 5/1978 | Fletcher et al. |
| 4,095,998 A | 6/1978 | Hanson |
| 4,180,795 A | 12/1979 | Matsuda et al. |
| 4,280,129 A | 7/1981 | Wells |
| 4,450,431 A | 5/1984 | Hochstein |
| 4,588,978 A | 5/1986 | Allen |
| 5,027,709 A | 7/1991 | Slagle |
| 5,033,295 A | 7/1991 | Schmid et al. |
| 5,034,658 A | 7/1991 | Hiering et al. |
| 5,053,774 A | 10/1991 | Schuermann et al. |
| 5,070,293 A | 12/1991 | Ishii et al. |
| 5,118,997 A | 6/1992 | El-Hamamsy |
| 5,216,402 A | 6/1993 | Carosa |
| 5,229,652 A | 7/1993 | Hough |
| 5,287,112 A | 2/1994 | Schuermann |
| 5,341,083 A | 8/1994 | Klontz et al. |
| 5,367,242 A | 11/1994 | Hulman |
| 5,374,930 A | 12/1994 | Schuermann |
| 5,408,209 A | 4/1995 | Tanzer et al. |
| 5,437,057 A | 7/1995 | Richley et al. |
| 5,455,467 A | 10/1995 | Young et al. |
| 5,493,691 A | 2/1996 | Barrett |
| 5,522,856 A | 6/1996 | Reineman |
| 5,528,113 A | 6/1996 | Boys et al. |
| 5,541,604 A | 7/1996 | Meier |
| 5,550,452 A | 8/1996 | Shirai et al. |
| 5,565,763 A | 10/1996 | Arrendale et al. |
| 5,630,835 A | 5/1997 | Brownlee |
| 5,697,956 A | 12/1997 | Bornzin |
| 5,703,461 A | 12/1997 | Minoshima et al. |
| 5,703,573 A | 12/1997 | Fujimoto et al. |
| 5,710,413 A | 1/1998 | King et al. |
| 5,742,471 A | 4/1998 | Barbee, Jr. et al. |
| 5,821,728 A | 10/1998 | Sshwind |
| 5,821,731 A | 10/1998 | Kuki et al. |
| 5,864,323 A | 1/1999 | Berthon |
| 5,898,579 A | 4/1999 | Boys et al. |
| 5,903,134 A | 5/1999 | Takeuchi |
| 5,923,544 A | 7/1999 | Urano |
| 5,940,509 A | 8/1999 | Jovanovich et al. |
| 5,957,956 A | 9/1999 | Kroll et al. |
| 5,959,245 A | 9/1999 | Moe et al. |
| 5,986,895 A | 11/1999 | Stewart et al. |
| 5,993,996 A | 11/1999 | Firsich |
| 5,999,308 A | 12/1999 | Nelson et al. |
| 6,012,659 A | 1/2000 | Nakazawa et al. |
| 6,037,745 A * | 3/2000 | Koike .................. H02J 7/0029 320/104 |
| 6,047,214 A | 4/2000 | Mueller et al. |
| 6,066,163 A | 5/2000 | John |
| 6,067,473 A | 5/2000 | Greeninger et al. |
| 6,108,579 A | 8/2000 | Snell et al. |
| 6,127,799 A | 10/2000 | Krishnan |
| 6,176,433 B1 | 1/2001 | Uesaka et al. |
| 6,184,651 B1 | 2/2001 | Fernandez et al. |
| 6,207,887 B1 | 3/2001 | Bass et al. |
| 6,232,841 B1 | 5/2001 | Bartlett et al. |
| 6,238,387 B1 | 5/2001 | Miller, III |
| 6,252,762 B1 | 6/2001 | Amatucci |
| 6,436,299 B1 | 8/2002 | Baarman et al. |
| 6,450,946 B1 | 9/2002 | Forsell |
| 6,452,465 B1 | 9/2002 | Brown et al. |
| 6,459,218 B2 | 10/2002 | Boys et al. |
| 6,473,028 B1 | 10/2002 | Luc |
| 6,483,202 B1 | 11/2002 | Boys |
| 6,515,878 B1 | 2/2003 | Meins et al. |
| 6,535,133 B2 | 3/2003 | Gohara |
| 6,561,975 B1 | 5/2003 | Pool et al. |
| 6,563,425 B2 | 5/2003 | Nicholson et al. |
| 6,597,076 B2 | 7/2003 | Scheible et al. |
| 6,609,023 B1 | 8/2003 | Fischell et al. |
| 6,631,072 B1 | 10/2003 | Paul et al. |
| 6,650,227 B1 | 11/2003 | Bradin |
| 6,664,770 B1 | 12/2003 | Bartels |
| 6,673,250 B2 | 1/2004 | Kuennen et al. |
| 6,683,256 B2 | 1/2004 | Kao |
| 6,696,647 B2 | 2/2004 | Ono et al. |
| 6,703,921 B1 | 3/2004 | Wuidart et al. |
| 6,731,071 B2 | 5/2004 | Baarman |
| 6,749,119 B2 | 6/2004 | Scheible et al. |
| 6,772,011 B2 | 8/2004 | Dolgin |
| 6,798,716 B1 | 9/2004 | Charych |
| 6,803,744 B1 | 10/2004 | Sabo |
| 6,806,649 B2 | 10/2004 | Mollema et al. |
| 6,812,645 B2 | 11/2004 | Baarman |
| 6,825,620 B2 | 11/2004 | Kuennen et al. |
| 6,831,417 B2 | 12/2004 | Baarman |
| 6,839,035 B1 | 1/2005 | Addonisio et al. |
| 6,844,702 B2 | 1/2005 | Giannopoulos et al. |
| 6,856,291 B2 | 2/2005 | Mickle et al. |
| 6,858,970 B2 | 2/2005 | Malkin et al. |
| 6,906,495 B2 | 6/2005 | Cheng et al. |
| 6,917,163 B2 | 7/2005 | Baarman |
| 6,917,431 B2 | 7/2005 | Soljacic et al. |
| 6,937,130 B2 | 8/2005 | Scheible et al. |
| 6,960,968 B2 | 11/2005 | Odendaal et al. |
| 6,961,619 B2 | 11/2005 | Casey |
| 6,967,462 B1 | 11/2005 | Landis |
| 6,975,198 B2 | 12/2005 | Baarman |
| 6,988,026 B2 | 1/2006 | Breed et al. |
| 7,027,311 B2 | 4/2006 | Vanderelli et al. |
| 7,035,076 B1 | 4/2006 | Stevenson |
| 7,042,196 B2 | 5/2006 | Ka-Lai et al. |
| 7,069,064 B2 | 6/2006 | Govorgian et al. |
| 7,084,605 B2 | 8/2006 | Mickle et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,127,293 B2 | 10/2006 | MacDonald |
| 7,132,918 B2 | 11/2006 | Baarman et al. |
| 7,147,604 B1 | 12/2006 | Allen et al. |
| 7,180,248 B2 | 2/2007 | Kuennen et al. |
| 7,191,007 B2 | 3/2007 | Desai et al. |
| 7,193,418 B2 | 3/2007 | Freytag |
| D541,322 S | 4/2007 | Garrett et al. |
| 7,212,414 B2 | 5/2007 | Baarman |
| 7,233,137 B2 | 6/2007 | Nakamura et al. |
| D545,855 S | 7/2007 | Garrett et al. |
| 7,239,110 B2 | 7/2007 | Cheng et al. |
| 7,248,017 B2 | 7/2007 | Cheng et al. |
| 7,251,527 B2 | 7/2007 | Lyden |
| 7,288,918 B2 | 10/2007 | DiStefano |
| 7,340,304 B2 | 3/2008 | MacDonald |

(56) References Cited

U.S. PATENT DOCUMENTS

| | | |
|---|---|---|
| 7,375,492 B2 | 5/2008 | Calhoon et al. |
| 7,375,493 B2 | 5/2008 | Calhoon et al. |
| 7,378,817 B2 | 5/2008 | Calhoon et al. |
| 7,382,636 B2 | 6/2008 | Baarman et al. |
| 7,385,357 B2 | 6/2008 | Kuennen et al. |
| 7,443,135 B2 | 10/2008 | Cho |
| 7,462,951 B1 | 12/2008 | Baarman |
| 7,466,213 B2 | 12/2008 | Lobl et al. |
| 7,471,062 B2 | 12/2008 | Bruning |
| 7,474,058 B2 | 1/2009 | Baarman |
| 7,492,247 B2 | 2/2009 | Schmidt et al. |
| 7,514,818 B2 | 4/2009 | Abe et al. |
| 7,518,267 B2 | 4/2009 | Baarman |
| 7,521,890 B2 | 4/2009 | Lee et al. |
| 7,525,283 B2 | 4/2009 | Cheng et al. |
| 7,545,337 B2 | 6/2009 | Guenther |
| 7,554,316 B2 | 6/2009 | Stevens et al. |
| 7,599,743 B2 | 10/2009 | Hassler, Jr. et al. |
| 7,615,936 B2 | 11/2009 | Baarman et al. |
| 7,639,514 B2 | 12/2009 | Baarman |
| 7,741,734 B2 | 6/2010 | Joannopoulos et al. |
| 7,795,708 B2 | 9/2010 | Katti |
| 7,825,543 B2 | 11/2010 | Karalis et al. |
| 7,825,544 B2 | 11/2010 | Jansen et al. |
| 7,835,417 B2 | 11/2010 | Heideman et al. |
| 7,843,288 B2 | 11/2010 | Lee et al. |
| 7,844,306 B2 | 11/2010 | Shearer et al. |
| 7,863,859 B2 | 1/2011 | Soar |
| 7,880,337 B2 | 2/2011 | Farkas |
| 7,884,697 B2 | 2/2011 | Wei et al. |
| 7,885,050 B2 | 2/2011 | Lee |
| 7,919,886 B2 | 4/2011 | Tanaka |
| 7,923,870 B2 | 4/2011 | Jin |
| 7,932,798 B2 | 4/2011 | Tolle et al. |
| 7,948,209 B2 | 5/2011 | Jung |
| 7,952,322 B2 | 5/2011 | Partovi et al. |
| 7,963,941 B2 | 6/2011 | Wilk |
| 7,969,045 B2 | 6/2011 | Schmidt et al. |
| 7,994,880 B2 | 8/2011 | Chen et al. |
| 7,999,506 B1 | 8/2011 | Hollar et al. |
| 8,022,576 B2 | 9/2011 | Joannopoulos et al. |
| 8,035,255 B2 | 10/2011 | Kurs et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,106,539 B2 | 1/2012 | Schatz et al. |
| 8,115,448 B2 | 2/2012 | John |
| 8,131,378 B2 | 3/2012 | Greenberg et al. |
| 8,178,995 B2 | 5/2012 | Amano et al. |
| 8,193,769 B2 | 6/2012 | Azancot et al. |
| 8,212,414 B2 | 7/2012 | Howard et al. |
| 8,260,200 B2 | 9/2012 | Shimizu et al. |
| 8,304,935 B2 | 11/2012 | Karalis et al. |
| 8,324,759 B2 | 12/2012 | Karalis et al. |
| 8,334,620 B2 | 12/2012 | Park et al. |
| 8,362,651 B2 | 1/2013 | Hamam et al. |
| 8,395,282 B2 | 3/2013 | Joannopoulos et al. |
| 8,395,283 B2 | 3/2013 | Joannopoulos et al. |
| 8,400,017 B2 | 3/2013 | Kurs et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 8,410,636 B2 | 4/2013 | Kurs et al. |
| 8,441,154 B2 | 5/2013 | Karalis et al. |
| 8,457,547 B2 | 6/2013 | Meskens |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,461,817 B2 | 6/2013 | Martin et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,157 B2 | 7/2013 | Cook et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,552,592 B2 | 10/2013 | Schatz et al. |
| 8,569,914 B2 | 10/2013 | Karalis et al. |
| 8,587,153 B2 | 11/2013 | Schatz et al. |
| 8,587,155 B2 | 11/2013 | Giler et al. |
| 8,598,743 B2 | 12/2013 | Hall et al. |
| 8,618,696 B2 | 12/2013 | Karalis et al. |
| 8,629,578 B2 | 1/2014 | Kurs et al. |
| 8,643,326 B2 | 2/2014 | Campanella et al. |
| 2002/0032471 A1 | 3/2002 | Loftin et al. |
| 2002/0105343 A1 | 8/2002 | Scheible et al. |
| 2002/0118004 A1 | 8/2002 | Scheible et al. |
| 2002/0130642 A1 | 9/2002 | Ettes et al. |
| 2002/0167294 A1 | 11/2002 | Odaohhara |
| 2003/0038641 A1 | 2/2003 | Scheible |
| 2003/0062794 A1 | 4/2003 | Scheible et al. |
| 2003/0062980 A1 | 4/2003 | Scheible et al. |
| 2003/0071034 A1 | 4/2003 | Thompson et al. |
| 2003/0124050 A1 | 7/2003 | Yadav et al. |
| 2003/0126948 A1 | 7/2003 | Yadav et al. |
| 2003/0160590 A1 | 8/2003 | Schaefer et al. |
| 2003/0199778 A1 | 10/2003 | Mickle et al. |
| 2003/0214255 A1 | 11/2003 | Baarman et al. |
| 2004/0000974 A1 | 1/2004 | Odenaal et al. |
| 2004/0026998 A1 | 2/2004 | Henriott et al. |
| 2004/0100338 A1 | 5/2004 | Clark |
| 2004/0113847 A1 | 6/2004 | Qi et al. |
| 2004/0130425 A1 | 7/2004 | Dayan et al. |
| 2004/0130915 A1 | 7/2004 | Baarman |
| 2004/0130916 A1 | 7/2004 | Baarman |
| 2004/0142733 A1 | 7/2004 | Parise |
| 2004/0150934 A1 | 8/2004 | Baarman |
| 2004/0189246 A1 | 9/2004 | Bulai et al. |
| 2004/0201361 A1 | 10/2004 | Koh et al. |
| 2004/0222751 A1 | 11/2004 | Mollema et al. |
| 2004/0227057 A1 | 11/2004 | Tuominen et al. |
| 2004/0232845 A1 | 11/2004 | Baarman |
| 2004/0233043 A1 | 11/2004 | Yazawa et al. |
| 2004/0267501 A1 | 12/2004 | Freed et al. |
| 2005/0007067 A1 | 1/2005 | Baarman et al. |
| 2005/0021134 A1 | 1/2005 | Opie |
| 2005/0027192 A1 | 2/2005 | Govari et al. |
| 2005/0033382 A1 | 2/2005 | Single |
| 2005/0085873 A1 | 4/2005 | Gord et al. |
| 2005/0093475 A1 | 5/2005 | Kuennen et al. |
| 2005/0104064 A1 | 5/2005 | Hegarty et al. |
| 2005/0104453 A1 | 5/2005 | Vanderelli et al. |
| 2005/0116650 A1 | 6/2005 | Baarman |
| 2005/0116683 A1 | 6/2005 | Cheng et al. |
| 2005/0122058 A1 | 6/2005 | Baarman et al. |
| 2005/0122059 A1 | 6/2005 | Baarman et al. |
| 2005/0125093 A1 | 6/2005 | Kikuchi et al. |
| 2005/0127849 A1 | 6/2005 | Baarman et al. |
| 2005/0127850 A1 | 6/2005 | Baarman et al. |
| 2005/0127866 A1 | 6/2005 | Hamilton et al. |
| 2005/0135122 A1 | 6/2005 | Cheng et al. |
| 2005/0140482 A1 | 6/2005 | Cheng et al. |
| 2005/0151511 A1 | 7/2005 | Chary |
| 2005/0156560 A1 | 7/2005 | Shimaoka et al. |
| 2005/0189945 A1 | 9/2005 | Reiderman |
| 2005/0194926 A1 | 9/2005 | DiStefano |
| 2005/0253152 A1 | 11/2005 | Klimov et al. |
| 2005/0288739 A1 | 12/2005 | Hassler, Jr. et al. |
| 2005/0288740 A1 | 12/2005 | Hassler, Jr. et al. |
| 2005/0288741 A1 | 12/2005 | Hassler, Jr. et al. |
| 2005/0288742 A1 | 12/2005 | Giordano et al. |
| 2006/0001509 A1 | 1/2006 | Gibbs |
| 2006/0010902 A1 | 1/2006 | Trinh et al. |
| 2006/0022636 A1 | 2/2006 | Xian et al. |
| 2006/0053296 A1 | 3/2006 | Busboom et al. |
| 2006/0061323 A1 | 3/2006 | Cheng et al. |
| 2006/0066443 A1 | 3/2006 | Hall |
| 2006/0090956 A1 | 5/2006 | Peshkovskiy et al. |

(56) References Cited

U.S. PATENT DOCUMENTS

| | | |
|---|---|---|
| 2006/0132045 A1 | 6/2006 | Baarman |
| 2006/0164866 A1 | 7/2006 | Vanderelli et al. |
| 2006/0181242 A1 | 8/2006 | Freed et al. |
| 2006/0184209 A1 | 8/2006 | John et al. |
| 2006/0184210 A1 | 8/2006 | Singhal et al. |
| 2006/0185809 A1 | 8/2006 | Elfrink et al. |
| 2006/0199620 A1 | 9/2006 | Greene et al. |
| 2006/0202665 A1 | 9/2006 | Hsu |
| 2006/0205381 A1 | 9/2006 | Beart et al. |
| 2006/0214626 A1 | 9/2006 | Nilson et al. |
| 2006/0219448 A1 | 10/2006 | Grieve et al. |
| 2006/0238365 A1 | 10/2006 | Vecchione et al. |
| 2006/0270440 A1 | 11/2006 | Shearer et al. |
| 2006/0281435 A1 | 12/2006 | Shearer et al. |
| 2007/0010295 A1 | 1/2007 | Greene et al. |
| 2007/0013483 A1 | 1/2007 | Stewart |
| 2007/0016089 A1 | 1/2007 | Fischell et al. |
| 2007/0021140 A1 | 1/2007 | Keyes, IV et al. |
| 2007/0024246 A1 | 2/2007 | Flaugher |
| 2007/0064406 A1 | 3/2007 | Beart |
| 2007/0069687 A1 | 3/2007 | Suzuki |
| 2007/0096875 A1 | 5/2007 | Waterhouse et al. |
| 2007/0105429 A1 | 5/2007 | Kohl et al. |
| 2007/0117596 A1 | 5/2007 | Greene et al. |
| 2007/0126650 A1 | 6/2007 | Guenther |
| 2007/0145830 A1 | 6/2007 | Lee et al. |
| 2007/0164839 A1 | 7/2007 | Naito |
| 2007/0171681 A1 | 7/2007 | Baarman |
| 2007/0176840 A1 | 8/2007 | Pristas et al. |
| 2007/0178945 A1 | 8/2007 | Cook et al. |
| 2007/0182367 A1 | 8/2007 | Partovi |
| 2007/0208263 A1 | 9/2007 | John et al. |
| 2007/0222542 A1 | 9/2007 | Joannopoulos et al. |
| 2007/0257636 A1 | 11/2007 | Phillips et al. |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0036588 A1 | 2/2008 | Iverson et al. |
| 2008/0047727 A1 | 2/2008 | Sexton et al. |
| 2008/0051854 A1 | 2/2008 | Bulkes et al. |
| 2008/0067874 A1 | 3/2008 | Tseng |
| 2008/0132909 A1 | 6/2008 | Jascob et al. |
| 2008/0154331 A1 | 6/2008 | John et al. |
| 2008/0176521 A1 | 7/2008 | Singh et al. |
| 2008/0191638 A1 | 8/2008 | Kuennen et al. |
| 2008/0197710 A1 | 8/2008 | Kreitz et al. |
| 2008/0197802 A1 | 8/2008 | Onishi et al. |
| 2008/0211320 A1 | 9/2008 | Cook et al. |
| 2008/0238364 A1 | 10/2008 | Weber et al. |
| 2008/0255901 A1 | 10/2008 | Carroll et al. |
| 2008/0265684 A1 | 10/2008 | Farkas |
| 2008/0266748 A1 | 10/2008 | Lee |
| 2008/0272860 A1 | 11/2008 | Pance |
| 2008/0273242 A1 | 11/2008 | Woodgate et al. |
| 2008/0278264 A1 | 11/2008 | Karalis et al. |
| 2008/0291277 A1 | 11/2008 | Jacobsen et al. |
| 2008/0300657 A1 | 12/2008 | Stultz |
| 2008/0300660 A1 | 12/2008 | John |
| 2009/0010028 A1 | 1/2009 | Baarmen et al. |
| 2009/0015075 A1 | 1/2009 | Cook et al. |
| 2009/0033280 A1 | 2/2009 | Choi et al. |
| 2009/0033564 A1 | 2/2009 | Cook et al. |
| 2009/0038623 A1 | 2/2009 | Farbarik et al. |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0058361 A1 | 3/2009 | John |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0072782 A1 | 3/2009 | Randall |
| 2009/0079268 A1 | 3/2009 | Cook et al. |
| 2009/0079387 A1 | 3/2009 | Jin et al. |
| 2009/0085408 A1 | 4/2009 | Bruhn |
| 2009/0085706 A1 | 4/2009 | Baarman et al. |
| 2009/0096413 A1 | 4/2009 | Patovi et al. |
| 2009/0102292 A1 | 4/2009 | Cook et al. |
| 2009/0108679 A1 | 4/2009 | Porwal |
| 2009/0108997 A1 | 4/2009 | Patterson et al. |
| 2009/0115628 A1 | 5/2009 | Dicks et al. |
| 2009/0127937 A1 | 5/2009 | Widmer et al. |
| 2009/0134712 A1 | 5/2009 | Cook et al. |
| 2009/0146892 A1 | 6/2009 | Shimizu et al. |
| 2009/0153273 A1 | 6/2009 | Chen |
| 2009/0160261 A1 | 6/2009 | Elo |
| 2009/0161078 A1 | 6/2009 | Wu et al. |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0188396 A1 | 7/2009 | Hofmann et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0218884 A1 | 9/2009 | Soar |
| 2009/0224608 A1 | 9/2009 | Cook et al. |
| 2009/0224609 A1 | 9/2009 | Cook et al. |
| 2009/0224723 A1 | 9/2009 | Tanabe |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0261778 A1 | 10/2009 | Kook |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0273318 A1 | 11/2009 | Rondoni et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2009/0308933 A1 | 12/2009 | Osada |
| 2009/0322158 A1 | 12/2009 | Stevens et al. |
| 2009/0322280 A1 | 12/2009 | Kamijo et al. |
| 2010/0015918 A1 | 1/2010 | Liu et al. |
| 2010/0017249 A1 | 1/2010 | Fincham et al. |
| 2010/0033021 A1 | 2/2010 | Bennett |
| 2010/0034238 A1 | 2/2010 | Bennett |
| 2010/0036773 A1 | 2/2010 | Bennett |
| 2010/0038970 A1 | 2/2010 | Cook et al. |
| 2010/0045114 A1 | 2/2010 | Sample et al. |
| 2010/0052431 A1 | 3/2010 | Mita |
| 2010/0052811 A1 | 3/2010 | Smith et al. |
| 2010/0060077 A1 | 3/2010 | Paulus et al. |
| 2010/0065352 A1 | 3/2010 | Ichikawa |
| 2010/0066349 A1 | 3/2010 | Lin et al. |
| 2010/0076524 A1 | 3/2010 | Forsberg et al. |
| 2010/0081379 A1 | 4/2010 | Cooper et al. |
| 2010/0094381 A1 | 4/2010 | Kim et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0104031 A1 | 4/2010 | Lacour |
| 2010/0109443 A1 | 5/2010 | Cook et al. |
| 2010/0109445 A1 | 5/2010 | Kurs et al. |

(56) References Cited

U.S. PATENT DOCUMENTS

| | | |
|---|---|---|
| 2010/0109604 A1 | 5/2010 | Boys et al. |
| 2010/0115474 A1 | 5/2010 | Takada et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0123452 A1 | 5/2010 | Amano et al. |
| 2010/0123530 A1 | 5/2010 | Park et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0148723 A1 | 6/2010 | Cook et al. |
| 2010/0151808 A1 | 6/2010 | Toncich et al. |
| 2010/0156346 A1 | 6/2010 | Takada et al. |
| 2010/0156355 A1 | 6/2010 | Bauerle et al. |
| 2010/0156570 A1 | 6/2010 | Hong et al. |
| 2010/0164295 A1 | 7/2010 | Ichikawa et al. |
| 2010/0164296 A1 | 7/2010 | Kurs |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0171370 A1 | 7/2010 | Karalis et al. |
| 2010/0179384 A1 | 7/2010 | Hoeg et al. |
| 2010/0181843 A1 | 7/2010 | Schatz et al. |
| 2010/0181844 A1 | 7/2010 | Karalis et al. |
| 2010/0181845 A1 | 7/2010 | Fiorello et al. |
| 2010/0181961 A1 | 7/2010 | Novak et al. |
| 2010/0181964 A1 | 7/2010 | Huggins et al. |
| 2010/0184371 A1 | 7/2010 | Cook et al. |
| 2010/0187911 A1 | 7/2010 | Joannopoulos et al. |
| 2010/0187913 A1 | 7/2010 | Sample |
| 2010/0188183 A1 | 7/2010 | Shpiro |
| 2010/0190435 A1 | 7/2010 | Cook et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194334 A1 | 8/2010 | Kirby et al. |
| 2010/0194335 A1 | 8/2010 | Kirby et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201203 A1 | 8/2010 | Schatz et al. |
| 2010/0201204 A1 | 8/2010 | Sakoda et al. |
| 2010/0201205 A1 | 8/2010 | Karalis et al. |
| 2010/0201310 A1 | 8/2010 | Vorenkamp et al. |
| 2010/0201312 A1 | 8/2010 | Kirby et al. |
| 2010/0201313 A1 | 8/2010 | Vorenkamp et al. |
| 2010/0201316 A1 | 8/2010 | Takada et al. |
| 2010/0201513 A1 | 8/2010 | Vorenkamp et al. |
| 2010/0207458 A1 | 8/2010 | Joannopoulos et al. |
| 2010/0210233 A1 | 8/2010 | Cook et al. |
| 2010/0213770 A1 | 8/2010 | Kikuchi |
| 2010/0213895 A1 | 8/2010 | Keating et al. |
| 2010/0217553 A1 | 8/2010 | Von Novak et al. |
| 2010/0219694 A1 | 9/2010 | Kurs et al. |
| 2010/0219695 A1 | 9/2010 | Komiyama et al. |
| 2010/0219696 A1 | 9/2010 | Kojima |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225271 A1 | 9/2010 | Oyobe et al. |
| 2010/0225272 A1 | 9/2010 | Kirby et al. |
| 2010/0231053 A1 | 9/2010 | Karalis et al. |
| 2010/0231163 A1 | 9/2010 | Mashinsky |
| 2010/0231340 A1 | 9/2010 | Fiorello et al. |
| 2010/0234922 A1 | 9/2010 | Forsell |
| 2010/0235006 A1 | 9/2010 | Brown |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0237709 A1 | 9/2010 | Hall et al. |
| 2010/0244576 A1 | 9/2010 | Hillan et al. |
| 2010/0244577 A1 | 9/2010 | Shimokawa |
| 2010/0244578 A1 | 9/2010 | Yoshikawa |
| 2010/0244579 A1 | 9/2010 | Sogabe et al. |
| 2010/0244580 A1 | 9/2010 | Uchida et al. |
| 2010/0244581 A1 | 9/2010 | Uchida |
| 2010/0244582 A1 | 9/2010 | Yoshikawa |
| 2010/0244583 A1 | 9/2010 | Shimokawa |
| 2010/0244767 A1 | 9/2010 | Turner et al. |
| 2010/0244839 A1 | 9/2010 | Yoshikawa |
| 2010/0248622 A1 | 9/2010 | Kirby et al. |
| 2010/0253152 A1 | 10/2010 | Karalis et al. |
| 2010/0253281 A1 | 10/2010 | Li |
| 2010/0256481 A1 | 10/2010 | Mareci et al. |
| 2010/0256831 A1 | 10/2010 | Abramo et al. |
| 2010/0259108 A1 | 10/2010 | Giler et al. |
| 2010/0259109 A1 | 10/2010 | Sato |
| 2010/0259110 A1 | 10/2010 | Kurs et al. |
| 2010/0264745 A1 | 10/2010 | Karalis et al. |
| 2010/0264746 A1 | 10/2010 | Kazama et al. |
| 2010/0264747 A1 | 10/2010 | Hall et al. |
| 2010/0276995 A1 | 11/2010 | Marzetta et al. |
| 2010/0277003 A1 | 11/2010 | Von Novak et al. |
| 2010/0277004 A1 | 11/2010 | Suzuki et al. |
| 2010/0277005 A1 | 11/2010 | Karalis et al. |
| 2010/0277120 A1 | 11/2010 | Cook et al. |
| 2010/0277121 A1 | 11/2010 | Hall et al. |
| 2010/0289341 A1 | 11/2010 | Ozaki et al. |
| 2010/0289449 A1 | 11/2010 | Elo |
| 2010/0295505 A1 | 11/2010 | Jung et al. |
| 2010/0295506 A1 | 11/2010 | Ichikawa |
| 2010/0308939 A1 | 12/2010 | Kurs |
| 2010/0314946 A1 | 12/2010 | Budde et al. |
| 2010/0327660 A1 | 12/2010 | Karalis et al. |
| 2010/0327661 A1 | 12/2010 | Karalis et al. |
| 2010/0328044 A1 | 12/2010 | Waffenschmidt et al. |
| 2011/0004269 A1 | 1/2011 | Strother et al. |
| 2011/0012431 A1 | 1/2011 | Karalis et al. |
| 2011/0018361 A1 | 1/2011 | Karalis et al. |
| 2011/0025131 A1 | 2/2011 | Karalis et al. |
| 2011/0031928 A1 | 2/2011 | Soar |
| 2011/0043046 A1 | 2/2011 | Joannopoulos et al. |
| 2011/0043047 A1 | 2/2011 | Karalis et al. |
| 2011/0043048 A1 | 2/2011 | Karalis et al. |
| 2011/0043049 A1 | 2/2011 | Karalis et al. |
| 2011/0049995 A1 | 3/2011 | Hashiguchi |
| 2011/0049996 A1 | 3/2011 | Karalis et al. |
| 2011/0049998 A1 | 3/2011 | Karalis et al. |
| 2011/0074218 A1 | 3/2011 | Karalis et al. |
| 2011/0074346 A1 | 3/2011 | Hall et al. |
| 2011/0074347 A1 | 3/2011 | Karalis et al. |
| 2011/0089895 A1 | 4/2011 | Karalis et al. |
| 2011/0095618 A1 | 4/2011 | Schatz et al. |
| 2011/0115303 A1 | 5/2011 | Baarman et al. |
| 2011/0115431 A1 | 5/2011 | Dunworth et al. |
| 2011/0121920 A1 | 5/2011 | Kurs et al. |
| 2011/0128015 A1 | 6/2011 | Dorairaj et al. |
| 2011/0140544 A1 | 6/2011 | Karalis et al. |
| 2011/0148219 A1 | 6/2011 | Karalis et al. |
| 2011/0162895 A1 | 7/2011 | Karalis et al. |
| 2011/0169339 A1 | 7/2011 | Karalis et al. |
| 2011/0181122 A1 | 7/2011 | Karalis et al. |
| 2011/0193416 A1 | 8/2011 | Campanella et al. |
| 2011/0193419 A1 | 8/2011 | Karalis et al. |
| 2011/0198939 A1 | 8/2011 | Karalis et al. |
| 2011/0215086 A1 | 9/2011 | Yeh |
| 2011/0221278 A1 | 9/2011 | Karalis et al. |
| 2011/0227528 A1 | 9/2011 | Karalis et al. |
| 2011/0227530 A1 | 9/2011 | Karalis et al. |
| 2011/0241618 A1 | 10/2011 | Karalis et al. |
| 2011/0248573 A1 | 10/2011 | Kanno et al. |
| 2011/0254377 A1 | 10/2011 | Wildmer et al. |
| 2011/0254503 A1 | 10/2011 | Widmer et al. |
| 2011/0266878 A9 | 11/2011 | Cook et al. |

(56) References Cited

U.S. PATENT DOCUMENTS

| | | |
|---|---|---|
| 2011/0278943 A1 | 11/2011 | Eckhoff et al. |
| 2012/0001492 A9 | 1/2012 | Cook et al. |
| 2012/0001593 A1 | 1/2012 | DiGuardo |
| 2012/0007435 A1 | 1/2012 | Sada et al. |
| 2012/0007441 A1 | 1/2012 | John et al. |
| 2012/0025602 A1 | 2/2012 | Boys et al. |
| 2012/0032522 A1 | 2/2012 | Schatz et al. |
| 2012/0038525 A1 | 2/2012 | Monsalve Carcelen et al. |
| 2012/0062345 A1 | 3/2012 | Kurs et al. |
| 2012/0068549 A1 | 3/2012 | Karalis et al. |
| 2012/0086284 A1 | 4/2012 | Campanella et al. |
| 2012/0086867 A1 | 4/2012 | Kesler et al. |
| 2012/0091794 A1 | 4/2012 | Campanella et al. |
| 2012/0091795 A1 | 4/2012 | Fiorello et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0091950 A1 | 4/2012 | Campanella et al. |
| 2012/0098350 A1 | 4/2012 | Campanella et al. |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0139355 A1 | 6/2012 | Ganem et al. |
| 2012/0146575 A1 | 6/2012 | Armstrong et al. |
| 2012/0153732 A1 | 6/2012 | Kurs et al. |
| 2012/0153733 A1 | 6/2012 | Schatz et al. |
| 2012/0153734 A1 | 6/2012 | Kurs et al. |
| 2012/0153735 A1 | 6/2012 | Karalis et al. |
| 2012/0153736 A1 | 6/2012 | Karalis et al. |
| 2012/0153737 A1 | 6/2012 | Karalis et al. |
| 2012/0153738 A1 | 6/2012 | Karalis et al. |
| 2012/0153893 A1 | 6/2012 | Schatz et al. |
| 2012/0184338 A1 | 7/2012 | Kesler et al. |
| 2012/0206096 A1 | 8/2012 | John |
| 2012/0223573 A1 | 9/2012 | Schatz et al. |
| 2012/0228952 A1 | 9/2012 | Hall et al. |
| 2012/0228953 A1 | 9/2012 | Kesler et al. |
| 2012/0228954 A1 | 9/2012 | Kesler et al. |
| 2012/0235500 A1 | 9/2012 | Ganem et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235504 A1 | 9/2012 | Kesler et al. |
| 2012/0235505 A1 | 9/2012 | Schatz et al. |
| 2012/0235566 A1 | 9/2012 | Karalis et al. |
| 2012/0235567 A1 | 9/2012 | Karalis et al. |
| 2012/0235633 A1 | 9/2012 | Kesler et al. |
| 2012/0235634 A1 | 9/2012 | Hall et al. |
| 2012/0239117 A1 | 9/2012 | Kesler et al. |
| 2012/0242159 A1 | 9/2012 | Lou et al. |
| 2012/0242225 A1 | 9/2012 | Karalis et al. |
| 2012/0248884 A1 | 10/2012 | Karalis et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0256494 A1 | 10/2012 | Kesler et al. |
| 2012/0267960 A1 | 10/2012 | Low et al. |
| 2012/0280765 A1 | 11/2012 | Kurs et al. |
| 2012/0313449 A1 | 12/2012 | Kurs et al. |
| 2012/0313682 A1* | 12/2012 | Sprentall .................. H03K 7/08 327/172 |
| 2012/0313742 A1 | 12/2012 | Kurs et al. |
| 2013/0007949 A1 | 1/2013 | Kurs et al. |
| 2013/0020878 A1 | 1/2013 | Karalis et al. |
| 2013/0033118 A1 | 2/2013 | Karalis et al. |
| 2013/0038402 A1 | 2/2013 | Karalis et al. |
| 2013/0057364 A1 | 3/2013 | Kesler et al. |
| 2013/0062966 A1 | 3/2013 | Verghese et al. |
| 2013/0069441 A1 | 3/2013 | Verghese et al. |
| 2013/0069753 A1 | 3/2013 | Kurs et al. |
| 2013/0099587 A1* | 4/2013 | Lou .......................... H02S 40/30 307/104 |
| 2013/0154383 A1 | 6/2013 | Kasturi et al. |
| 2013/0154389 A1 | 6/2013 | Kurs et al. |
| 2013/0159956 A1 | 6/2013 | Verghese et al. |
| 2013/0175874 A1 | 7/2013 | Lou et al. |
| 2013/0175875 A1 | 7/2013 | Kurs et al. |
| 2013/0200716 A1 | 8/2013 | Kesler et al. |
| 2013/0200721 A1 | 8/2013 | Kurs et al. |
| 2013/0221744 A1 | 8/2013 | Hall et al. |
| 2013/0278073 A1 | 10/2013 | Kurs et al. |
| 2013/0278074 A1 | 10/2013 | Kurs et al. |
| 2013/0278075 A1 | 10/2013 | Kurs et al. |
| 2013/0300353 A1 | 11/2013 | Kurs et al. |
| 2013/0307349 A1 | 11/2013 | Hall et al. |
| 2013/0320773 A1 | 12/2013 | Schatz et al. |
| 2013/0334892 A1 | 12/2013 | Hall et al. |
| 2014/0002012 A1 | 1/2014 | McCauley et al. |
| 2014/0070622 A1 | 3/2014 | Keeling et al. |
| 2014/0070764 A1 | 3/2014 | Keeling |
| 2014/0197694 A1 | 7/2014 | Asanuma et al. |
| 2015/0121101 A1* | 4/2015 | Kim .......................... G06F 1/26 713/320 |
| 2015/0372495 A1 | 12/2015 | McCauley et al. |

FOREIGN PATENT DOCUMENTS

| | | |
|---|---|---|
| CN | 102439669 | 5/2012 |
| CN | 103329397 | 9/2013 |
| DE | 38 24 972 | 1/1989 |
| DE | 100 29147 | 12/2001 |
| DE | 200 16 655 | 3/2002 |
| DE | 102 21 484 | 11/2003 |
| DE | 103 04 584 | 8/2004 |
| DE | 10 2005 03629 | 2/2007 |
| DE | 10 2006 04405 | 4/2008 |
| EP | 1 335 477 | 8/2003 |
| EP | 1 521 206 | 4/2005 |
| EP | 1 524 010 | 4/2005 |
| EP | 2 357 716 | 8/2011 |
| EP | 2 660 948 A2 | 11/2013 |
| JP | 02-097005 | 4/1990 |
| JP | 4-265875 | 9/1992 |
| JP | 6-341410 | 12/1994 |
| JP | 9-182323 | 7/1997 |
| JP | 9-298847 | 11/1997 |
| JP | 10-164837 | 6/1998 |
| JP | 11-75329 | 3/1999 |
| JP | 11-188113 | 7/1999 |
| JP | 2001-309580 | 11/2001 |
| JP | 2002-010535 | 1/2002 |
| JP | 2003-179526 | 6/2003 |
| JP | 2004-166459 | 6/2004 |
| JP | 2004-201458 | 7/2004 |
| JP | 2004-229144 | 8/2004 |
| JP | 2005-57444 | 3/2005 |
| JP | 2005-149238 | 6/2005 |
| JP | 2006-074848 | 3/2006 |
| JP | 2007-505480 | 3/2007 |
| JP | 2007-266892 | 10/2007 |
| JP | 2007-537637 | 12/2007 |
| JP | 2008-508842 | 3/2008 |
| JP | 2008-206231 | 9/2008 |
| JP | 2008-206327 | 9/2008 |
| JP | 2011-072074 | 4/2011 |
| JP | 2012-504387 | 2/2012 |
| JP | 2013-543718 | 12/2013 |
| KR | 10-2007-0017804 | 2/2007 |
| KR | 10-2008-0007635 | 1/2008 |
| KR | 10-2009-0122072 | 11/2009 |
| KR | 10-2011-0050920 | 5/2011 |
| SG | 112842 | 7/2005 |
| WO | WO 92/17929 | 10/1992 |

(56) References Cited

FOREIGN PATENT DOCUMENTS

| | | |
|---|---|---|
| WO | WO 93/23908 | 11/1993 |
| WO | WO 94/28560 | 12/1994 |
| WO | WO 95/11545 | 4/1995 |
| WO | WO 96/02970 | 2/1996 |
| WO | WO 98/50993 | 11/1998 |
| WO | WO 00/77910 | 12/2000 |
| WO | WO 03/092329 | 11/2003 |
| WO | WO 03/096361 | 11/2003 |
| WO | WO 03/096512 | 11/2003 |
| WO | WO 2004/015885 | 2/2004 |
| WO | WO 2004/038888 | 5/2004 |
| WO | WO 2004/055654 | 7/2004 |
| WO | WO 2004/073150 | 8/2004 |
| WO | WO 2004/073166 | 8/2004 |
| WO | WO 2004/073176 | 8/2004 |
| WO | WO 2004/073177 | 8/2004 |
| WO | WO 2004/112216 | 12/2004 |
| WO | WO 2005/024865 | 3/2005 |
| WO | WO 2005/060068 | 6/2005 |
| WO | WO 2005/109597 | 11/2005 |
| WO | WO 2005/109598 | 11/2005 |
| WO | WO 2006/011769 | 2/2006 |
| WO | WO 2007/008646 | 1/2007 |
| WO | WO 2007/020583 | 2/2007 |
| WO | WO 2007/042952 | 4/2007 |
| WO | WO 2007/084716 | 7/2007 |
| WO | WO 2007/084717 | 7/2007 |
| WO | WO 2008/109489 | 9/2008 |
| WO | WO 2008/118178 | 10/2008 |
| WO | WO 2009/009559 | 1/2009 |
| WO | WO 2009/018568 | 2/2009 |
| WO | WO 2009/023155 | 2/2009 |
| WO | WO 2009/023646 | 2/2009 |
| WO | WO 2009/033043 | 3/2009 |
| WO | WO 2009/062438 | 5/2009 |
| WO | WO 2009/070730 | 6/2009 |
| WO | WO 2009/126963 | 10/2009 |
| WO | WO 2009/140506 | 11/2009 |
| WO | WO 2009/149464 | 12/2009 |
| WO | WO 2009/155000 | 12/2009 |
| WO | WO 2010/030977 | 3/2010 |
| WO | WO 2010/036980 | 4/2010 |
| WO | WO 2010/039967 | 4/2010 |
| WO | WO 2010/090538 | 8/2010 |
| WO | WO 2010/090539 | 8/2010 |
| WO | WO 2010/093997 | 8/2010 |
| WO | WO 2010/104569 | 9/2010 |
| WO | WO 2011/061388 | 5/2011 |
| WO | WO 2011/061821 | 5/2011 |
| WO | WO 2011/062827 | 5/2011 |
| WO | WO 2011/112795 | 9/2011 |
| WO | WO 2012/037279 | 3/2012 |
| WO | WO 2012/170278 | 12/2012 |
| WO | WO 2013/013235 | 1/2013 |
| WO | WO 2013/020138 | 2/2013 |
| WO | WO 2013/036947 | 3/2013 |
| WO | WO 2013/059441 | 4/2013 |
| WO | WO 2013/067484 | 5/2013 |
| WO | WO 2013/113017 | 8/2013 |
| WO | WO 2013/142840 | 9/2013 |
| WO | WO 2013/179639 | 12/2013 |
| WO | WO 2014/004843 | 1/2014 |

OTHER PUBLICATIONS

"Physics Update, Unwired Energy", *Physics Today*, pp. 26, (Jan. 2007) (See http://arxiv.org/abs/physics/0611063.).
"In pictures: A year in technology", *BBC News*, (Dec. 28, 2007).
"Next Little Thing 2010 Electricity without wires", CNN Money (See money.cnn.com/galleries/2009/smallbusiness/0911/gallery.next_little_thing_2010.smb/) (dated Nov. 30, 2009).
Abe et al. "A Noncontact Charger Using a Resonant Converter with Parallel Capacitor of the Secondary Coil". IEEE, 36(2):444-451, Mar./Apr. 2000.
Ahmadian, M. et al., "Miniature Transmitter for Implantable Micro Systems", *Proceedings of the 25th Annual International Conference of the IEEE EMBS Cancun, Mexico*, pp. 3028-3031 (Sep. 17-21, 2003).
Aoki, T. et al., "Observation of strong coupling between one atom and a monolithic microresonator", Nature, vol. 443:671-674 (2006).
Apneseth et al. "Introducing wireless proximity switches" ABB Review Apr. 2002.
Aristeidis Karalis et al., "Efficient Wireless *non-radiative mid-range* energy transfer", *Annals of Physics*, vol. 323, pp. 34-48 (2008).
Baker et al., "Feedback Analysis and Design of RF Power Links for Low-Power Bionic Systems," *IEEE Transactions on Biomedical Circuits and Systems*, vol. 1(1):28-38 (Mar. 2007).
Balanis, C.A., "Antenna Theory: Analysis and Design," 3rd Edition, Sections 4.2, 4.3, 5.2, 5.3 (Wiley, New Jersey, 2005).
Berardelli, P., "Outlets Are Out", ScienceNOW Daily News, Science Now, http://sciencenow.sciencemag.org/ cgi/content/full/2006/1114/2, (Nov. 14, 2006) 2 pages.
Biever, C., "Evanescent coupling' could power gadgets wirelessly", NewScientistsTech.com, http://www. newscientisttech.com/article.ns?id=dnl 0575&print=true, (Nov. 15, 2006) 2 pages.
Borenstein, S., "Man tries wirelessly boosting batteries", (The Associated Press), USA Today, (Nov. 16, 2006) 1 page.
Borenstein, S., "Man tries wirelessly boosting batteries", AP Science Writer, Boston.com, (See http://www.boston.com/business/technology/articles/2006/11/15/man_tries_wirelessly_b . . . ) (Nov. 15, 2006).
Boyle, A., "Electro-nirvana? Not so fast", MSNBC, http:/lcosmiclog.msnbc.msn.com/_news/2007/06/08/4350760- electro-nirvana-not-so-fast, (Jun. 8, 2007) 1 page.
Budhia, M. et al., "A New IPT Magnetic Coupler for Electric Vehicle Charging Systems", IECON 2010—36th Annual Conference on IEEE Industrial Electronics Society, Glendale, AZ, pp. 2487-2492 (Nov. 7-10, 2010).
Budhia, M. et al., "Development and evaluation of single sided flux couplers for contactless electric vehicle charging", 2011 IEEE Energy Conversion Congress and Exposition (ECCE), Phoenix, AZ, pp. 614-621 (Sep. 17-22, 2011).
Budhia, M. et al.,"Development of a Single-Sided Flux Magnetic Coupler for Electric Vehicle IPT", *IEEE Transactions on Industrial Electronics*, vol. 60:318-328 (Jan. 2013).
Bulkeley, W. M., "MIT Scientists Pave the Way for Wireless Battery Charging", The Wall Street Journal (See http://online.wsj.com/article/SB118123955549228045.html?mod=googlenews_wsj), (Jun. 8, 2007) 2 pages.
Burri et al., "Invention Description", (Feb. 5, 2008).
Cass, S., "Air Power—Wireless data connections are common—now scientists are working on wireless power", Sponsored by IEEE Spectrum, http://spectrum.ieee.org/computing/hardware/air-power, (Nov. 2006) 2 pages.
Castelvecchi, Davide, "The Power of Induction—Cutting the last cord could resonate with our increasingly gadget dependent lives", *Science News Online*, vol. 172, No. 3, Jul. 21, 2007, 6 pages.
Chang, A., "Recharging the Wireless Way—Even physicists forget to recharge their cell phones sometimes.", PC Magazine, ABC News Internet Ventures, (Dec. 12, 2006) 1 page.
CHINAVIEW"Scientists light bulb with 'wireless electricity'",www.Chinaview.cn, http://news.xinhuanet.com/english/2007-06/08/content_6215681.htm,Jun. 2007,1 page.
Cooks, G., "The vision of an MIT physicist: Getting rid of pesky rechargers", Boston.com, (Dec. 11, 2006) 1 page.
Derbyshire, D., "The end of the plug? Scientists invent wireless device that beams electricity through your home", Daily Mail, http://www.dailymail.co.uk/pages/live/articles/technology/technology.html?in_article_id=4 . . . ), (Jun. 7, 2007) 3 pages.
Eisenberg, Anne, "Automatic Recharging, From a Distance", The New York Times, (see www.nytimes.com/2012/03/11/business/built-in-wireless-chargeing-for-electronic-devices.html?_r=0) (published on Mar. 10, 2012).
Esser et al., "A New Approach to Power Supplies for Robots", IEEE, vol. 27(5):872-875, (Sep./Oct. 1991).

(56) References Cited

OTHER PUBLICATIONS

Fan, Shanhui et al., "Rate-Equation Analysis of Output Efficiency and Modulation Rate of Photomic-Crystal Light-Emitting Diodes", IEEE Journal of Quantum Electronics, vol. 36(10):1123-1130 (Oct. 2000).
Fenske et al., "Dielectric Materials at Microwave Frequencies", Applied Microwave & Wireless, pp. 92-100 (2000).
Fernandez, C. et al., "A simple dc-dc converter for the power supply of a cochlear implant", *IEEE*, pp. 1965-1970 (2003).
Ferris, David, "How Wireless Charging Will Make Life Simpler (and Greener)", Forbes (See forbes.com/sites/davidferris/2012/07/24/how-wireless-charging-will-make-life-simpler-and-greener/print/) (dated Jul. 24, 2012).
Fildes, J., "Physics Promises Wireless Power", (Science and Technology Reporter), BBC News, (Nov. 15, 2006) 3 pages.
Fildes, J., "The technology with impact 2007", BBC News, (Dec. 27, 2007) 3 pages.
Fildes, J., "Wireless energy promise powers up", BBC News, http://news.bbc.co.uk/2/hi/technology/6725955.stm, (Jun. 7, 2007) 3 pages.
Finkenzeller, Klaus, "RFID Handbook—Fundamentals and Applications in Contactless Smart Cards", Nikkan Kohgyo-sya, Kanno Taihei, first version, pp. 32-37, 253 (Aug. 21, 2001).
Finkenzeller, Klaus, "RFID Handbook (2nd Edition)", The Nikkan Kogyo Shimbun, Ltd., pp. 19, 20, 38, 39, 43, 44, 62, 63, 67, 68, 87, 88, 291, 292 (Published on May 31, 2004).
Freedman, D.H., "Power on a Chip", MIT Technology Review, (Nov. 2004).
Gary Peterson, "MIT WiTricity Not So Original After All", *Feed Line No. 9*, (See http://www.tfcbooks.com/articles/witricity.htm) printed Nov. 12, 2009.
Geyi, Wen, "A Method for the Evaluation of Small Antenna Q", IEEE Transactions on Antennas and Propagation, vol. 51(8):2124-2129 (Aug. 2003).
Hadley, F., "Goodbye Wires—Mit Team Experimentally Demonstrates Wireless Power Transfer, Potentially Useful for Power Laptops, Cell-Phones Without Cords", Massachusetts Institute of Technology, Institute for Soldier D Nanotechnologies, http://web.mit.edu/newsoffice/2007/wireless-0607.html, (Jun. 7, 2007) 3 pages.
Haus, H.A., "Waves and Fields in Optoelectronics," Chapter 7 "Coupling of Modes—Reasonators and Couplers" (Prentice-Hall, New Jersey, 1984).
Heikkinen et al., "Performance and Efficiency of Planar Rectennas for Short-Range Wireless Power Transfer at 2.45 GHz", Microwave and Optical Technology Letters, vol. 31(2):86-91, (Oct. 20, 2001).
Highfield, R., "Wireless revolution could spell end of plugs",(Science Editor), Telegraph.co.uk, http://www.telegraph.co.uk/news/main.jhtml?xml=/news/2007/06/07/nwireless1 07.xml, (Jun. 7, 2007) 3 pages.
Hirai et al., "Integral Motor with Driver and Wireless Transmission of Power and Information for Autonomous Subspindle Drive", IEEE, vol. 15(1):13-20, (Jan. 2000).
Hirai et al., "Practical Study on Wireless Transmission of Power and Information for Autonomous Decentralized Manufacturing System", IEEE, vol. 46(2):349-359, Apr. 1999.
Hirai et al., "Study on Intelligent Battery Charging Using Inductive Transmission of Power and Information", IEEE, vol. 15(2):335-345, (Mar. 2000).
Hirai et al., "Wireless Transmission of Power and Information and Information for Cableless Linear Motor Drive", IEEE, vol. 15(1):21-27, (Jan. 2000).
Hirayama, M., "Splashpower—World Leaders in Wireless Power", PowerPoint presentation, Splashpower Japan, (Sep. 3, 2007) 30 pages.
Ho, S. L. et al., "A Comparative Study Between Novel Witricity and Traditional Inductive Magnetic Coupling in Wireless Charging", IEEE Transactions on Magnetics, vol. 47(5):1522-1525 (May 2011).
Infotech Online, "Recharging gadgets without cables", infotech.indiatimes.com, (Nov. 17, 2006) 1 page.
Jackson, J. D., "Classical Electrodynamics", 3rd Edition, Wiley, New York, 1999, pp. 201-203.
Jackson, J.D., "Classical Electrodynamics," 3rd Edition, Sections 1.11, 5.5, 5.17, 6.9, 8.1, 8.8, 9.2, 9.3 (Wiley, New York, 1999).
Jacob, M. V. et al., "Lithium Tantalate—A High Permittivity Dielectric Material for Microwave Communication Systems", *Proceedings of IEEE TENCON—Poster Papers*, pp. 1362-1366, 2003.
Karalis, Aristeidis, "Electricity Unplugged", Feature: Wireless Energy Physics World, physicsworld.com, pp. 23-25 (Feb. 2009).
Kawamura et al., "Wireless Transmission of Power and Information Through One High-Frequency Resonant AC Link Inverter for Robot Manipulator Applications", IEEE, vol. 32(3):503-508, (May/Jun. 1996).
Kurs, A. et al., "Wireless Power Transfer via Strongly Coupled Magnetic Resonances", *Science* vol. 317, pp. 83-86 (Jul. 6, 2007).
Kurs, A. et al., "Simultaneous mid-range power transfer to multiple devices", *Applied Physics Letters*, vol. 96, No. 044102 (2010).
Kurs, A. et al.,"Optimized design of a low-resistance electrical conductor for the multimegahertz range", *Applied Physics Letters*, vol. 98:172504-172504-3 (Apr. 2011).
Lamb, Gregory M. ,"Look Ma—no wires!—Electricity broadcast through the air may someday run your home",The Christian Science Monitor,http://www.csmonitor.com/2006/1116/p14s01-stct.html,Nov. 15, 2006,2 pages.
Lee, "Antenna Circuit Design for RFID Applications," Microchip Technology Inc., AN710, 50 pages (2003).
Lee, "RFID Coil Design," Microchip Technology Inc., AN678, 21 pages (1998).
Liang et al., "Silicon waveguide two-photon absorption detector at 1.5 µm wavelength for autocorrelation measurements," Applied Physics Letters, 81(7):1323-1325 (Aug. 12, 2002).
Markoff, J. ,"Intel Moves to Free Gadgets of Their Recharging Cords", The New York Times—nytimes.com, Aug. 21, 2008, 2 pages.
Mediano, A. et al. "Design of class E amplifier with nonlinear and linear shunt capacitances for any duty cycle", IEEE Trans. Microwave Theor. Tech., vol. 55, No. 3, pp. 484-492, (2007).
Microchip Technology Inc., "microID 13.56 MHz Design Guide—MCRF355/360 Reader Reference Design," 24 pages (2001).
Minkel, J R. ,"Wireless Energy Lights Bulb from Seven Feet Away—Physicists vow to cut the cord between your laptop battery and the wall socket—with just a simple loop of wire",Scientific American,http://www.scientificamerican.com/article.cfm?id=wireless-energy-lights-bulb-from-seven-feet-away,Jun. 7, 2007,1 page.
Minkel, J R. ,"Wireless Energy Transfer May Power Devices at a Distance",Scientific American,Nov. 14, 2006,1 page.
Morgan, J., "Lab report: Pull the plug for a positive charge", The Herald, Web Issue 2680, (Nov. 16, 2006) 3 pages.
Moskvitch, Katia, "Wireless charging—the future for electric cars?", BBC News Technology (See www.bbc.co.uk/news/technology-14183409) (dated Jul. 21, 2011).
O'Brien et al., "Analysis of Wireless Power Supplies for Industrial Automation Systems", IEEE, pp. 367-372 (Nov. 2-6, 2003).
O'Brien et al., "Design of Large Air-Gap Transformers for Wireless Power Supplies", IEEE, pp. 1557-1562 (Jun. 15-19, 2003).
Pendry, J. B., "A Chiral Route to Negative Refraction", Science, vol. 306:1353-1355 (2004).
Physics Today, "Unwired energy questions asked answered", Sep. 2007, pp. 16-17.
Powercast LLC. "White Paper" Powercast simply wire free, 2003.
PR News Wire, "The Big Story for CES 2007: The public debut of eCoupled Intelligent Wireless Power", Press Release, Fulton Innovation LLC, Las Vegas, NV, (Dec. 27, 2006) 3 pages.
Press Release, ,"The world's first sheet-type wireless power transmission system: Will a socket be replaced by e-wall?",Public Relations Office, School of Engineering, University of Tokyo, Japan,Dec. 12, 2006,4 pages.
PRESSTV, "Wireless power transfer possible", http://edition.presstv.ir/detail/12754.html, Jun. 11, 2007, 1 page.
Reidy, C. (Globe Staff), "MIT discovery could unplug your iPod forever", Boston.com, http://www.boston.com/business/ticker/2007/06/mit_discovery_c.html, (Jun. 7, 2007) 3 pages.

(56) References Cited

OTHER PUBLICATIONS

Risen, C., "Wireless Energy", The New York Times, (Dec. 9, 2007) 1 page.
Sakamoto et al., "A Novel Circuit for Non-Contact Charging Through Electro-Magnetic Coupling", IEEE, pp. 168-174 (1992).
Scheible, G. et al., "Novel Wireless Power Supply System for Wireless Communication Devices in Industrial Automation Systems", IEEE, pp. 1358-1363, (Nov. 5-8, 2002).
Schneider, D. "A Critical Look at Wireless Power", *IEEE Spectrum*, pp. 35-39 (May 2010).
Schneider, David, "Electrons Unplugged. Wireless power at a distance is still far away", *IEEE Spectrum*, pp. 35-39 (May 2010).
Schuder, J. C. et al., "An Inductively Coupled RF System for the Transmission of 1 kW of Power Through the Skin", *IEEE Transactions on Bio-Medical Engineering*, vol. BME-18, No. 4, pp. 265-273 (Jul. 1971).
Schuder, J. C., "Powering an Artificial Heart: Birth of the Inductively Coupled-Radio Frequency System in 1960", *Artificial Organs*, vol. 26:909-915 (2002).
Schuder, J.C. et al., "Energy Transport Into the Closed Chest From a Set of Very-Large Mutually Orthogonal Coils", Communication Electronics, vol. 64:527-534 (Jan. 1963).
Schutz, J. et al., "Load Adaptive Medium Frequency Resonant Power Supply", IEEE, pp. 282-287 (Nov. 2002).
Sekitani et al. "A large-area wireless power-transmission sheet using printed organic transistors and plastic MEMS switches" www.nature.com/naturematerials. Published online Apr. 29, 2007.
Sekitani et al., "A large-area flexible wireless power transmission sheet using printed plastic MEMS switches and organic field-effect transistors", IEDM '06, International Electron Devices Meeting, (Dec. 11-13, 2006) 4 pages.
Sekiya, H. et al., "FM/PWM control scheme in class DE inverter", IEEE Trans. Circuits Syst. I, vol. 51(7) (Jul. 2004).
Senge, M., "MIT's wireless electricity for mobile phones", Vanguard, http://www.vanguardngr.com/articles/2002/features/gsm/gsm211062007.htm, (Jun. 11, 2007) 1 page.
Sensiper, S., "Electromagnetic wave propogation on helical conductors", Technical Report No. 194 (based on PhD Thesis), Massachusetts Institute of Technology, (May 16, 1951) 126 pages.
Soljacic, M. , "Wireless Non-Radiative Energy Transfer— PowerPoint presentation". Massachusetts Institute of Technology, (Oct. 6, 2005).
Soljacic, M. et al., "Wireless Energy Transfer Can Potentially Recharge Laptops Cell Phones Without Cords", (Nov. 14, 2006) 3 pages.
Soljacic, M. et al., "Photonic-crystal slow-light enhancement of nonlinear phase sensitivity", *J. Opt. Soc. Am B*, vol. 19, No. 9, pp. 2052-2059 (Sep. 2002).
Soljacic, M., "Wireless nonradiative energy transfer", *Visions of Discovery New Light on Physics, Cosmology, and Consciousness*, Cambridge University Press, New York, NY pp. 530-542 (2011).
Someya, Takao. "The world's first sheet-type wireless power transmission system". University of Tokyo, (Dec. 12, 2006).
Staelin, David H. et al., Electromagnetic Waves, Chapters 2, 3, 4, and 8, pp. 46-176 and 336-405 (Prentice Hall Upper Saddle River, New Jersey 1998).
Stark III, Joseph C., "Wireless Power Transmission Utilizing a Phased Array of Tesla Coils", Master Thesis, Massachusetts Institute of Technology (2004).
Stewart, W., "The Power to Set you Free", Science, vol. 317:55-56 (Jul. 6, 2007).
Tang, S.C. et al., "Evaluation of the Shielding Effects on Printed-Circuit-Board Transformers Using Ferrite Plates and Copper Sheets", *IEEE Transactions on Power Electronics*, vol. 17:1080-1088 (Nov. 2002).
Tesla, Nikola, "High Frequency Oscillators for Electro-Therapeutic and Other Purposes", *Proceedings of the IEEE*, vol. 87:1282-1292 (Jul. 1999).
Tesla, Nikola, "High Frequency Oscillators for Electro-Therapeutic and Other Purposes", *The Electrical Engineer*, vol. XXVI, No. 50 (Nov. 17, 1898).
Texas Instruments, "HF Antenna Design Notes—Technical Application Report," Literature No. 11-08-26-003, 47 pages (Sep. 2003).
Thomsen et al., "Ultrahigh speed all-optical demultiplexing based on two-photon absorption in a laser diode," Electronics Letters, 34(19):1871-1872 (Sep. 17, 1998).
UPM Rafsec, "Tutorial overview of inductively coupled RFID Systems," 7 pages (May 2003).
Valtchev et al. "Efficient Resonant Inductive Coupling Energy Transfer Using New Magnetic and Design Criteria". IEEE, pp. 1293-1298, 2005.
Vandevoorde et al., "Wireless energy transfer for stand-alone systems: a comparison between low and high power applicability", Sensors and Actuators, vol. 92:305-311 (2001).
Vilkomerson, David et al., "Implantable Doppler System for Self-Monitoring Vascular Grafts", *IEEE Ultrasonics Symposium*, pp. 461-465 (2004).
Villeneuve, Pierre R. et al., "Microcavities in photonic crystals: Mode symmetry, tunability, and coupling efficiency", *Physical Review B*, vol. 54:7837-7842 (Sep. 15, 1996).
Yariv, Amnon et al., "Coupled-resonator optical waveguide: a proposal and analysis", *Optics Letters*, vol. 24(11):711-713 (Jun. 1, 1999).
Yates, David C. et al., "Optimal Transmission Frequency for Ultralow-Power Short-Range Radio Links", IEEE Transactions on Circuits and Systems—1, Regular Papers, vol. 51:1405-1413 (Jul. 2004).
Yoshihiro Konishi, *Microwave Electronic Circuit Technology*, Chapter 4, pp. 145-197 (Marcel Dekker, Inc., New York, NY 1998).
Ziaie, Babak et al., "A Low-Power Miniature Transmitter Using a Low-Loss Silicon Platform for Biotelemetry", *Proceedings—19th International Conference IEEE/EMBS*, pp. 2221-2224, (Oct. 30-Nov. 2, 1997) 4 pages.
Zierhofer, Clemens M. et al., "High-Efficiency Coupling-Insensitive Transcutaneous Power and Data Transmission via an Inductive Link", *IEEE Transactions on Biomedical Engineering*, vol. 37, No. 7, pp. 716-722 (Jul. 1990).
Invitation to Pay Additional Fees for International Application No. PCT/US2015/036766 dated Nov. 16, 2015 (6 pages).
International Search Report and Written Opinion of the International Searching Authority for International Application No. PCT/US2015/036766 dated Jan. 21, 2016 (22 pages).
International Preliminary Report on Patentability and Written Opinion of the International Searching Authority for International Application No. PCT/US2015/036766 dated Dec. 29, 2016 (16 pages).

\* cited by examiner

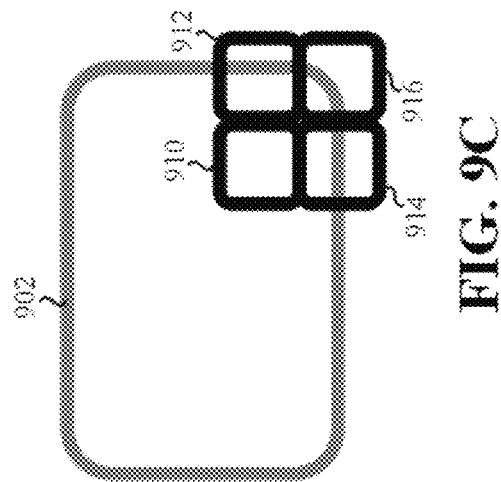
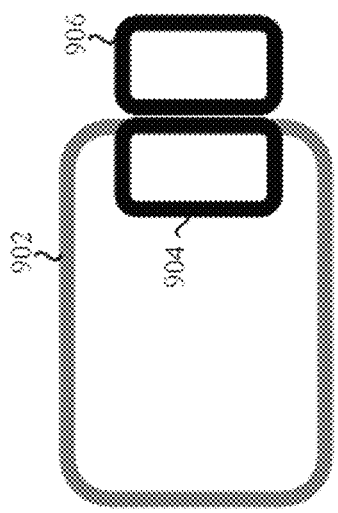
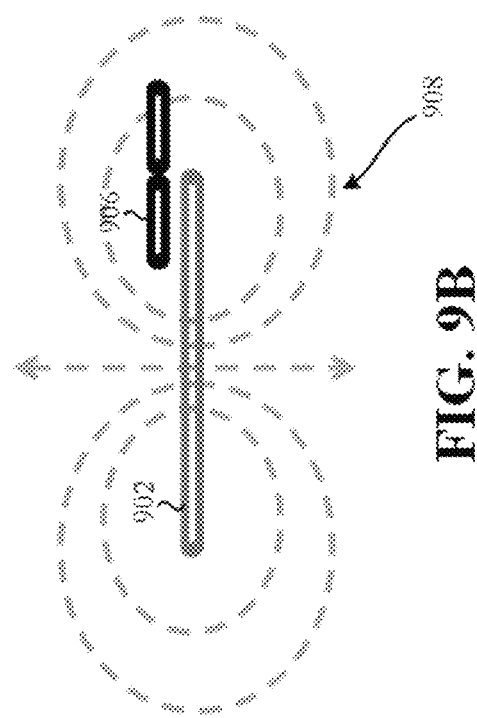
FIG. 9A
FIG. 9B
FIG. 9C

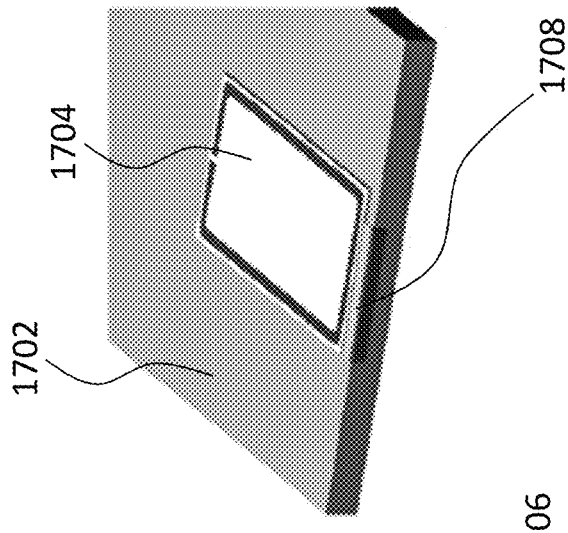
FIG. 17B    FIG. 17C
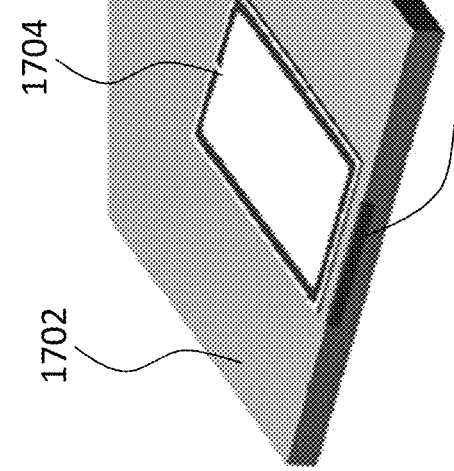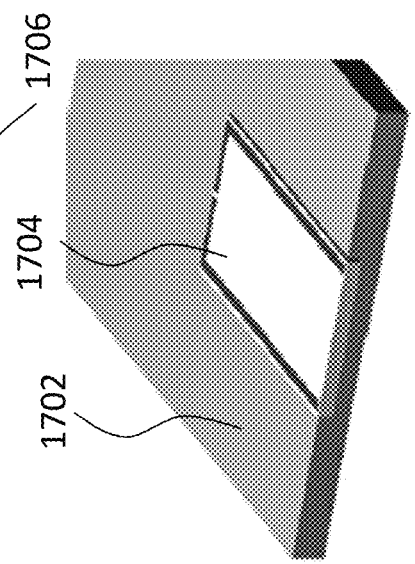
FIG. 17E
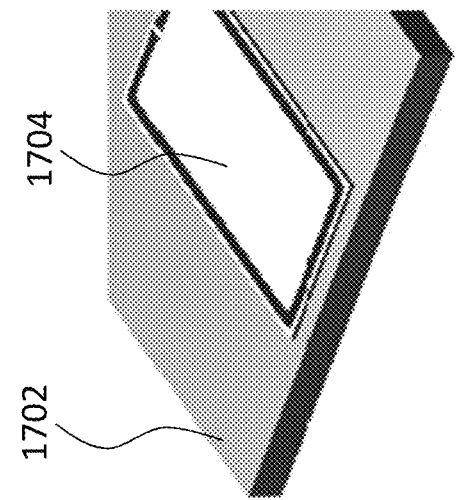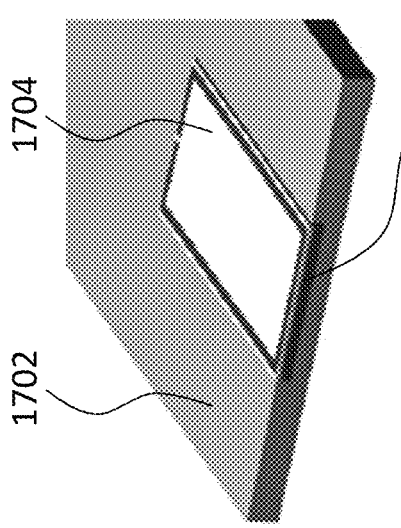
FIG. 17A    FIG. 17D

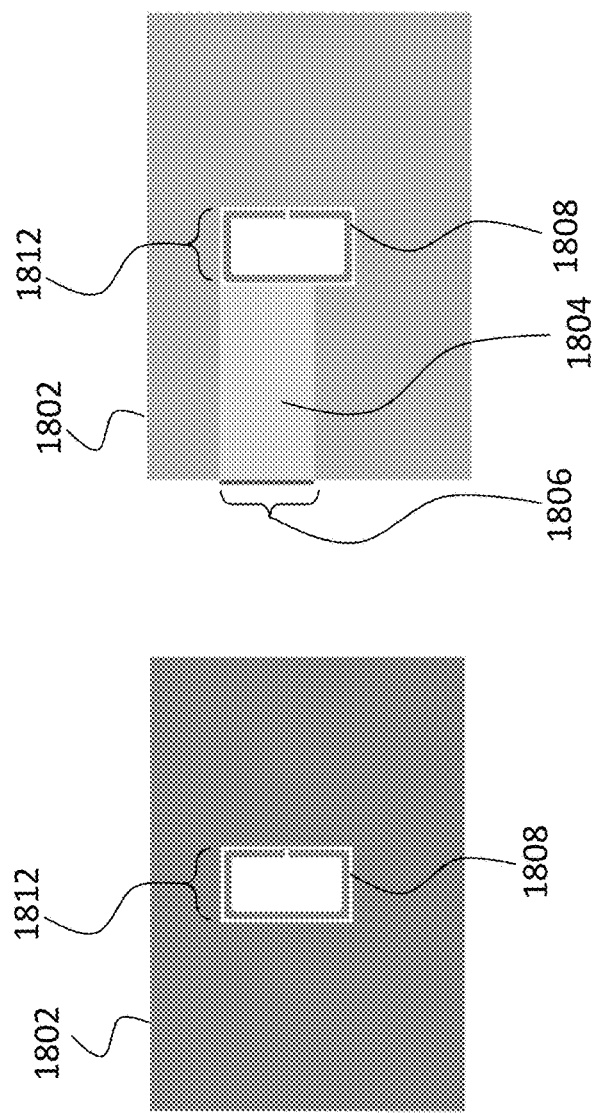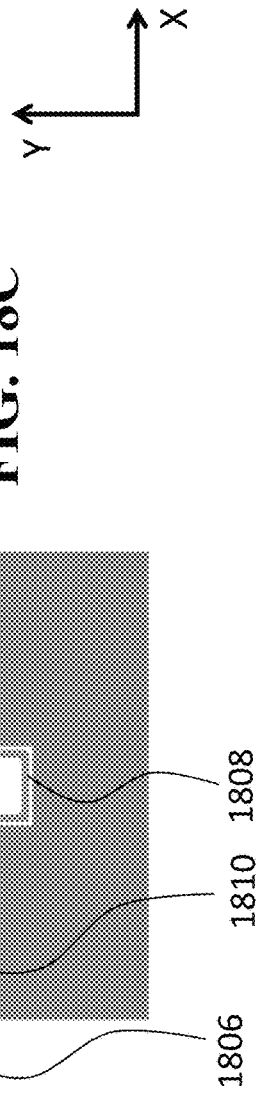

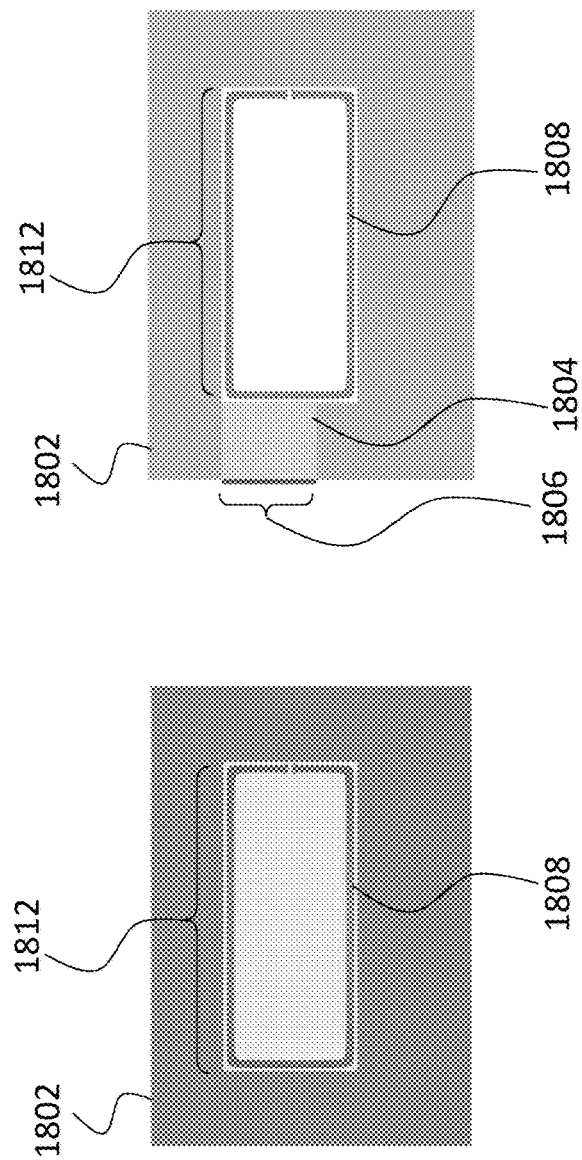
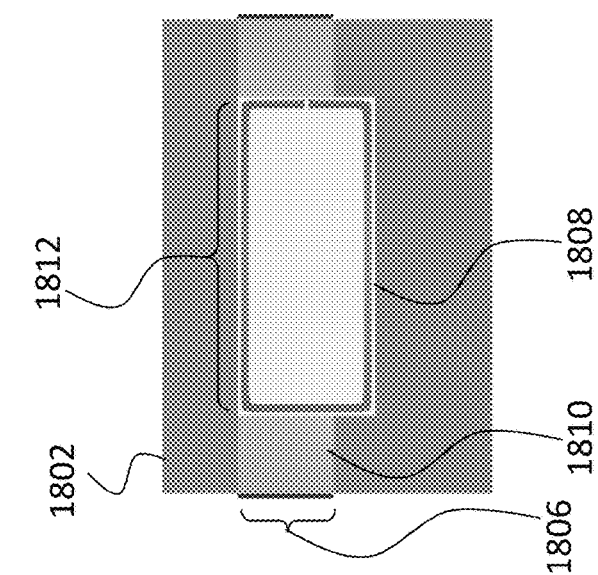
FIG. 18D
FIG. 18E
FIG. 18F

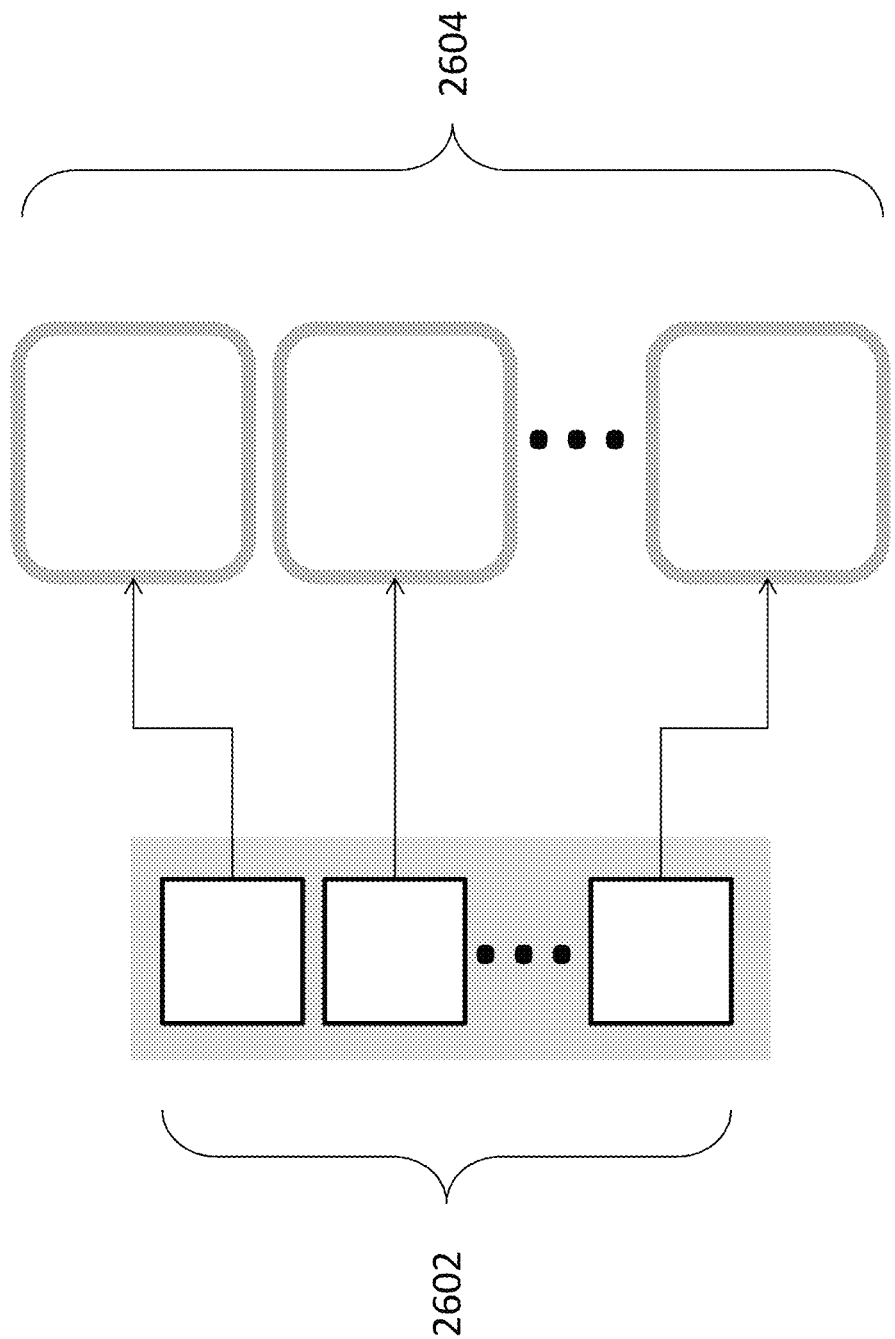

WIRELESS POWER TRANSFER SYSTEMS FOR SURFACES

CROSS-REFERENCE TO RELATED APPLICATIONS

This application is a continuation of and claims priority under 35 U.S.C. § 120 to U.S. patent application Ser. No. 14/745,041, filed on Jun. 19, 2015, which claims priority to U.S. Provisional Patent Application No. 62/015,078, filed on Jun. 20, 2014. The entire contents of each of these priority applications are incorporated herein by reference.

BACKGROUND

Electronic devices can have narrow operating voltage and/or current requirements and may not be able to tolerate wide voltage swings or power surges. Existing power supplies often assume a regulated or predictable source of power such as that supplied by the household mains or a battery. In some applications, the power source to a power supply circuit may be unpredictable and may include wide voltage swings and surges. In applications where the power source includes a highly resonant wireless power source, for example, power source characteristics may quickly change due to changes in coupling, positioning of devices and/or movement of devices and extraneous objects resulting in voltage fluctuations and/or surges. Components of existing power supplies, such as switches, diodes, rectifiers, and the like may fail or overheat during the fluctuations and may be unable to provide a reliable output power to the electronic device.

SUMMARY

In general, in a first aspect, the disclosure features asynchronous rectifiers that include an input terminal for receiving an oscillating energy signal, at least one rectifying element connected in series with the input terminal, at least one shorting element connected in parallel with the input terminal to provide an bypass path around the at least one rectifying element for the oscillating energy signal, and including at least one switching element configured to selectively activate the bypass path, and a feedback loop configured to detect an electrical parameter at an output of the rectifying element and to generate, based on the detected electrical parameter, a control signal for the at least one shorting element to selectively activate the bypass path.

Embodiments of the rectifiers can include any one or more of the following features.

The electrical parameter can include a voltage. The feedback loop can be configured to generate the control signal to activate the bypass path when a detected voltage at the output of the rectifying element is equal to or greater than an upper bound threshold value. The feedback loop can include a comparator configured to generate the control signal to activate the bypass path when the upper bound threshold value is reached. The comparator can include a resistor connecting an output of the comparator to an input of the comparator, where a resistance value of the resistor determines hysteresis of the feedback loop.

The shorting element can include a diode. The rectifying element can include at least one diode.

The rectifiers can include a synchronizing element configured to synchronize activation of the bypass path with the oscillating energy signal so that the shorting element is operated using zero voltage switching. The rectifiers can include a LCL impedance matching network connected to the input terminal.

Embodiments of the rectifiers can also include any of the other features disclosed herein, including features disclosed in connection with different embodiments, in any combination as appropriate.

In another aspect, the disclosure features methods for rectifying and regulating voltage received from a resonator by an electronic device that includes an asynchronous rectifier, the methods including detecting a voltage equal to or greater than an upper voltage threshold at an output of the rectifier, activating a shorting element to decrease the voltage at the output of the rectifier, monitoring energy demands of the electronic device, monitoring energy delivered to the resonator by a source, predicting an adjustment to the upper voltage threshold based on a difference between the energy demands of the electronic device and the energy delivered to the resonator, and adjusting the upper voltage threshold based on the prediction.

Embodiments of the methods can include any one or more of the following features.

The methods can include adjusting the upper voltage to maintain a frequency of activation/deactivation of the shorting element of at most 10% (e.g., at most 1%) of a frequency of an oscillating energy signal delivered to the resonator.

The methods can include detecting a voltage equal to or lower than a lower voltage threshold at the output of the rectifier, and deactivating the shorting element to increase the voltage at the output of the rectifier. The methods can include predicting an adjustment to the lower voltage threshold based on the difference between the energy demands of the electronic device and the energy delivered to the resonator, and adjusting the lower threshold based on the prediction. The methods can include adjusting the lower voltage threshold to maintain a frequency of activation/deactivation of the shorting element of at most 10% (e.g., at most 1%) of a frequency of an oscillating energy signal delivered to the resonator.

Embodiments of the methods can also include any of the other features or steps disclosed herein, including features and steps disclosed in connection with different embodiments, in any combination as appropriate.

In a further aspect, the disclosure features resonator coils for wireless energy transfer that include an electrical conductor having a first end and a second end, where the first end is shaped to spiral inwards in a first direction forming a first set of conductor loops, and the second end is shaped to spiral inwards in a second direction forming a second set of conductor loops.

Embodiments of the resonators coils can include any one or more of the following features.

The first direction and the second direction can be the same direction. The conductor loops of the first set of conductor loops can be off center from one another. The conductor loops of the second set of conductor loops can be off center from one another.

Spacings between portions of adjacent conductor loops in the first set can be greater for portions nearer to the second set of conductor loops than for other portions. Spacings between portions of adjacent conductor loops in the second set can be greater for portions nearer to the first set of conductor loops than for other portions. A width of the electrical conductor can vary in proportion to the spacings between portions of adjacent conductor loops in the first and second sets.

Embodiments of the resonator coils can also include any of the other features disclosed herein, including features disclosed in combination with different embodiments, in any combination as appropriate.

In another aspect, the disclosure features wireless energy transfer sources that include at least two source resonators electrically connected in parallel and configured so that during operation, the at least two source resonators can each transfer energy wirelessly via an oscillating magnetic field to a device resonator, and a power source coupled to a first tunable element and to each of the at least two source resonators, and configured so that during operation, the power source provides a supply of electrical current, where each of the at least two source resonators has a nominal impedance when a device resonator is not positioned on or near any of the at least two source resonators, the nominal impedances of each of the at least two source resonators varying by 10% or less from one another, and where the at least two source resonators are configured so that during operation of the wireless energy transfer source, when a device resonator is positioned on or near a first one of the at least two source resonators: (a) the impedance of the first source resonator is reduced such that the reduced impedance of the first source resonator is smaller than the nominal impedances of each of the other resonators by a factor of 2 or more; and (b) the first source resonator draws electrical current from the power source.

Embodiments of the sources can include any one or more of the following features.

The tunable element can include at least one of a tunable capacitor, a tunable inductor, and a tunable resistor. The sources can include power and control circuitry configured to control the tunable element. A second one of the at least two source resonators can draw current from the power source when the device resonator is positioned on or near both the first and second resonators.

The at least two source resonators can each include an S-shaped coil, and the at least two resonators can be nested within one another. Each of the S-shaped coils can be printed on a first layer of a circuit board and returning traces of the S-shaped coils can be printed on a second layer of the circuit board. The device resonator can include an S-shaped coil.

The device resonator can be part of a phone or a laptop. The source resonator can be integrated into a surface of a table or desk.

Each of the at least two source resonators can include a tunable capacitor. The power and control circuitry can be configured to tune the tunable capacitor in response to the presence of a lossy object.

The tunable capacitor can include a bank of capacitors and wherein a capacitance of the bank of capacitors is controlled by a switch. Each of the at least two source resonators can include a tunable inductor. An inductance of each tunable inductor can be changed to adjust the impedance of each corresponding one of the at least two source resonators.

The at least two source resonators can be overlapped such that coupling between them is reduced, relative to the coupling that would result if the source resonators were positioned adjacent one another. Each of the at least two source resonators can have a quality factor Q>100.

Embodiments of the sources can also include any of the other features disclosed herein, including features disclosed in combination with different embodiments, in any combination as appropriate.

In a further aspect, the disclosure features methods for tuning a wireless power source, the methods including driving at least two source resonators with a power source coupled to a first tunable element and to each of the at least two source resonators, where the power source is configured to provide an electrical current supply, and in response to the positioning of a device resonator on or near a first one of the at least two source resonators, supplying electrical current to the first source resonator to wirelessly transfer power from the first resonator to the device resonator, where the positioning of the device resonator on or near the first source resonator reduces an impedance of the first source resonator by a factor of at least two relative to impedances of each of the other source resonators.

Embodiments of the methods can include any of the features disclosed herein, including features disclosed in combination with different embodiments, in any combination as appropriate.

In another aspect, the disclosure features wireless energy transfer systems that include a source featuring at least two source resonators electrically connected in parallel and a driving circuit coupled to a first tunable element and to each of the at least two source resonators, the driving circuit configured to provide a current supply, and a device that includes at least one device resonator coupled to a load, where the source is configured to transfer wireless energy via an oscillating magnetic field to the at least one device resonator, where a first one of the at least two source resonators draws current from the driving circuit when the device resonator is positioned on or near the first of the at least two source resonators, and where other resonators of the at least two source resonators are detuned when the device resonator is positioned on or near the first source resonator.

Embodiments of the systems can include any one or more of the following features.

The device can include at least two device resonators. Energy captured by the at least two device resonators can be electrically combined to deliver power to the load.

Embodiments of the systems can also include any of the other features disclosed herein, including features disclosed in combination with different embodiments, in any combination as appropriate.

In a further aspect, the disclosure features sources for wireless energy transfer that include: a first S-shaped conductor in a plane, the first S-shaped conductor featuring a first top half and a first bottom half; and a second S-shaped conductor in the plane, the second S-shaped conductor featuring a second top and a second bottom half, where the first top half has a smaller area than the second top half, where the first bottom half has a greater area than the second bottom half, and where the first and second S-shaped conductors are nested into one another without overlapping.

Embodiments of the sources can include any one or more of the following features.

The first and second S-shaped conductors can be disposed in a first layer of a printed circuit board. A first return trace belonging to the first S-shaped conductor and a second return trace belonging to the second S-shaped conductor can be in a second plane. A first return trace belonging to the first S-shaped conductor and a second return trace belonging to the second S-shaped conductor can be disposed in a second layer of the printed circuit board.

Each of the S-shaped conductors can be coupled to and driven by an amplifier. The S-shaped conductors can be coupled to and driven by a single amplifier.

Embodiments of the sources can also include any of the other features disclosed herein, including features disclosed in combination with different embodiments, in any combination as appropriate.

In another aspect, the disclosure features receivers for wireless energy transfer that include: an electronic device having a bottom surface, a first side surface, and second side surface, where a first edge corresponds to a location where the bottom surface and the first side surface intersect and a second edge corresponds to a location where the bottom surface and the second side surface intersect; a piece of magnetic material disposed on the bottom surface of the electronic device; and a device resonator coil disposed on the at least one piece of magnetic material, where the first and second edges are positioned opposite to each other, and where the piece of magnetic material extends from under the device resonator to the first edge.

Embodiments of the receivers can include any one or more of the following features.

The piece of magnetic material can extend to the second edge. The receivers can include a second piece of magnetic material disposed on the first side surface. The receivers can include a third piece of magnetic material disposed on the second side surface. The electronic device can be one of a laptop, a notebook computer, a smartphone, and a tablet.

Embodiments of the receivers can also include any of the other features disclosed herein, including features disclosed in combination with different embodiments, in any combination as appropriate.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 9A-C are schematic diagrams showing embodiments of a multi-resonator coil device.

FIGS. 17A-E are schematic diagrams showing embodiments of resonators.

FIGS. 18A-F are schematic diagrams showing different examples of magnetic material configurations.

FIG. 26 is a schematic diagram showing an embodiment of driving resonators.

DETAILED DESCRIPTION

Figure 1:
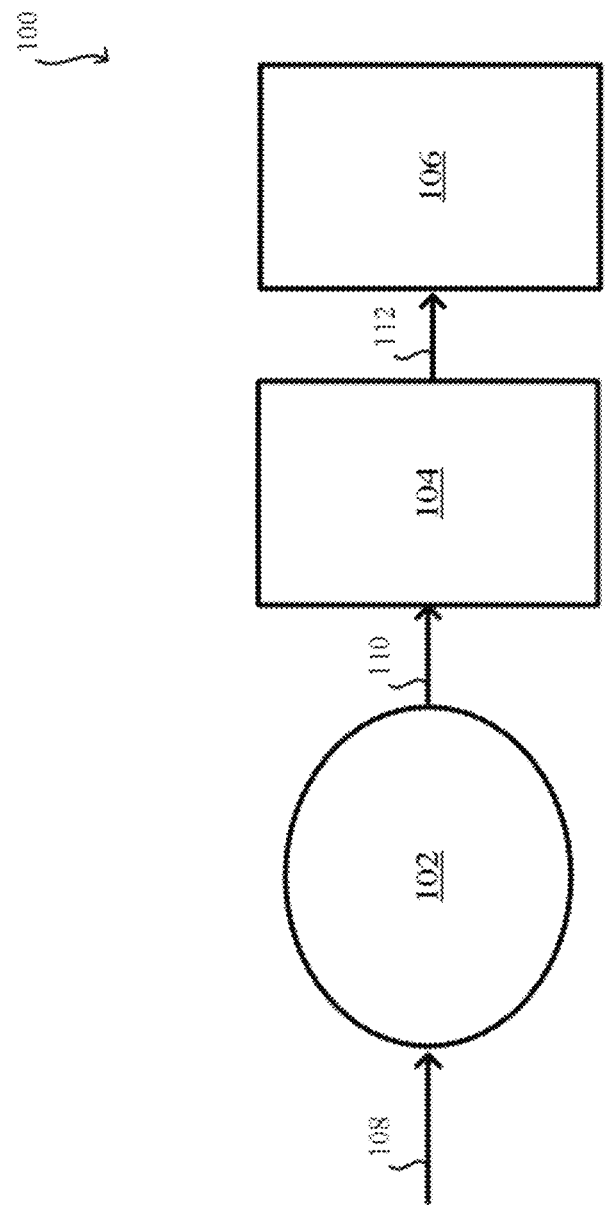
FIG. 1 is a schematic diagram showing an embodiment of an electronic device with power electronics.

Wireless energy transfer systems described herein may be implemented using a wide variety of resonators and resonant objects. As those skilled in the art will recognize, important considerations for resonator-based power transfer include resonator quality factor and resonator coupling. Extensive discussion of such issues, e.g., coupled mode theory (CMT), coupling coefficients and factors, quality factors (also referred to as Q-factors), and impedance matching is provided, for example, in U.S. patent application Ser. No. 13/428,142, published on Jul. 19, 2012 as US 2012/0184338, in U.S. patent application Ser. No. 13/567,893, published on Feb. 7, 2013 as US 2013/0033118, and in U.S. patent application Ser. No. 14/059,094, published on Apr. 24, 2014 as US 2014/0111019. The entire contents of each of these applications are incorporated by reference herein.

Electronic devices may rely on electronic circuits such as rectifiers, AC to DC converters, and other power electronics to condition, monitor, maintain, and/or modify the characteristics of the voltage and/or current used to power the electronic device. Power electronics may take as input electrical energy from a power source with voltage/current characteristics that may not be compatible with the requirements of the electronic device and modify the voltage and/or current characteristics to meet the requirements of the electronic device. In some cases, the power source may be a mains connection or a battery providing a substantially stable input. For example, a power mains may provide 120 VAC input which may be rectified and converted to 5 VDC for some electronic devices.

In some applications, the power source may be highly variable. Power electronics receiving power via highly resonant wireless energy transfer, for example, may be required to condition or modify received voltages and/or currents because those voltages or currents may change by 10%, 50%, 100% or more and in some cases may appear as power surges. The power electronics used in existing devices may not be capable of providing a stable output to an electronic device from such a highly variable power source.

In the devices disclosed herein, power electronics circuits may include an asynchronous rectifier. An asynchronous rectifier may be part of an efficient and cost effective circuit for monitoring and modifying a variable power input to an electronic device. The asynchronous rectifier circuit may be configured and/or controlled to provide a substantially stable voltage/current output despite changing input voltage and/or current characteristics. The asynchronous rectifier may provide efficient rectification and/or regulation even in converting power wirelessly transmitted using high operating frequencies (e.g., 6.78 MHz) without requiring precise timing for switches, as in traditional synchronous designs.

The asynchronous rectifiers disclosed herein may include a feedback loop that monitors the output of the rectifier and adjusts the operation of one or more components of the rectifier. Adjusting the operation of the one or more components of the rectifier may affect the output characteristics of the rectifier. The output of the rectifier may be configured to maintain a specific voltage and/or current at the output such as 3 VDC, 5 VDC, or more, or others.

In exemplary embodiments, the output of the rectifier may be adjustable or variable. The output of the rectifier may be set to different operating points such as different output voltages and/or currents. The output may be set to a first operating point for a first duration of time and to a second operating point for a second duration of time. The output of the rectifier may maintain the first operating point or the second operating point during variations of input power to the rectifier.

In exemplary embodiments, the rectifier may include a clamping circuit to prevent voltage and/or current surges that may occur at the input of the rectifier to propagate to the output.

FIG. 1 depicts a system 100 which may have variable power input 110. The system may include an electronic device 106 with constraints on allowable voltages and/or currents at its power input 112. The power input 110 may not be compatible with the constraints of the electronic device. In exemplary embodiments, the power input 110 may be generated from energy that is captured from a magnetic field by a magnetic resonator 102 and transformed into oscillating electrical energy 110. Power electronics 104 may be configured to modify the characteristics of the electrical energy 110 received from the resonator 102 to match the requirements of the electronic device 106.

In exemplary embodiments, the power electronics may be configured to rectify and regulate the oscillating electrical energy 110 received from the resonator 102. The oscillating voltage and/or current may be rectified to generate a DC voltage or an approximately DC voltage. The DC output may be further regulated or conditioned to output a desired voltage and/or current and/or multiple voltages/currents (including AC voltages and currents).

Figure 2A:
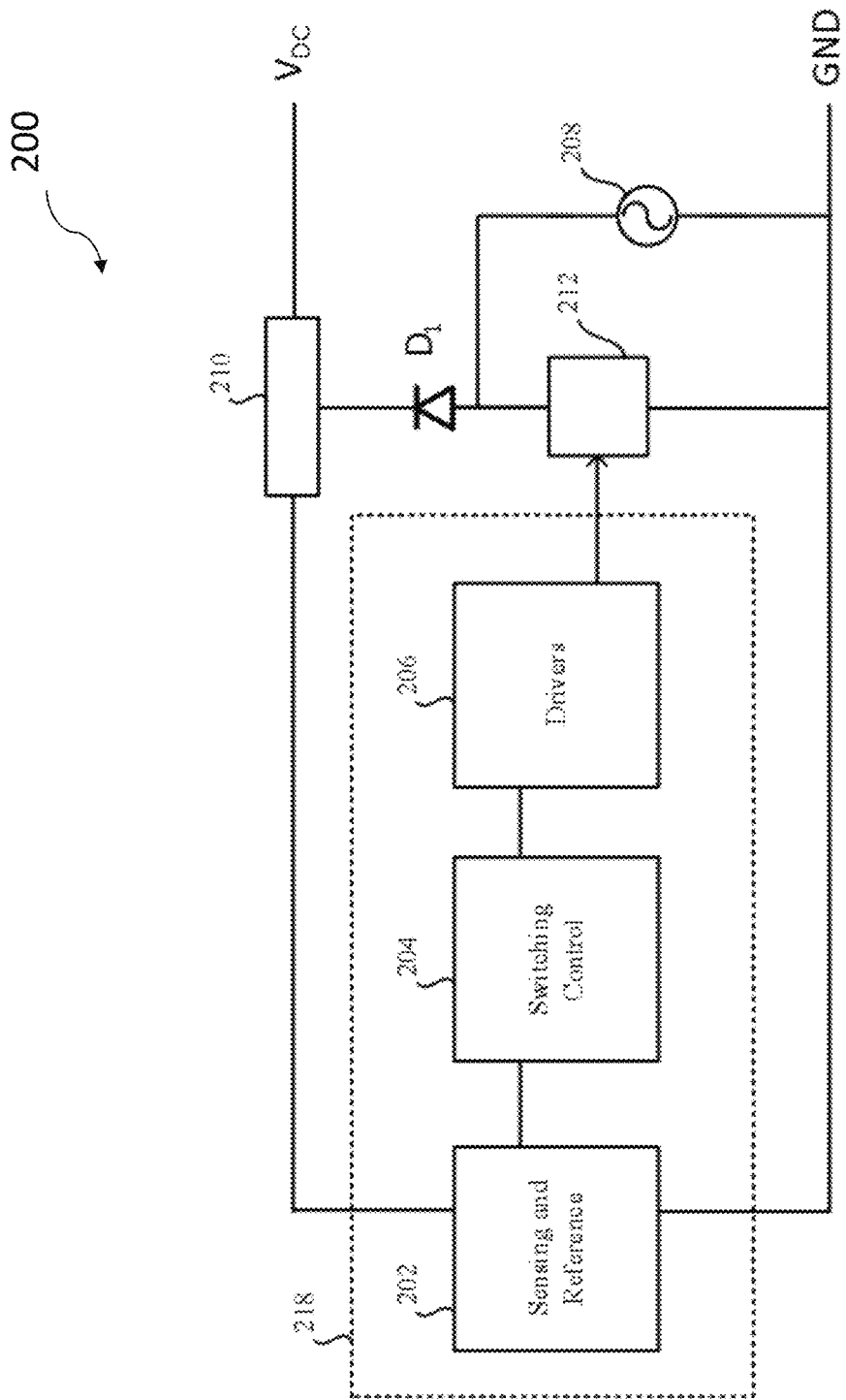
FIG. 2A is a schematic diagram showing an embodiment of an asynchronous rectifier.

FIG. 2A depicts an exemplary embodiment of an asynchronous rectifier circuit that may be included in the power electronics circuitry to rectify and regulate an oscillating voltage input from a resonator or another source of oscillating energy 208. The asynchronous rectifier circuit may include rectifying diode $D_1$ connected in series with the oscillating energy source 208. A shorting element 212 may be arranged in parallel with the oscillating energy source 208. The shorting element may be controlled by other elements of the asynchronous rectifier to activate and/or short the oscillating energy source 208 thereby bypassing the rectifying diode $D_1$.

During operation of the asynchronous rectifier, the rectifying diode $D_1$ may normally conduct during the positive phase of the oscillating energy source providing a positive (rectified) voltage at the output of the diode $D_1$. Additional elements 210 such as capacitors, inductors, and other elements, may be used to reduce the ripple of the rectified voltage/current and provide a substantially DC voltage ($V_{DC}$) to the electronic device. The peak voltage at the output of the rectifying diode $D_1$ may depend on the power demands of the electronic device, the peak voltage of the oscillating energy source 208, and the like. Unless further controlled, the peak voltage at the output of the rectifying diode $D_1$ may be proportional to the peak voltage of the oscillating energy source 208 and may exceed the voltage constraints of the electronic device receiving energy from the rectifier 200.

The peak voltage at the output of the rectifying diode $D_1$ may be controlled by the shorting element 212. The shorting element 212 may selectively provide an alternative path for the current from the oscillating energy source 208 such that the current bypasses the rectifying diode $D_1$. The alternative conducting path through the shorting element 212 may be activated based on the voltage at the output of the rectifying diode $D_1$ or the VAC output from the rectifier to the electronic device. The shorting element may be selected to have low losses ($R_{ds,on}$ for FET) since during the shorting time period, all transferred power may be dissipated in the resonator and shorting element. The switching element may include one or more MOSFETs, FETs, bipolar junction transistors (BJTs) or other switch and/or relay and/or transistor types and may be selected based on the performance characteristics and/or cost requirements for an application.

In exemplary embodiments, the shorting element may be normally deactivated under normal or acceptable operating conditions. Then the shorting element may be activated when the voltage at the output of the rectifying diode $D_1$ reaches an upper bound threshold value. When the upper bound threshold value is reached the shorting element 212 may be activated to prevent additional energy from the oscillating energy source 208 from passing through the diode $D_1$. If, during this time, the voltage at the output of the rectifying diode decreases due to changing energy demands of the electronic device and/or other circuitry, and reaches a lower bound threshold value, the shorting element may be deactivated allowing more energy to flow through the rectifying diode which may allow the voltage at the output of the rectifying diode $D_1$ to increase. The cycle of activating and deactivating the shorting element may be controlled by elements of the feedback loop 218 of the asynchronous rectifier to maintain the voltage at the output of the rectifying diode between the upper bound threshold value and lower bound threshold value.

In exemplary embodiments, the shorting element may be normally activated and may be deactivated when the output voltage reaches a minimum threshold value and reactivated when the voltage reaches a maximum threshold value. In exemplary embodiments, the shorting element may be activated and deactivated for predetermined amounts of time, periodically, and/or in response to set of triggers such as threshold crossings, temperature measurements, control signals, communication signals and the like.

Figure 2B:
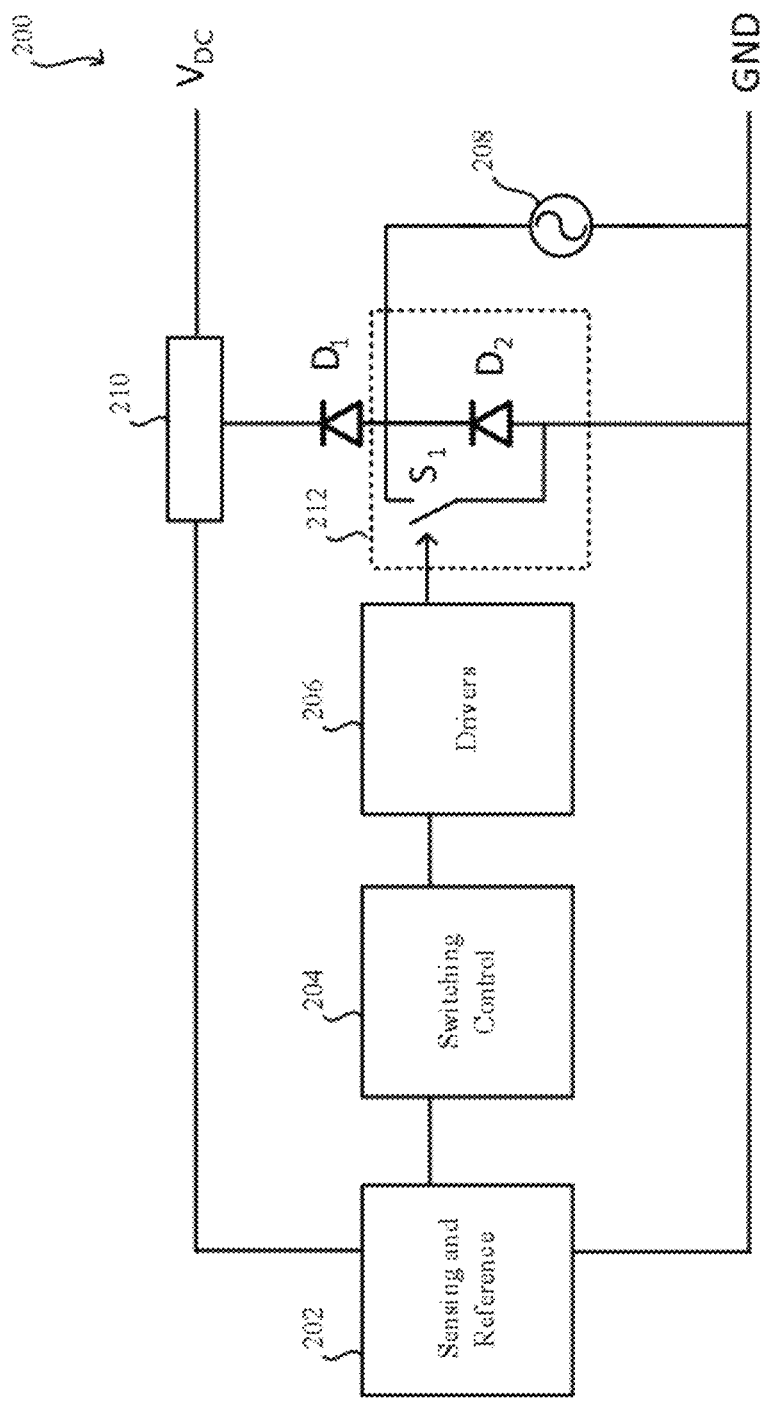
FIG. 2B is a schematic diagram showing an embodiment of an asynchronous rectifier with a shorting element.

FIG. 2B shows an exemplary embodiment of the asynchronous rectifier circuit with one exemplary embodiment of an implementation of the shorting element 212. The exemplary shorting element includes a diode $D_2$ and a switching element $S_1$. The diode $D_2$ and the switching element $S_1$ may be configured in parallel with the oscillating energy source 208. The diode $D_2$ may be configured to provide a ground path to the $V_{DC}$ output when the switching element $S_1$ is open. When the shorting element is activated (the switch is closed) the switching element may provide for an alternative path for the current from the oscillating energy source 208. The alternative path may bypass the rectifying diode $D_1$. The switching element may be a transistors and/or relays. The switching element may include one or more MOSFETs, FETs, BJTs or other transistor types and may be selected based on the performance characteristics and/or cost requirements for an application.

Activation and deactivation of the shorting element 212 may be controlled via a feedback loop that takes as input the voltage and/or current at the output of the rectifier diode $D_1$ and/or the output $V_{DC}$ to the electronic device. The feedback loop may include elements or modules or units that provide reference voltage and/or current readings 202 at the output of rectifier diode $D_1$ and/or other parts of the circuit such as the $V_{DC}$ output. The reference readings may be used by the switching control unit 204 to determine when to activate/deactivate the shorting element. The output of the switching control unit 204 may be a signal such as a binary on/off signal to activate/deactivate the shorting element 212. The signal may be buffered by drivers 206 that provide the correct voltages and switching characteristics for the particular switching elements of the shorting element 212.

The feedback loop may comprise sensing and reference circuitry 202, a switching control unit 204, and drivers 206 and may include digital and/or analog circuitry. In exemplary embodiments, digital logic may be preferred over analog circuits to define upper/lower bound thresholds and activation/deactivation timers. Digital logic such as microprocessors, gate arrays, field-programmable gate arrays (FPGAs), and the like may be used to reconfigurably adjust operating points and thresholds. In exemplary embodiments, analog circuitry may be preferred. Analog circuitry may provide for faster response times and/or shorter delays between changes in rectified voltage and adjustment of the shorting element. In exemplary embodiments, a combination of digital and analog circuitry may be used.

Figure 2C:
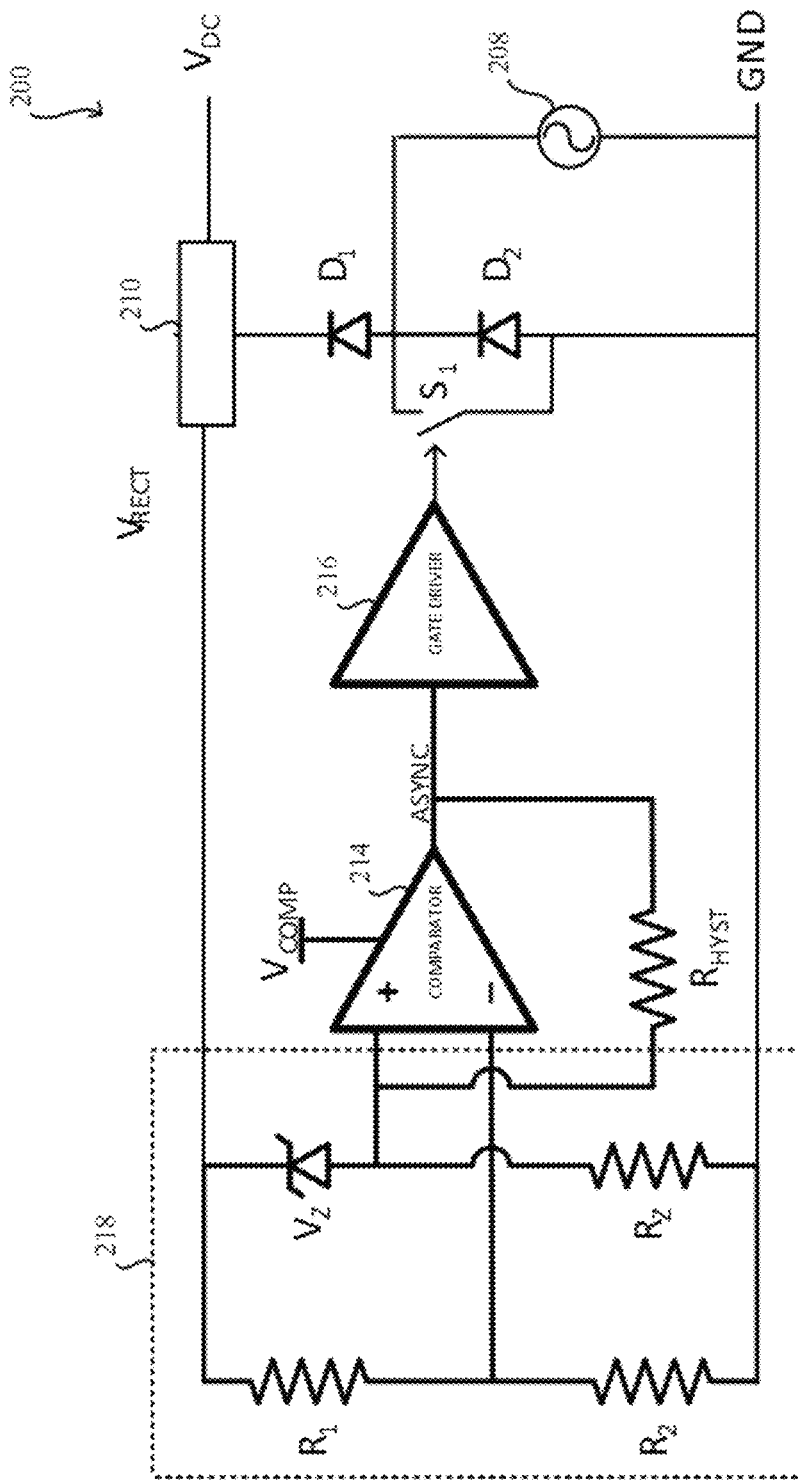
FIG. 2C is a schematic diagram showing an embodiment of an asynchronous rectifier with a feedback loop that includes a comparator.

FIG. 2C shows an exemplary embodiment of the asynchronous rectifier circuit with one exemplary embodiment of an implementation of the sensing and reference circuitry 202 and switching control unit 204 elements (shown in FIG. 2B) using analog circuitry. The exemplary embodiment includes a network of resistors, diodes, at least one comparator 214 and a gate driver 216. The network 218 of resistors and the Zener diode $V_Z$ may be used to provide a reference voltage for the comparator 214. The $R_1$, $R_2$, and $R_z$ resistor values and the Zener voltage may be used to determine the upper bound voltage for which the comparator 214 may trigger a signal for activating/deactivating switch $S_1$.

The maximum voltage $V_{RECT}$ may be defined using the values of the resistors and the Zener voltage $V_Z$:

$$V_{RECT,max} = \frac{V_Z R_{HYST} + V_{OUT} R_1}{R_1}\left(\frac{R_2}{R_2 + R_{HYST}}\right) + V_Z,$$

where $V_{OUT}$ is the voltage at the output of the comparator 214.

When the maximum voltage $V_{RECT,max}$ is reached, the comparator 214 triggers the activation of switch $S_1$. Once switch $S_1$ is activated, the energy from the oscillating energy source 208 will bypass the rectifying diode $D_1$. During the activation of the switch $S_1$, the voltage $V_{RECT}$ may decrease. As the voltage decreases below the $V_{RECT,max}$ threshold, the comparator may trigger to deactivate switch $S_1$.

The lower bound voltage of $V_{RECT}$ that will cause the comparator 214 to deactivate the switch $S_1$ may be determined by exploiting the hysteresis property of the comparator 214. The lower bound may be selected by defining the value of the $R_{HYST}$ resistor. The larger the value of the resistor, the greater the hysteresis effect. The greater the hysteresis effect, the larger the difference between the lower bound and upper bound voltages on the $V_{RECT}$.

The difference between the lower bound threshold and upper bound threshold may result in a ripple in the $V_{RECT}$ voltage. For some applications, the magnitude of the ripple may be an important factor. The magnitude of the ripple may affect the frequency at which the switch $S_1$ is turned on/off. In exemplary embodiments, the switching frequency of $S_1$ may be proportional to the losses of the rectifier. In exemplary embodiments, the value of the $R_{HYST}$ resistor may be selected to provide acceptable tradeoffs between the magnitude of the ripple and switching losses associated with switch $S_1$.

In exemplary embodiments, the ripple at the output $V_{DC}$ may be reduced by additional components 210 which may include capacitors and/or inductors.

In exemplary embodiments, one or more of the resistors may be a variable resistor and may be an electronically adjustable resistor. The values of the resistors may be adjusted to change the operating point of the rectifier. The resistor values may be adjusted to change the maximum voltage, the hysteresis, the magnitude of the ripple and the like. In exemplary embodiments, the values may be adjusted based on the operating conditions of the electronic device, characteristics of the oscillating energy supply, and the like. For example, the value of the $R_{HYST}$ resistor may be adjusted based on the peak voltage of the oscillating energy source.

The value of $R_{HYST}$ may be increased as the peak voltage of the oscillating energy source decreases.

In exemplary embodiments, a voltage reference for the comparator may be generated by an alternate circuit, DC-to-DC converters, a microprocessor with suitable analog-to-digital and digital-to-analog interfaces, or a battery instead or in addition to the resistor network described herein. In some embodiments, an electronic device may include a battery. The output voltage of the battery may be used as a reference voltage.

In exemplary embodiments, the analog circuits shown in FIG. 2C may be modified with alternative or complementary circuits and hysteresis methods including Schmitt triggers.

In exemplary embodiments, the functionality of the switching control element 204 may be implemented using a microprocessor and/or other digital and analog logic components. For example, similar functionality to the comparator may be implemented using analog to digital converters and a microprocessor. Analog to digital converters may be used to sample the voltage of the output of the rectifying diode $D_1$ and digitize the readings. The readings may be monitored and analyzed by a microcontroller. The readings may be monitored to determine if an upper/lower bound voltage threshold has been reached. When a threshold is reached, a control signal for the shorting circuitry may be generated by the microcontroller. In exemplary embodiments, the microcontroller and/or digital logic may track the frequency, timing, and/or other characteristics of the rectified voltage and may adjust the upper/lower bound thresholds. For example, when the upper/lower bound threshold values are reached at a frequency that is within a magnitude of the frequency of the oscillating energy source, the microcontroller may adjust the upper and/or lower bound threshold values to decrease the frequency.

In exemplary embodiments, the activation/deactivation of the shorting element 212 may be lower than the frequency of the oscillating energy source 208. In exemplary embodiments, the activation/deactivation of the shorting element 212 may be triggered primarily based on the upper/lower bound voltage thresholds. In exemplary embodiments, the activation/deactivation of the shorting element 212 may be synchronized with the oscillating energy source 208 to provide zero voltage/current switching at the shorting element 212. Switch $S_1$, for example, may be activated/deactivated during zero voltage/current conditions of the oscillating energy source 208.

Figure 3A:
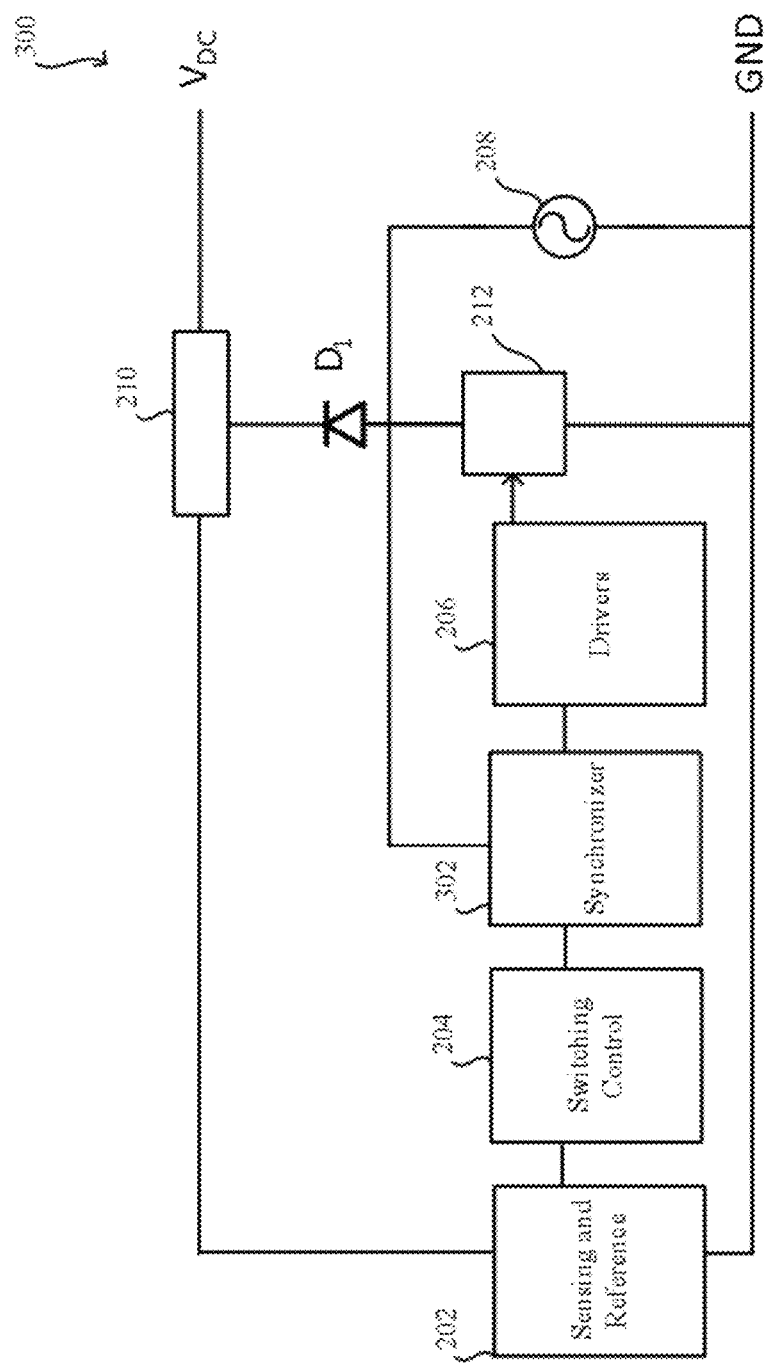
FIG. 3A is a schematic diagram showing an embodiment of an asynchronous rectifier with a synchronizer element.

FIG. 3A shows an exemplary embodiment of an asynchronous rectifier 300 with a synchronizer element 302 that may be used to synchronize the activation/deactivation of the shorting element with the oscillating energy source 208. The synchronizer element 302 may synchronize switching of one or more switches of the shorting element with zero voltage and/or zero current conditions of the oscillating energy source. The synchronizer element 302 may be implemented with analog and/or digital logic and/or circuitry. In exemplary embodiments, the synchronizer element 302 may be part of the switching control element 204. A microprocessor with analog to digital converters, for example, may monitor the oscillating energy input. When the input is at or near the zero value, an enable flag may be set to define when the activation/deactivation signal may be sent to the switching elements of the shorting element 212.

Figure 3B:
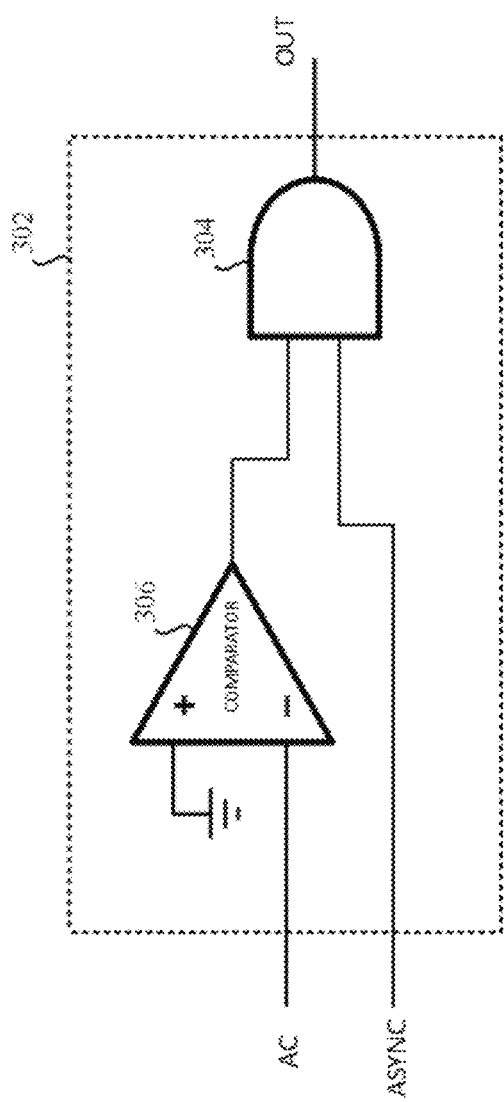
FIG. 3B is a schematic diagram showing an embodiment of a synchronizer element.

FIG. 3B shows one exemplary embodiment of the synchronizer element 302 comprising a comparator 306 and an AND gate 304. The control output (ASYNC signal) of the switching control 204 may be gated by the AND gate 304 until another signal to the AND gate 304 indicates a zero voltage/current condition. The signal indicating a zero voltage/current condition may be generated by the comparator 306. The comparator may take as input (AC signal) the oscillating energy source. The comparator may output a high signal when the voltage on the AC input is low thereby allowing the high ASYNC signal to propagate. Similar designs may be used for deactivation of the shorting element switches.

The foregoing descriptions of FIGS. 2A-2C and 3A-3B relate to exemplary embodiments based on half wave rectifier designs. It is to be understood that the asynchronous rectifier may also be based on a full wave rectifier. Control and shorting elements may be used to bypass rectifying diodes on both positive and negative portions of the voltage cycle of the oscillating source.

The foregoing descriptions of FIGS. 2A-2C and 3A-3B relate to exemplary embodiments of asynchronous rectifiers capable of regulating an output voltage. The asynchronous rectifiers may also regulate an output current. Currents at the output of the rectifier may be measured and the shorting circuit activated/deactivated based on upper/lower bound current thresholds.

In exemplary embodiments, an asynchronous rectifier may be directly coupled to an oscillating energy source. In exemplary embodiments, the oscillating energy source may include a magnetic resonator that is part of a wireless energy transfer system. The magnetic resonator may receive energy from another source via oscillating magnetic fields. In exemplary embodiments, the resonator may be coupled to the asynchronous rectifier via a matching network. The matching network connecting the resonator and the asynchronous rectifier may be configured with the operation of the rectifier in mind. The asynchronous rectifier may have different impedance characteristics depending on the activation/deactivation of the shorting element. Changes in the impedance of the asynchronous rectifier may affect the performance of the resonator and affect the efficiency of wireless energy transfer.

Figure 4:
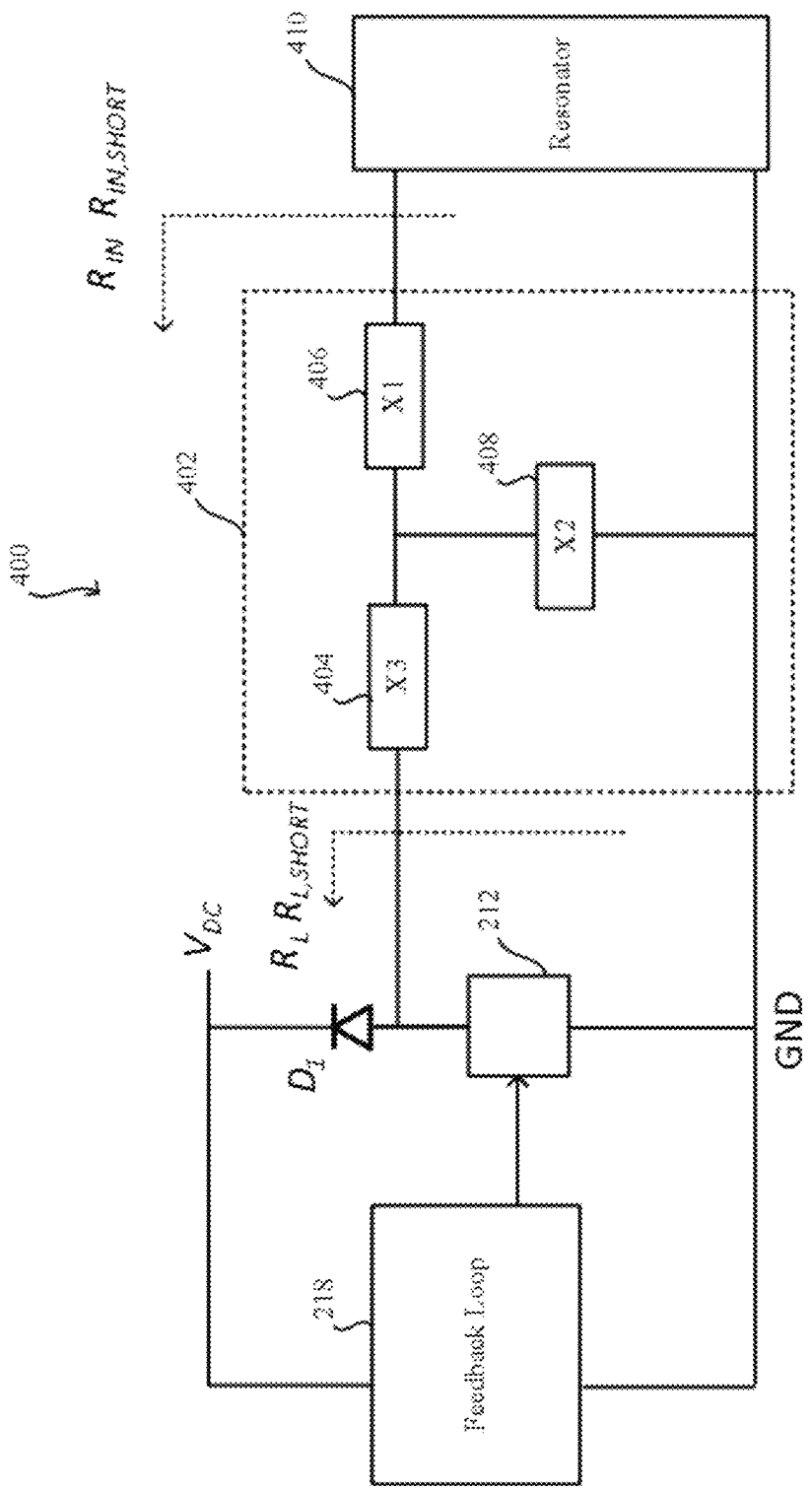
FIG. 4 is a schematic diagram showing an embodiment of an asynchronous rectifier with an impedance matching network.

FIG. 4 shows an exemplary embodiment of an asynchronous rectifier coupled to a resonator 410 via an impedance matching network 402. The impedance matching network may be configured to improve or optimize the efficiency of energy transfer to resonator 410 from a wireless magnetic field source. In exemplary embodiments, the load impedance of the asynchronous rectifier may be significantly lower when the shorting element 212 is activated compared to when the shorting element is deactivated. When the shorting element is deactivated, the load impedance $R_L$ may include the impedance of the electronic device that receives energy from the asynchronous rectifier. When the shorting element is activated, the load impedance $R_{L,SHORT}$ may be significantly lower. The lower load impedance may decrease the energy transfer efficiency during the time when the shorting element is activated. The impedance matching network may be configured such that when the shorting element is activated, the impedance $R_{IN,SHORT}$ as seen from resonator 410 through the impedance matching network is large. The impedance matching network 402 may be configured such that when the shorting element is deactivated, the impedance $R_{IN}$ as seen from resonator 410 through the impedance matching network is similar to the load impedance $R_L$.

In exemplary embodiments, impedance matching network 402 may be configured to minimize losses when the shorting element is activated. When the shorting element is activated no power is going to the electronic device at the $V_{DC}$ output, and the effective efficiency during this time may be zero.

As discussed above, the desired impedance characteristics to ensure efficient wireless power transfer may be achieved by impedance matching network 402. In exemplary embodiments, the elements of the impedance network $X_1$ 406 and $X_3$ 404 may provide an inductance and may include components such as inductors. Element $X_2$ 408 may provide a capacitance and may include components such as capacitors. In embodiments, the elements of the impedance matching network 402 may be selected to maximize the impedance $R_{IN,SHORT}$, via the following equation:

$$R_{IN,SHORT} = \frac{X_2^2 R_{L,SHORT}}{R_{L,SHORT}^2 + (X_2 + X_3)^2}$$

while satisfying $$R_{IN} = \frac{X_2^2 R_L}{R_L^2 + (X_2 + X_3)^2}.$$

Figure 5:
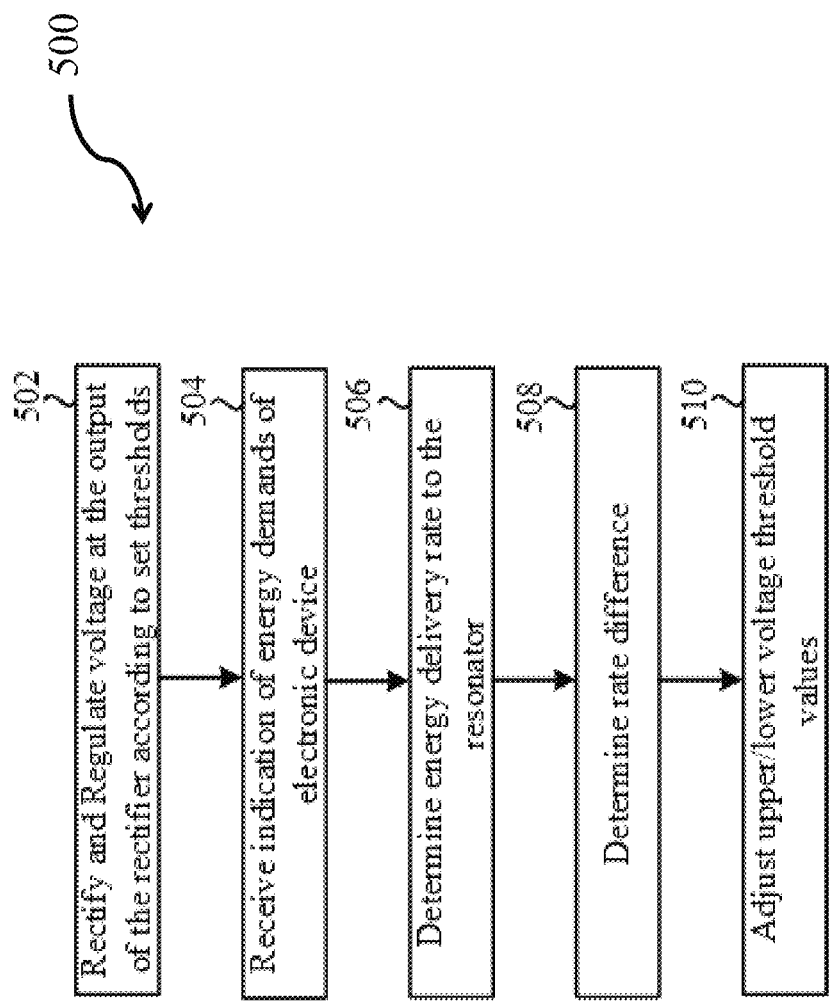
FIG. 5 is a flow chart showing a series of steps for adjusting upper/lower bound voltage thresholds in an asynchronous rectifier.

FIG. 5 illustrates a set of steps that are part of a method for adjusting upper/lower bound voltage thresholds in the feedback loop of the asynchronous rectifier. The upper/lower bound voltage thresholds that are used trigger the activation/deactivation of the shorting element may be adjusted based on electrical characteristics of the electronic device connected to $V_{DC}$, electrical characteristics of the resonator, and/or magnetic field characteristics. In step 502, the asynchronous rectifier may activate/deactivate the shorting element based on the upper/lower voltage thresholds. When the upper voltage threshold at the output of the rectifying element is reached, the feedback loop may activate the shorting element and deactivate the shorting element when the lower bound threshold is reached. In step 504, the feedback loop may receive an indication of the energy demands of the electronic device to which the asynchronous rectifier is connected at $V_{DC}$. In exemplary embodiments, a communication channel from the electronic device may indicate the energy demands of the device based on processor demands, user interaction, and/or the like. In exemplary embodiments, the energy demands of the electronic device may be estimated based on historical data of the energy demands based on time of the day, for example. In exemplary embodiments, the power consumption may be determined by measuring the current at the input of the electronic device. In step 506, the energy delivery rate to the resonator may be determined. The energy delivery rate may be determined by the peak voltages and/or currents on the resonator. In exemplary embodiments, an additional resonator or sensor may be used to measure magnetic field strength near the resonator. In exemplary embodiments, the field strength may be indicative of the energy delivered to the resonator. In step 508, the difference between the available energy transfer rate at the resonator and the energy transfer rate demanded by the electronic device may be determined and in step 510, the difference in energy (e.g., the difference in energy transfer rate) may be used to adjust the upper/lower bound voltage thresholds. In exemplary embodiments, a large difference between the energy demands of the electronic device and the energy delivered to the resonator may be used to increase the upper and/or decrease the lower voltage thresholds (i.e. increase the ripple at the output of the asynchronous rectifier). The changes in the thresholds may be configured to reduce the frequency of activation/deactivation of the shorting elements of the asynchronous rectifier. In exemplary embodiments, a small difference between the energy demand of the electronic device and the energy delivered to the resonator may be used to decrease the upper and/or increase the lower voltage thresholds. In exemplary embodiments, the thresholds may be adjusted to ensure the frequency of activation/deactivation of the shorting element is at least five or ten times or slower than the frequency of the oscillating energy at the input to the rectifier.

Desktop Applications

In exemplary embodiments, the asynchronous rectifier designs and methods described herein may be applied to wireless energy transfer in a variety of applications, including desktop applications.

A wireless energy transfer system for desktop applications may power or charge a plurality of electronic devices at the same time. The system may include one or more wireless energy sources to transfer energy to one or more wireless energy receivers or devices. Energy may be transferred to devices positioned on a desk, table, shelf, lab bench, or other surface. Electronic devices such as laptops, smartphones, tablets, computer peripherals, and the like positioned on or near the surface may wirelessly receive energy from an energy source below, near, or on top of the surface. A source may include one or more magnetic resonators that, during operation, couple and transmit power via an oscillating magnetic field to one or more electronic device magnetic resonators. The power transmitted may be sufficient and/or efficient enough to directly power or recharge electronic devices.

Wireless power transfer on desktops, tabletops, and in similar environments can be challenging using conventional methods due to the large combination of arrangements or use cases that may result. For example, a laptop, mouse, phone, and monitor may need to be powered or charged at the same time. The physical arrangement of the electronics on a wirelessly powered desktop or area may determine the efficiency of power transfer. The position, materials, distance of one device may affect the energy delivery to all the devices. The position of one device may change the power input to one or more devices. As devices are repositioned, their coupling with the source may change, affecting the efficiency and power input to the other devices.

In exemplary embodiments, the asynchronous rectifier described herein may be used to rectify and regulate the electrical energy received by the magnetic resonators of the electronic devices in a wireless power transfer system. In exemplary embodiments, the asynchronous rectifier may be configured to provide constant voltage/current to the electronic devices even when the power input to the resonators is changing and may have a wide variance. By using the asynchronous rectifiers disclosed herein, the power input variance to the electronic devices can be reduced. Reduced power variance may result in more efficient energy transfer and in less energy lost in regulating and rectifying components.

In exemplary embodiments, the power input variations in a desktop wireless energy transfer system may be reduced through appropriate resonator designs. In desktop applications, the design of resonators may take into account lossy environments, varying proximity of one or more devices to one or more sources, human interfacing including user safety, mobility of the system or the system's parts, and similar criteria. In exemplary embodiments, resonator design may vary according to the number of devices requiring power as well as the types of devices. In further exemplary embodiments, resonator designs may balance positional tolerance (maintaining a level of efficiency over varying positions) with achieving high efficiency at a single position or orientation.

In exemplary embodiments, one or more tunable capacitors may be part of a resonator and/or an impedance matching network. One or more tunable capacitors may be part of a source, a device, and/or a repeater in a wireless energy transfer system. Capacitance may be tuned, for example, in response to varying proximity of one or more devices to one or more sources, lossy environments, human interfacing including user safety, and/or mobility of the system or the system's parts. For example, a capacitance in a source may be tuned in response to the positioning of a device relative to the source. In another example, a capacitance in a source may be tuned in response to a lossy object, such as a metallic object, being brought near the wireless energy transfer system. In an exemplary embodiment, a tunable capacitor may include a bank of capacitors, where the capacitance of the bank is controlled by a switch. In some exemplary embodiments, a relay may be used to tune the capacitance. A switch or relay or similar component may be activated in response to a current or voltage measurement and may be controlled via a microcontroller. For example, current measurements may be taken at two points of the source-side impedance matching circuitry. In exemplary embodiments, the phase difference between the two current measurements may serve as a control signal for a relay (or switch or comparable component). The number of capacitors in a bank may be determined, for example, by cost, spatial constraints, power requirements, and/or degree of tunability. In exemplary embodiments, a tunable capacitor may be an augmentation to a fixed capacitance and may serve as a "fine-tuning" mechanism for tuning purposes. In exemplary embodiments, wireless desktop configurations may include a single device resonator in each device and a single source resonator.

Figure 6C:
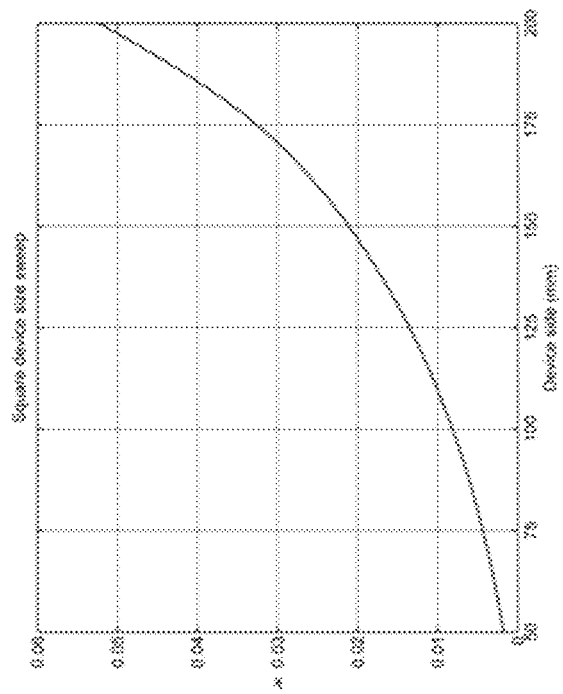
FIG. 6C is a plot showing the effect of device size on coupling.
Figure 6A:
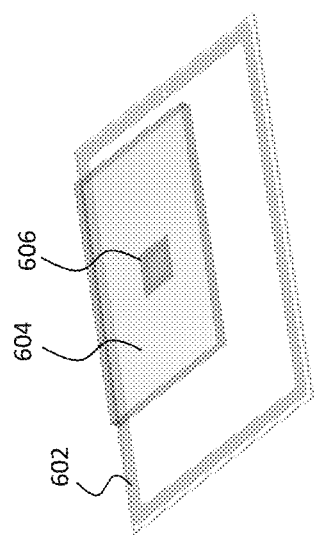
FIGS. 6A-B are schematic diagrams showing an embodiment of a desktop implementation of an asynchronous rectifier.
Figure 6B:
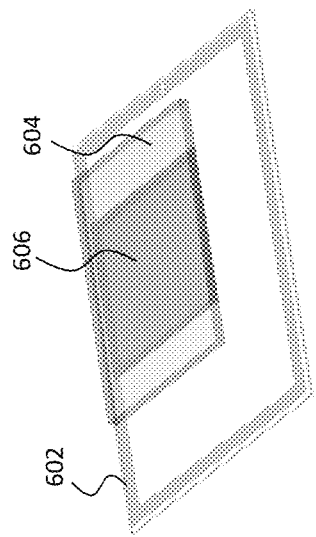

A desktop configuration with one source resonator coil 602 and one device resonator coil 606 attached to a device 604 is shown in FIG. 6A. The coupling k between the source coil 602 and device coil 606 may be affected by the relative size of the source coil 602 and device coil 606. The coupling may affect the energy transfer parameters and may affect the energy transfer efficiency and variance of changes in power delivery. The coupling between the source and the device may be increased by increasing the size of the device resonator. In the exemplary embodiment shown in FIG. 6A, coupling k may increase with an increase in device resonator size. FIG. 6B shows an exemplary embodiment of a device resonator with increased size, relative to FIG. 6A. FIG. 6C shows how coupling k changes as a function of the size of the device resonator coil relative to the size of the resonator coil for the configuration shown in FIGS. 6A-6B with a 500 mm by 350 mm source resonator coil. As shown in FIG. 6C, the coupling k between the source resonator coil 602 and the device resonator coil 606 may increase as the size of the square shaped device resonator coil increases.

Figure 7B:
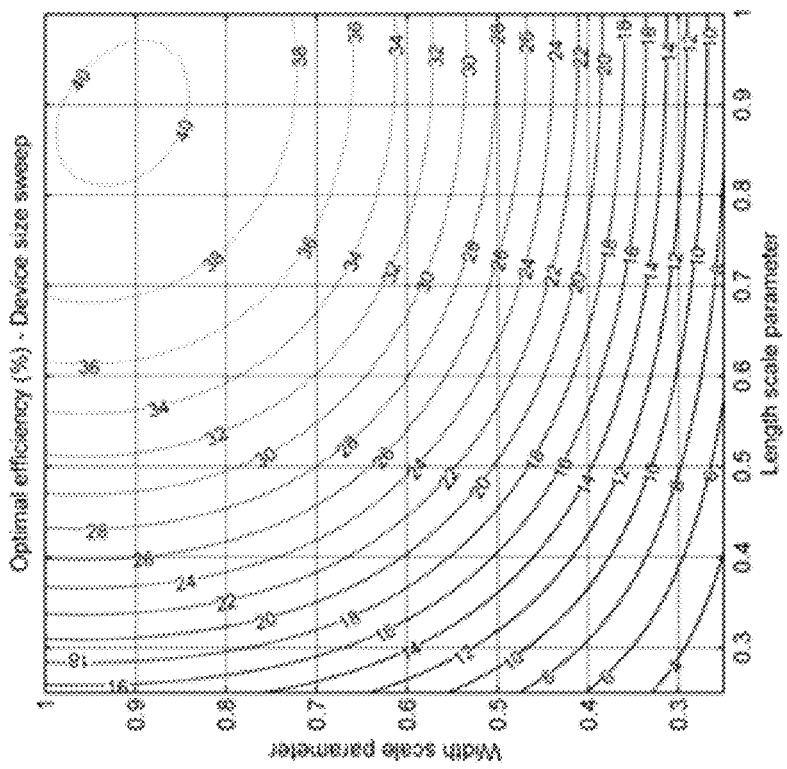
FIGS. 7A-B are plots showing the effect of device size on coupling.
Figure 7A:
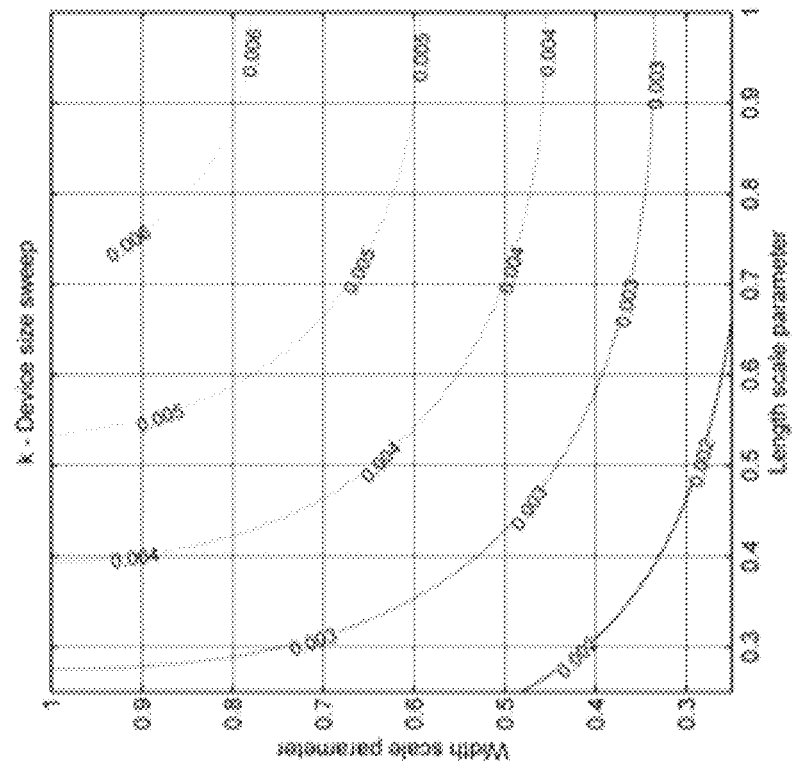

FIGS. 7A-7B show calculations of coupling k and energy transfer efficiency as functions of device length and width for the configuration shown in FIG. 6A. Wireless coupling and transfer efficiency increase as the size of the device resonator coil approaches the size of the source resonator coil.

In exemplary embodiments, the coupling k between the source coil 602 and device coil 606 may be affected by relative position of the device coil 606 with respect to the device 604. Device resonator coil 606 may be positioned in the middle of the device 604 as shown in FIG. 8A. In exemplary embodiments, the device resonator coil 606 may be positioned in various parts of an electronic device 604. FIG. 8B shows an exemplary embodiment of a device resonator coil 606 positioned in the corner of an electronic device 604.

Figure 8C:
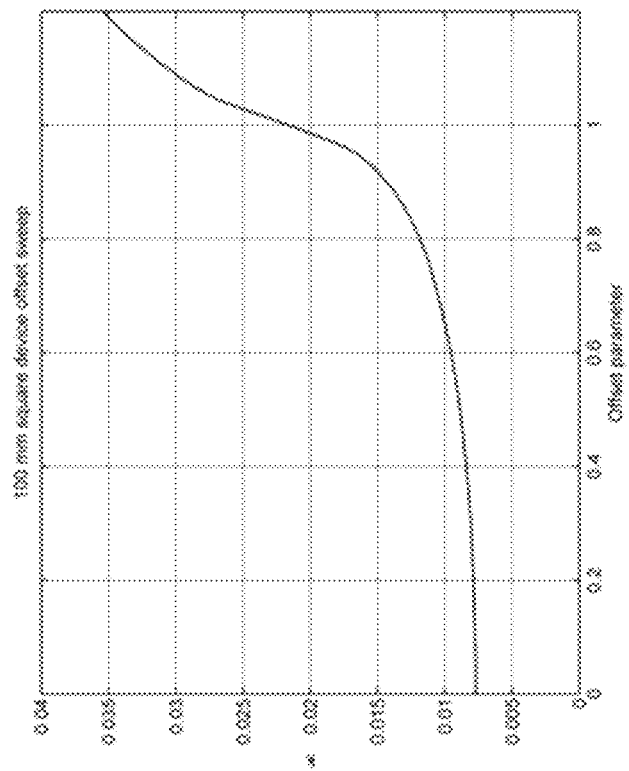
FIG. 8C is a plot showing the effect of device offset on coupling.
Figure 8A:
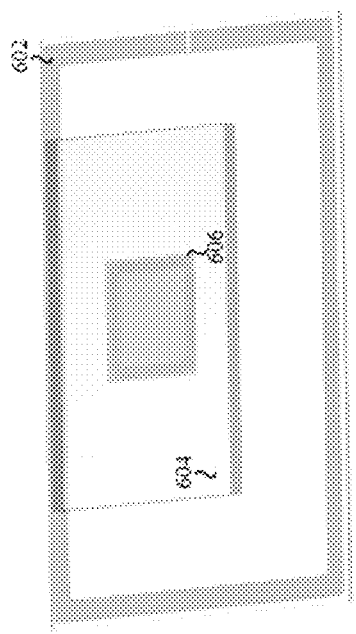
FIGS. 8A-B are schematic diagrams showing embodiments of a desktop implementation of an asynchronous rectifier.
Figure 8B:
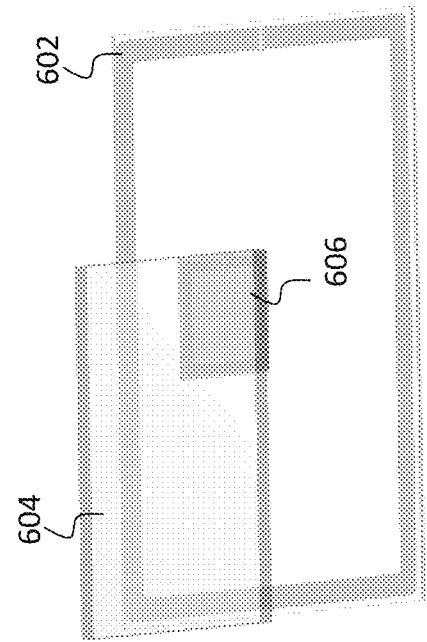

FIG. 8C shows the coupling k between the device resonator coil 606 and the source resonator coil 602 as a function of the position of the resonator coil 606 with respect to the device 604. The coupling increases with greater offset between the centers of the device resonator coil and the device. The offset parameter is determined by the position of the center of the device resonator coil 606 relative to the center of the device 604. In this exemplary embodiment, an offset parameter of 0 represents no offset between the center of the device 604 and resonator coil 606, while an offset parameter of 1 represents a maximum offset as shown when the resonator is positioned in the corner of the device 604 (FIG. 8B).

Wireless desktop configurations may include devices with more than one device resonator coil. Multiple device resonator coils may be positioned on or around a device. Multiple resonator coils may be selectively used and/or used in combination depending on their coupling, orientation, and/or position relative to the source resonator coil. In exemplary embodiments, devices with multiple device resonator coils may improve coupling with the source resonator coil and reduce or eliminate poor coupling due to null regions under various use-case scenarios and positions/orientations.

An exemplary desktop configuration with one source resonator coil 902 and two device resonator coils 904, 906 is shown in FIG. 9A. The device resonator coils 904, 906 may couple to a source resonator coil 902 even when positioned over a null region of the source resonator coil 902, as shown in FIG. 9B. The outputs of multiple device resonators may be electronically combined to deliver power to the device. FIG. 9C shows a further exemplary embodiment in which a device includes four device resonator coils 910, 912, 914, 916. In exemplary embodiments, a device may include configurations with one resonator coil and/or configurations with two or more resonator coils.

In exemplary embodiments, in wireless desktop configurations that include more than one device or source resonator coil, the multiple resonator coils may be positioned side by side to cover an area. In some embodiments, adjacent resonator coils may be positioned to overlap one another. For example, two source resonator coils may be placed such that coupling between them is minimized, i.e. they are in each other's dead spots. Such configurations are described further, for example, in U.S. Patent Application Publication No. 2013/0175874, the entire contents of which are incorporated herein by reference. The source resonator coils may be driven 90 degrees out of phase or driven at different times or with different phases with respect to each other to achieve spatially uniform coupling or more uniform magnetic field density between the source resonators and the device.

Figure 10:
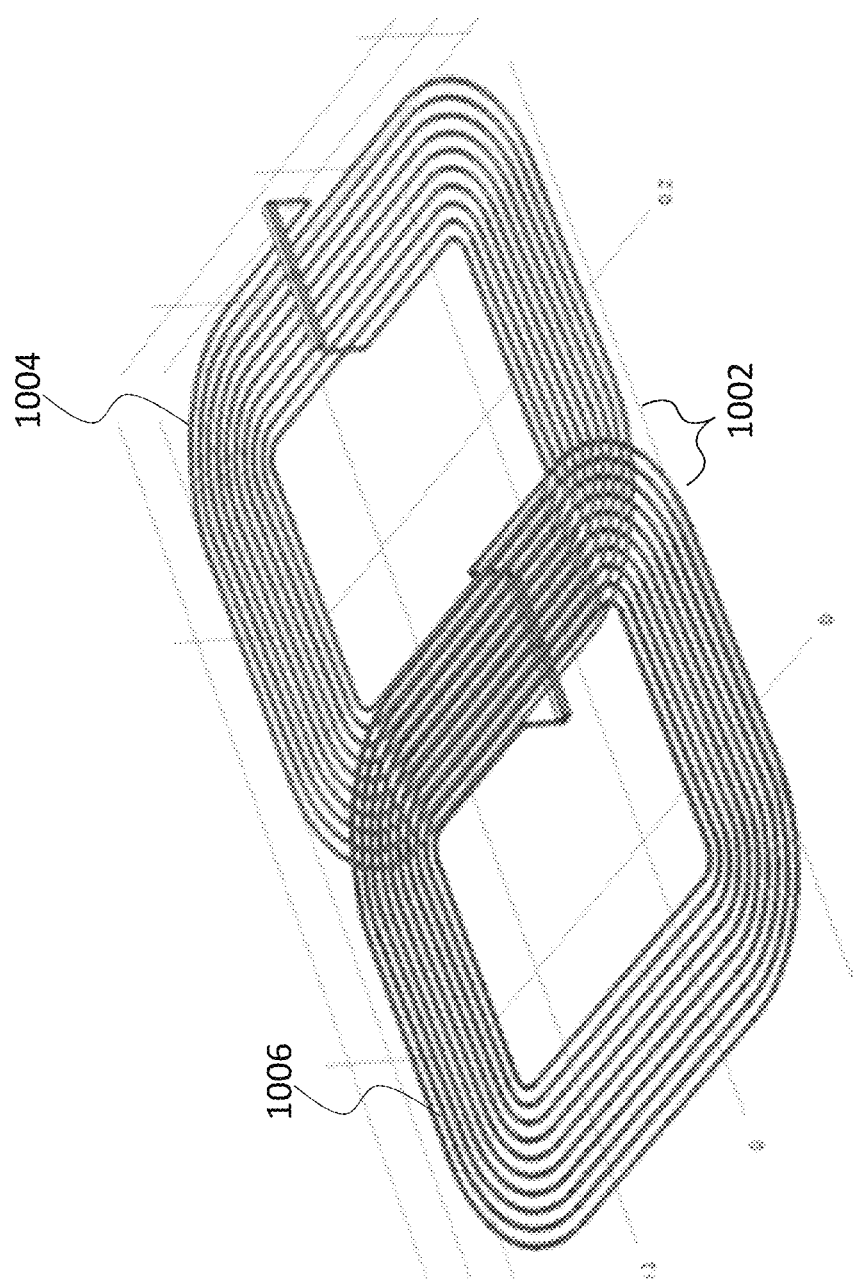
FIG. 10 is a schematic diagram showing an embodiment of a resonator with overlapping resonator coils.

FIG. 10 shows an exemplary embodiment of two overlapped source resonator coils 1004, 1006. The resonator coils 1004, 1006 overlap over a distance 1002 that spans a portion of their coil windings. This resonator coil arrangement may eliminate or reduce null spots over the area enclosed by the combined resonator coils of the source, relative to a configuration in which coils 1004 and 1006 do not overlap. Such an arrangement may provide for a uniform or near-uniform coupling over the area spanned or enclosed by the two resonator coils to other magnetic resonators of a wireless power transfer system.

Figure 11:
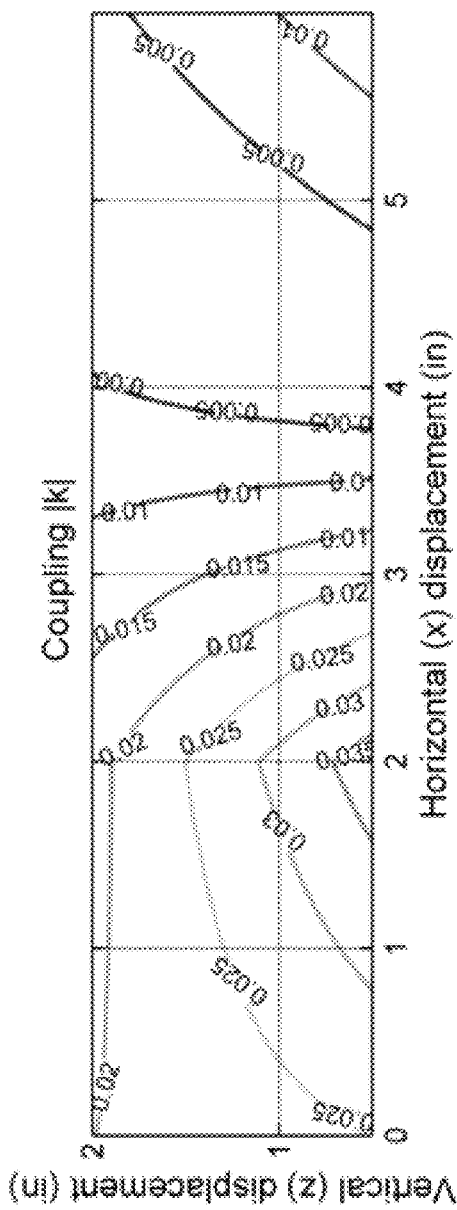
FIG. 11 is a plot showing coupling for a source with a single resonator coil as a function of vertical and horizontal displacement.
Figure 12B:
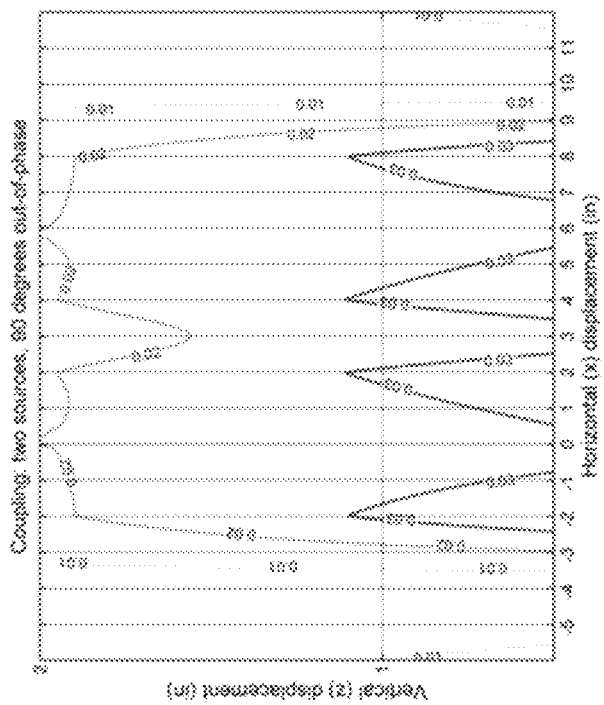
FIGS. 12A-B are plots showing coupling between a source and a device resonator coil as a function of vertical and horizontal displacement.
Figure 12A:
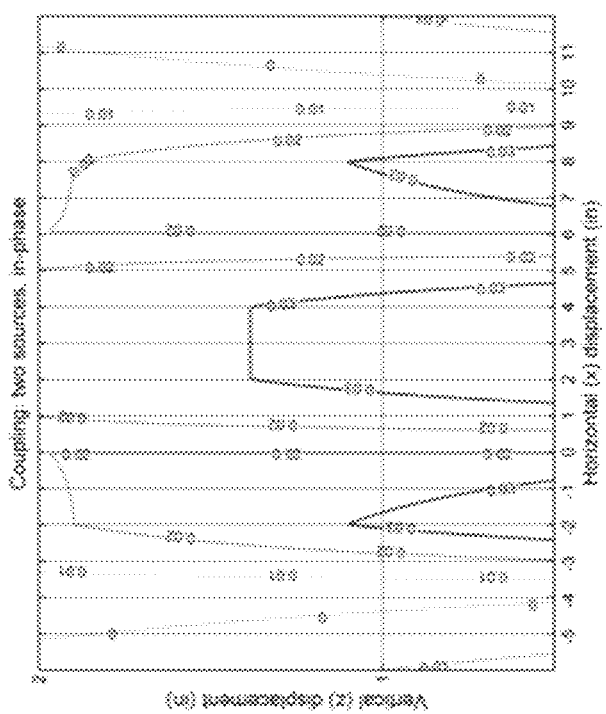

FIG. 11 shows simulated coupling coefficient magnitudes between a source and device, each with a single resonator. The graph shows the lack of uniformity in the coupling coefficient as the device is horizontally displaced from the center of the source coil (labeled "0" on the x-axis) to the edge of the source coil, decreasing from a coupling coefficient value |k| of 0.025 to 0.005. FIG. 12A shows simulated coupling coefficient values for a source and device, the source having two overlapped resonators similar to the resonators shown in FIG. 10 when the two resonators are driven in-phase and at the same drive frequency. In this exemplary embodiment, the coupling values are less uniform in some regions, such as in between the two coil centers. FIG. 12B shows simulated coupling values for a source and device, the source having two overlapped resonators as shown in FIG. 10 and driven with the same frequency but 90 degrees out-of-phase. In this exemplary embodiment, the coupling values are more uniform over horizontal displacements of the device over the source. Note there are no null spots in the coupling coefficient between the source and the device using the arrangement of source coil position and drive signals shown in FIG. 12B.

The design of a resonator coil may also impact the overall efficiency of power transfer in a wireless power transfer system. Design parameters of a device resonator coil may include size, shape, thickness, number of turns, density of the turns, span size, number of coils, and the like.

Resonators for use in desktop applications can, in some embodiments, include two sets of loops formed by one contiguous conductor. The two sets of loops can be positioned side by side and may spiral inwards in the same direction. Each loop in each set of loops can be positioned substantially off-center from other loops in the set, each inner loop of each set of conductor loops can be positioned off-center from the outer loop away from the second set of loops.

Figure 13:
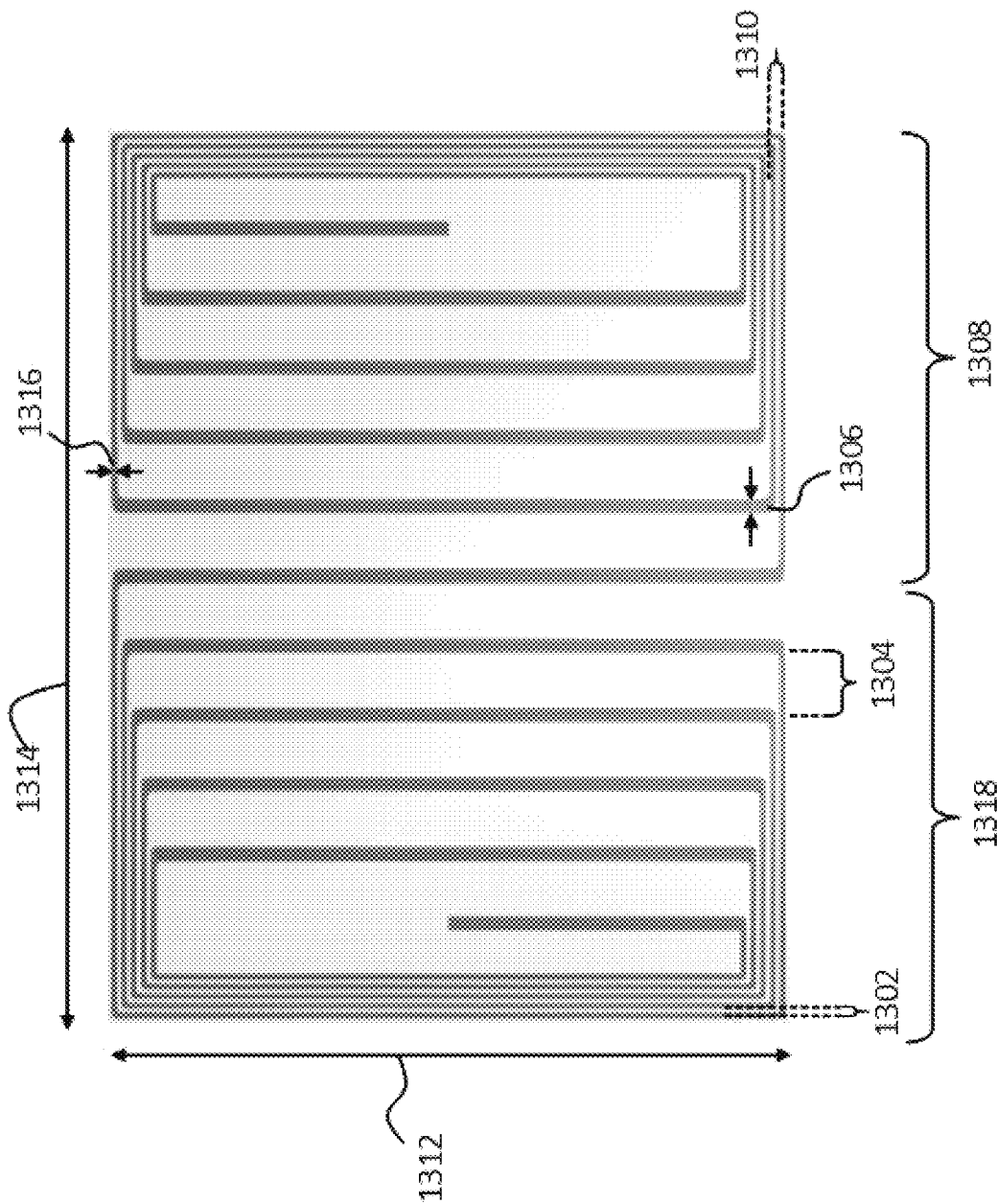
FIG. 13 is a schematic diagram showing an embodiment of a device resonator coil.

For example, FIG. 13 shows a resonator coil with two sets of loops 1318, 1308 formed by one contiguous conductor with both sets of loops spiraling inwards in a counterclockwise direction. Each set of loops 1318, 1308 includes five loops of an electrical conductor that spiral inwards. Each loop in each set of loops 1318, 1308 may not be concentric with the other loops in each set. As in the exemplary embodiment shown in FIG. 13, each conductor loop of each set of loops may be configured such that they are shifted off-center from the outer loop. In FIG. 13, the loops of the set of loops of 1318 are not concentric, but offset such that the loops are off-center away from the center of the set of loops 1308. Due to the off-center arrangement of the conductor coils, the spacing of loops relative to each other may be asymmetric. The spacing between adjacent loops may be larger on the side of the loops facing the other set of loops and smaller on the outside of the set of loops. For example, in the exemplary embodiment shown in FIG. 13, the spacing 1304 between the conductor of adjacent loops is larger on the side facing the other set of loops than the spacing on the outside of the conductor coil 1302, 1310. In exemplary embodiments, the width of the conductor forming the loops of each set of loops may be non-uniform and may change depending on the location of the conductor in each loop, and the like. For example, in the exemplary embodiment shown in FIG. 13, the width of the conductor forming the loops may be proportional to the spacing between the conductors of adjacent loops. The larger the spacing (e.g., where the loops are spaced by a distance 1304), the larger the width of the conductor. In areas where the spacing between the conductors is smaller (e.g., where the loops are spaced by a distance 1302), the width of the conductor traces may be relatively smaller.

In general, the resonator coil may be "anti-symmetric" along its length 1314. That is, the left side of the resonator coil may be similar to the right side of the coil but rotated 180 degrees. The span of the coil may be similar along the outermost edges, but more spread out in the center. The thickness of the coil may vary along its length; traces along the outer edges can be thinner, while traces in the middle region of the coil can be thicker. The density of the coil traces at the outer edge of the resonator coil can vary compared to the inner area of the resonator coil, to allow for generation of a more uniform magnetic field over the overall area of the resonator coil.

In exemplary embodiments, the resonator coil loops may have a rectangular shape as shown in FIG. 13. More generally, coil loops with oval, circular, triangular, and other shapes may also be used. In exemplary embodiments the two sets of loops may have different shapes. One set of loops may be rectangular while the other circular, for example. In exemplary embodiments, one sets of loops may have different dimensions and/or different number of loops than the other set.

Figure 14:
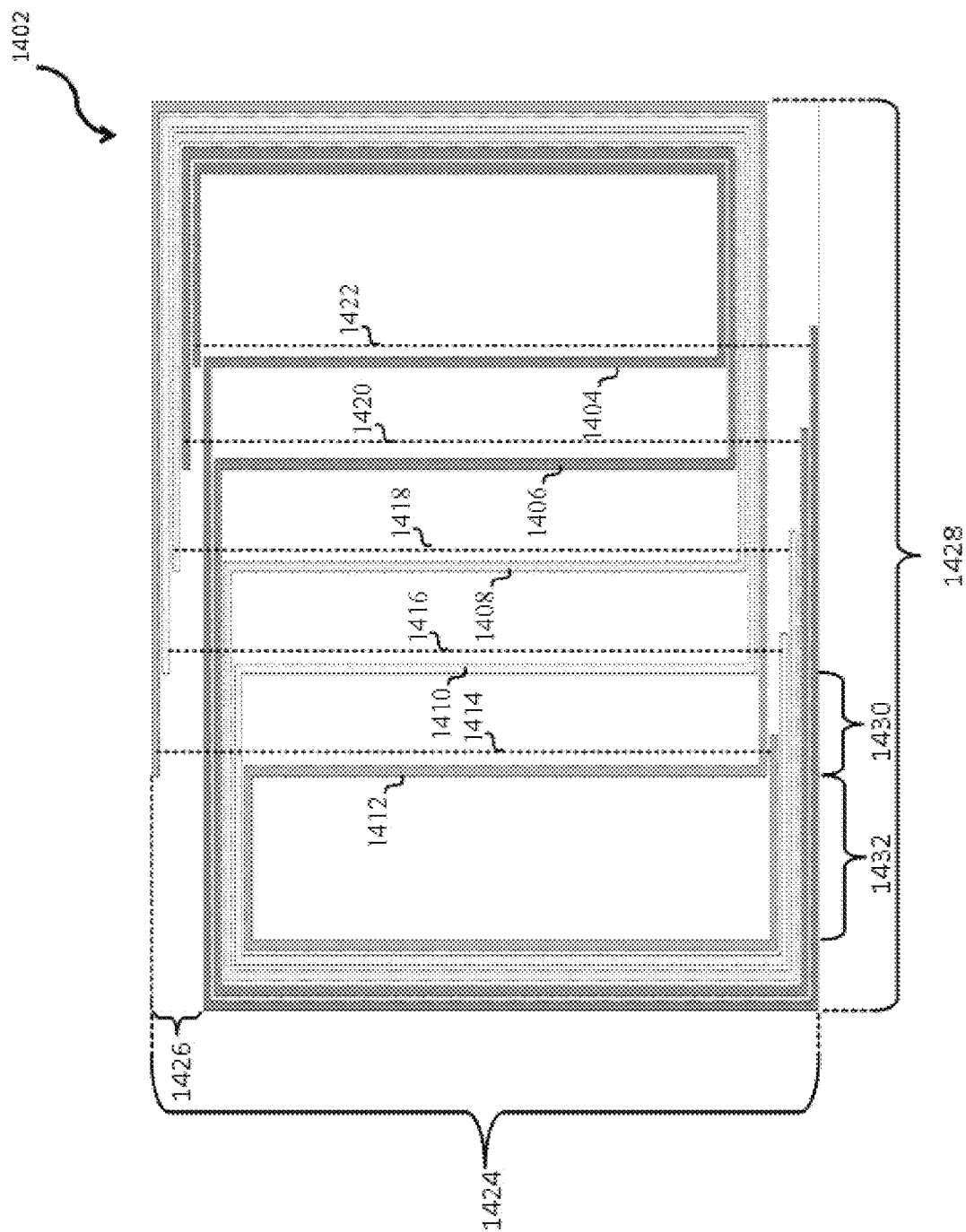
FIG. 14 is a schematic diagram showing an embodiment of a source resonator coil.

FIG. 14 shows an exemplary embodiment of a resonator coil design that may be used for a source resonator coil in various applications, including desktop applications. In this exemplary embodiment, the resonator coil 1402 includes more than one electrical conductor shaped to form one or more coils. In particular, each of the conductors in the resonator coil forms an "S" shape. The conductors are nested, forming a set of nested "S" shaped conductors. Each conductor is shaped or curved in one direction (e.g. clockwise) to form one loop and then shaped or curved in an opposite direction (e.g. counterclockwise) to form a second loop, forming an "S" shape. In exemplary embodiments, the conductors may be shaped to form loops that are substantially rectangular, circular, oval, or other shapes.

FIG. 14 shows an exemplary embodiment with five conductors forming five offset "S" shapes. The conductors 1404, 1406, 1408, 1410, 1412 are configured so that they are offset from one another. In exemplary embodiments, additional conductor traces 1414, 1416, 1418, 1420, 1422 may optionally be used to close the ends of the "S" shaped conductors. The additional conductor traces 1414, 1416, 1418, 1420, 1422 may be coupled to amplifiers and/or impedance matching networks. The ends of the conductors may be coupled to amplifiers and the conductors may be configured to be driven independently, in groups (e.g., in series or in parallel or a combination of series and parallel), and/or all at once.

In exemplary embodiments, the resonator coils shown in FIG. 14 may be implemented as a printed circuit coil with printed or etched conductor traces on a substrate such as a circuit board. The additional conductor traces 1414, 1416, 1418, 1420, 1422 may be formed or printed on a different conductor layer than the "S" shaped conductors 1404, 1406, 1408, 1410, 1412.

Figure 15:
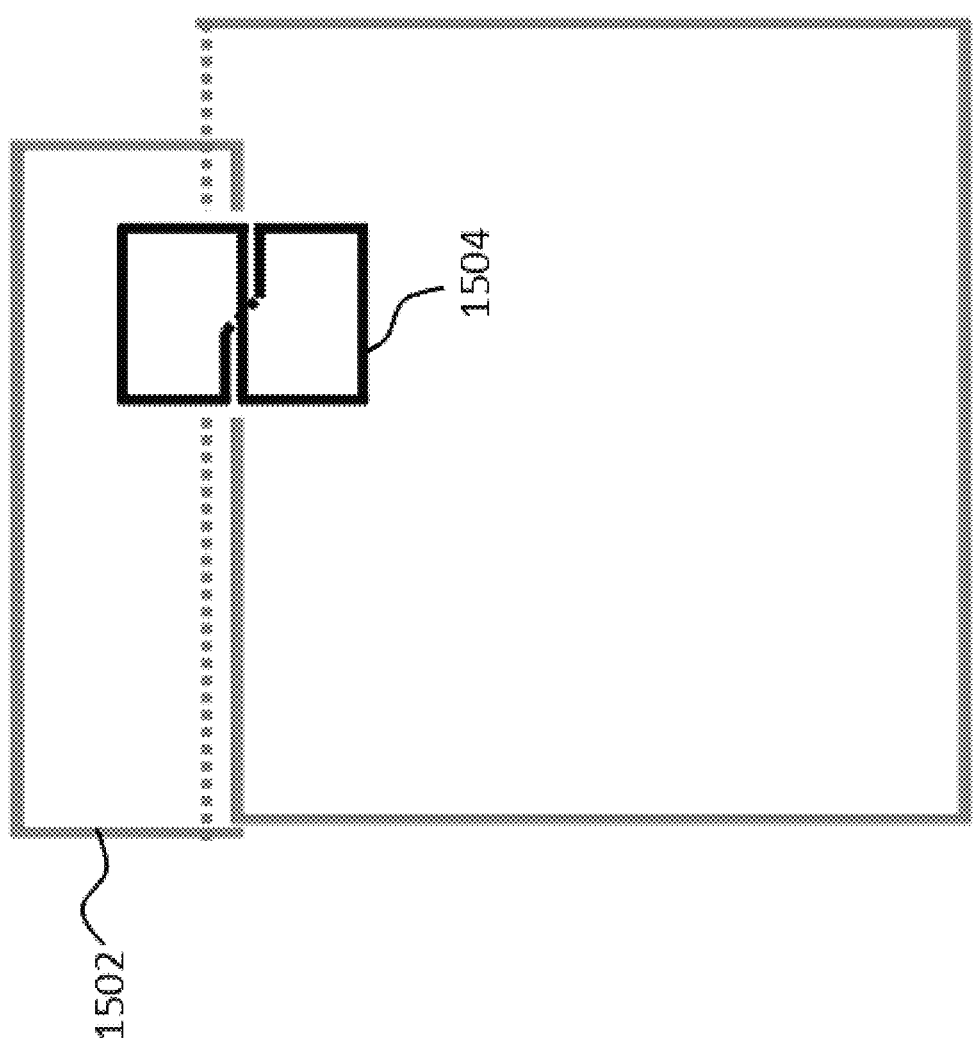
FIG. 15 is a schematic diagram showing an embodiment of a desktop with source and device resonator coils.

FIG. 15 shows an exemplary embodiment with an "S" shaped coil used for a source resonator coil 1502 and an "S" shaped coil used for a device resonator coil 1504.

In exemplary embodiments for use in desktop configurations, for example, metallic materials with good electrical conductivity such as aluminum, copper, gold, and the like may be used to shield a resonator coil. Sheets of an electrical conductor material may be placed under, near, or over a resonator coil to shape and/or minimize loss of the magnetic field near lossy materials. The size of the sheet of the conductor may be larger than the size of the resonator coils. The sheets of conductor may be positioned between a device and a device resonator coil.

Figure 16B:
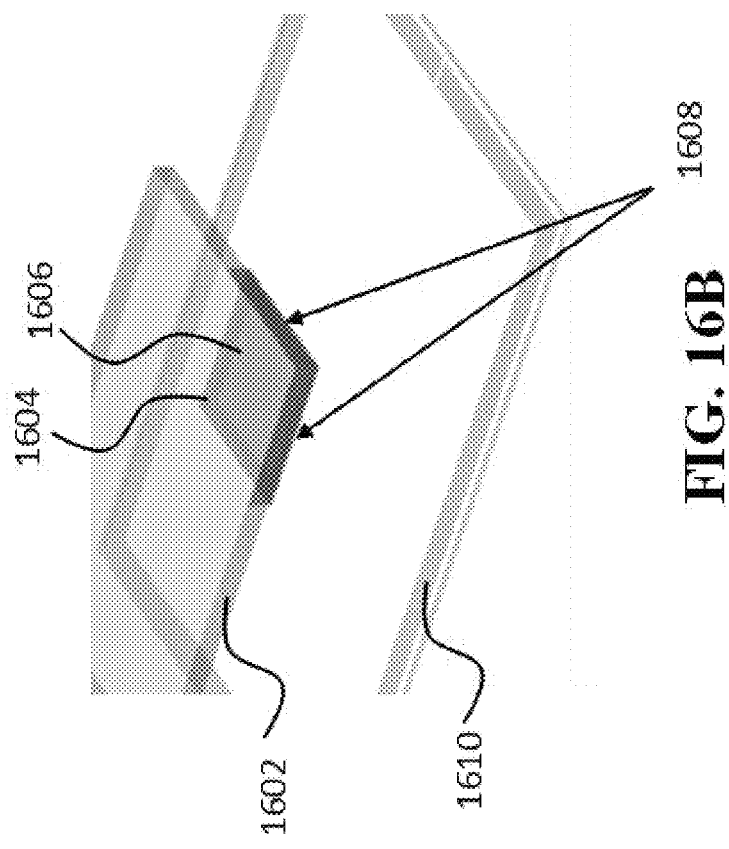
FIGS. 16A-B are schematic diagrams showing embodiments of a device resonator coil with flaps of magnetic material.
Figure 16A:
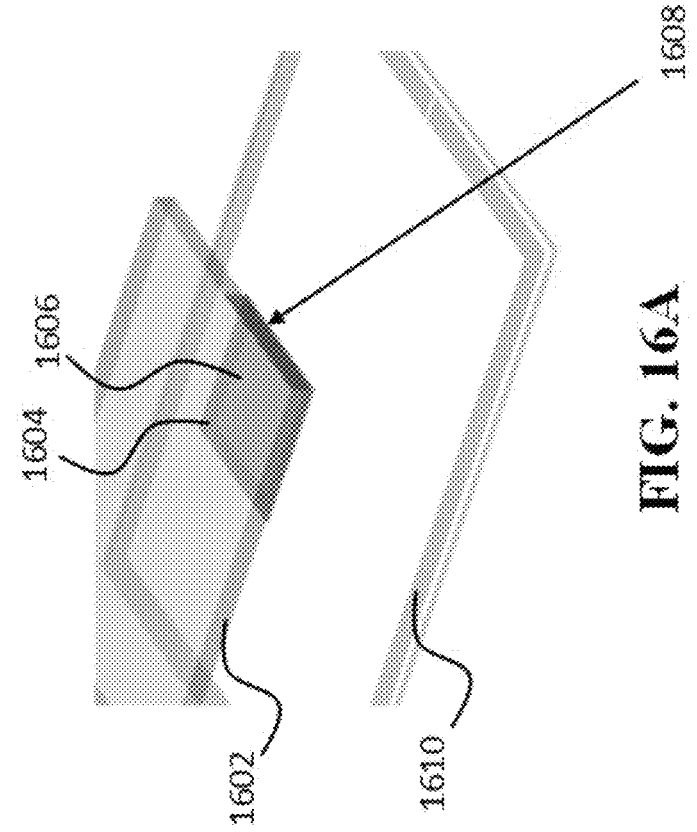

In exemplary embodiments, magnetic material such as ferrite may be used to shield the coil from metallic components of devices and sources, and electronics or other lossy materials. Sheets, tiles, pieces, and other fragments of magnetic material may be positioned between the resonator coils and lossy materials. In exemplary embodiments, the magnetic material may be shaped or configured with flaps or edges that overhang and/or wrap around the device coil. FIG. 16A shows an exemplary embodiment of a resonator coil with a flap 1608 (shown as a darker material) around one edge of the device 1602. FIG. 16B shows an exemplary embodiment of a resonator coil with two flaps 1608 around two edges of the device 1602. The addition of two flaps formed of magnetic material has been shown to provide over 40% improvement in the coupling coefficient over a configuration with no flaps.

In exemplary embodiments, greater coil-to-coil coupling efficiencies may be gained using a combination of methods. FIGS. 17A-E show various exemplary embodiments of a device resonator coil and magnetic material that improve coil-to-coil coupling efficiency. FIG. 17A shows a first exemplary embodiment in which the resonator coil 1704 is placed near the edge of the apparatus 1702; FIG. 17B shows another exemplary embodiment in which magnetic material 1706 is used as an overhang; FIG. 17C shows another exemplary embodiment in which magnetic material 1708 forms both a bridge (between the overhang material and the resonator coil which is sitting on top of a layer of magnetic materials) and an overhang; FIG. 17D shows another exemplary embodiment in which the resonator coil 1704 abuts the magnetic material overhang 1710; FIG. 17E shows another exemplary embodiment in which the resonator coil 1704 is wrapped over the corner of the apparatus. In these exemplary embodiments, for a separation of 25 mm between a source and device, the coil-to-coil efficiency in the exemplary embodiments shown in FIGS. 17D-E may be greater than those shown in FIGS. 17A-C. Without wishing to be bound by theory, it is believed that this may be due to the positioning of the resonator 1704, which is nearer the edge of the apparatus 1702 in FIGS. 17D-17E.

In exemplary embodiments, magnetic material may be used to shape magnetic fields to preserve or increase wireless power coupling efficiency. FIG. 18A shows an exemplary embodiment of a device resonator with magnetic material placed below the resonator coil 1808, between the resonator coil 1808 and the device 1802. FIG. 18B shows a variation to that exemplary embodiment where the magnetic material 1804 has been extended out from beneath the coil 1808 and positioned to one side of the device 1802 as a single "bridge" to the edge of the device 1802. FIG. 18C shows a further exemplary embodiment where the magnetic material is arranged as a dual "bridge" 1810 that is constructed to cover an area that runs along the length of the device 1802. Additionally, there may be overhangs 1806 made from magnetic material and/or portions of resonator coils in both FIGS. 18B-18C that further provide shielding and/or shaping and/or enhanced coupling to the magnetic field of the wireless power transfer system. Similarly, FIG. 18D shows an exemplary embodiment of a device resonator with magnetic material placed below the resonator coil 1808, between the resonator coil 1808 and the device 1802. In this exemplary embodiment, the length 1812 of the resonator coil 1808 has been increased as compared to the resonator coil 1808 shown in FIG. 18A. FIG. 18E shows an exemplary resonator embodiment that includes magnetic material shaped as a single "bridge" 1804 and an increased resonator coil length 1812. FIG. 18F shows an exemplary resonator embodiment featuring magnetic material shaped as a dual "bridge" 1810 and an increased resonator coil length 1812.

Figure 19:
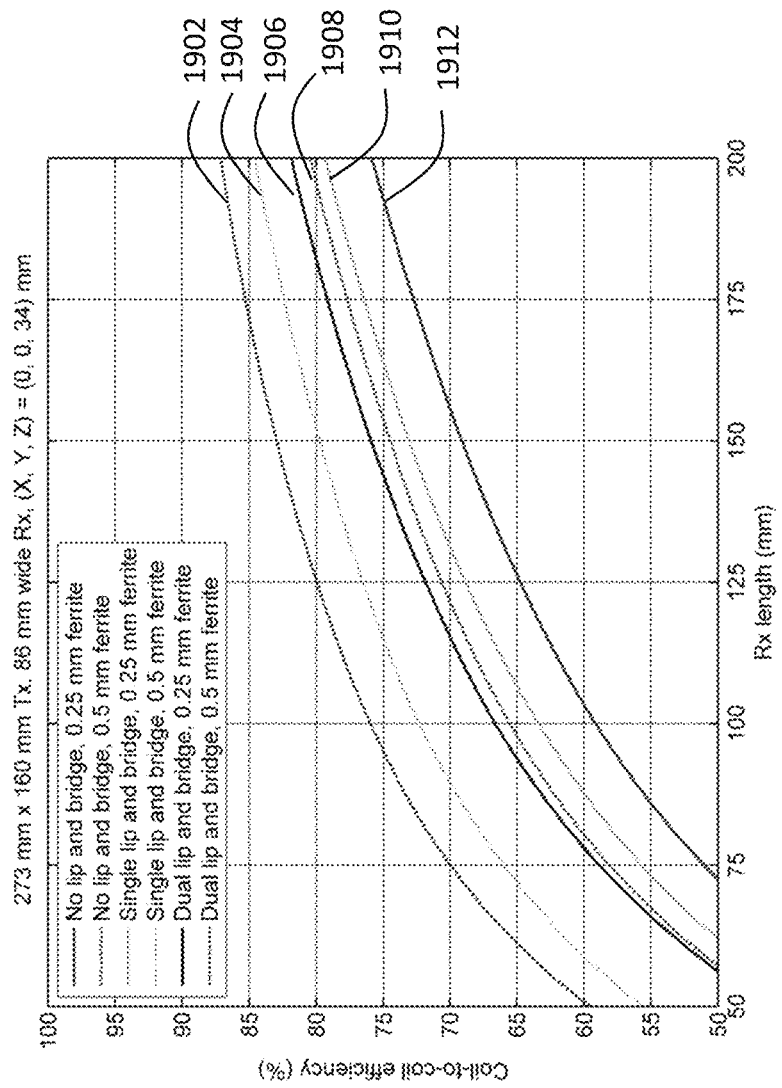
FIG. 19 is a plot showing coil-to-coil efficiency as a function of device resonator size.

FIG. 19 shows the calculated coil-to-coil coupling efficiency values in a wireless energy transfer system that includes a source and a device similar to the exemplary embodiments shown in FIGS. 18A-F. The source resonator has dimensions of 273 mm by 160 mm whereas the device resonator has a fixed width of 86 mm and variable length between 50 mm-200 mm. The coil-to-coil efficiency values are plotted as a function of device resonator coil length 1812. As resonator coil length 1812 is increased from 50 mm (as shown in FIGS. 18A-C) to 200 mm (as shown in FIGS. 18D-F), efficiency values increase. Coil-to-coil coupling efficiency values are plotted for each magnetic material configuration shown in FIGS. 18A-C and FIGS. 18D-F. For the arrangement shown in FIG. 18A and FIG. 18D, i.e., no bridge and with 0.25 mm thick ferrite and 0.5 mm thick ferrite positioned under the resonator coil, the predicted coupling efficiencies are shown by traces 1912 and 1908 respectively. For the arrangement shown in FIG. 18B and FIG. 18E, i.e., single bridge, 0.25 mm thick ferrite and 0.5 mm thick ferrite results are shown in traces 1910 and 1904 respectively. For the arrangement shown in FIG. 18C and FIG. 18F, i.e. dual bridge, 0.25 mm thick ferrite and 0.5 mm thick ferrite are shown in traces 1906 and 1902 respectively.

Figure 20A:
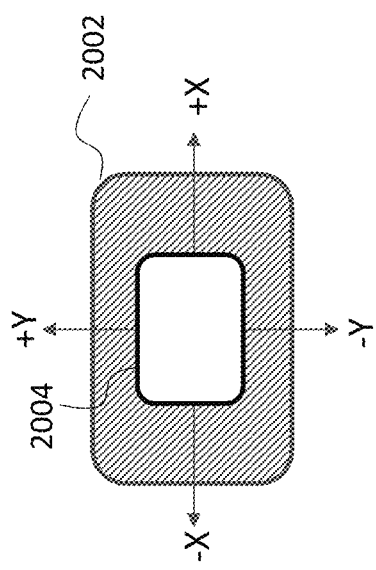
FIG. 20A is a schematic diagram showing an embodiment of a wireless energy transfer system.
Figure 20C:
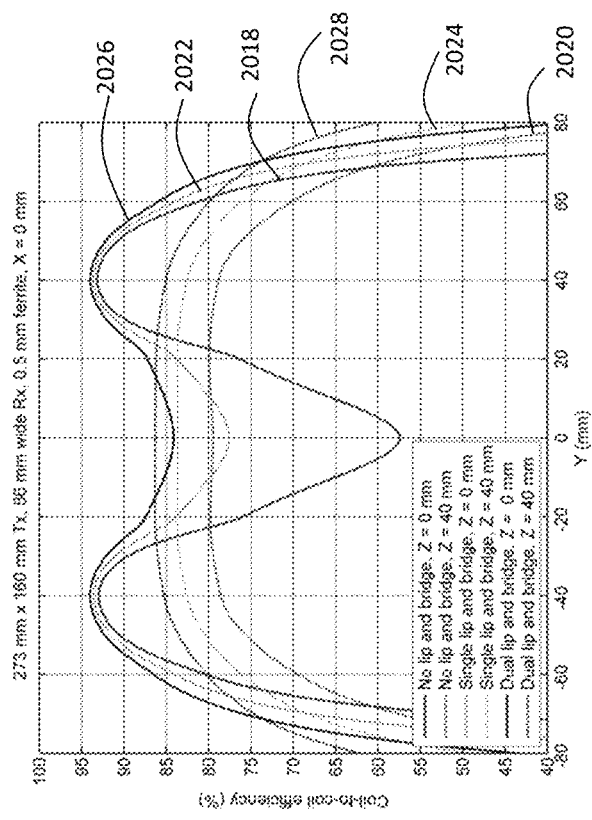
FIGS. 20B-C are plots showing coil-to-coil efficiency as a function of device position.
Figure 20B:
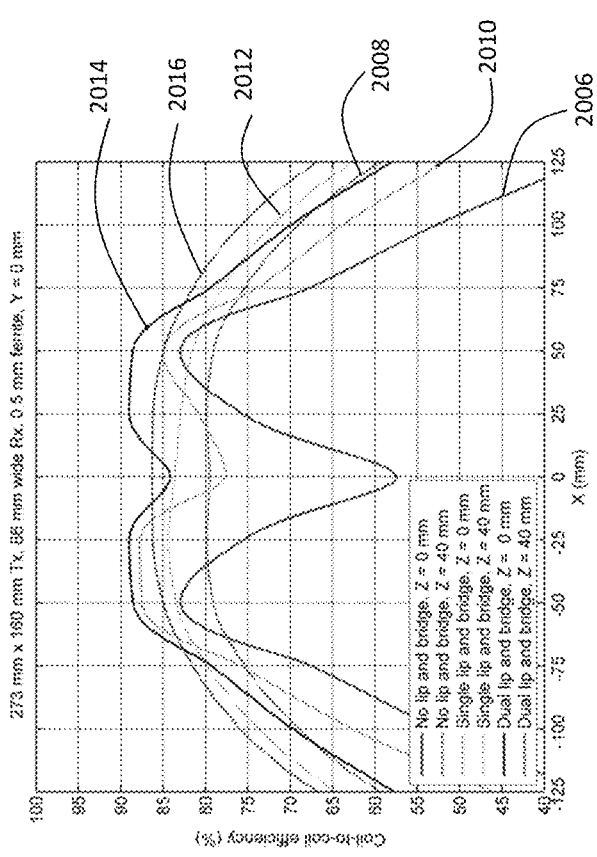

FIG. 20A shows a schematic diagram of an embodiment of a wireless energy transfer system that includes a source resonator 2002 and a device resonator 2004 in a Cartesian (X-Y) coordinate system. FIGS. 20B-C show coil-to-coil efficiency values for device resonator 2004 as a function of position relative to the center of source resonator 2002. Note that for this exemplary embodiment the device resonator 2004 has fixed dimensions of 200 mm by 86 mm while the source resonator 2002 has fixed dimensions of 273 mm by 160 mm. FIG. 20B shows coil-to-coil efficiencies as a function of position along the X-axis for exemplary magnetic material configurations shown in FIGS. 18A-C. For the arrangement shown in FIG. 18A, i.e., 0.5 mm thick ferrite positioned under the resonator coil without a bridge, where the device resonator is at heights of 0 mm and 40 mm away from the source resonator, the predicted coupling efficiencies are shown by traces 2006 and 2008 respectively. For the arrangement shown in FIG. 18B, i.e., single bridge of 0.5 mm thick ferrite positioned under the resonator coil, where the device resonator is at heights of 0 mm and 40 mm away from the source resonator, the predicted coupling efficiencies are shown by traces 2010 and 2012 respectively. For the arrangement shown in FIG. 18C, i.e., dual bridge of 0.5 mm thick ferrite positioned under the resonator coil, where the device resonator is at heights of 0 mm and 40 mm away from the source resonator, the predicted coupling efficiencies are shown by traces 2014 and 2016 respectively. In these exemplary embodiments, a source with dual bridge and overhang or "lip" produces the best coil-to-coil efficiency for a span of positions in the X-axis.

FIG. 20C shows coil-to-coil efficiencies as a function of position in the Y-axis for the exemplary magnetic material configurations shown in FIGS. 18A-C. For the arrangement shown in FIG. 18A, i.e., 0.5 mm thick ferrite positioned under the resonator coil without a bridge, where the device resonator is at heights of 0 mm and 40 mm away from the source resonator, the predicted coupling efficiencies are shown by traces 2018 and 2020 respectively. For the arrangement shown in FIG. 18B, i.e., single bridge of 0.5 mm thick ferrite positioned under the resonator coil, wherein the device resonator is at heights of 0 mm and 40 mm away from the source resonator, the predicted coupling efficiencies are shown by traces 2022 and 2024 respectively. For the arrangement shown in FIG. 18C, i.e., dual bridge of 0.5 mm thick ferrite positioned under the resonator coil, wherein the device resonator is at heights of 0 mm and 40 mm away from the source resonator, the predicted coupling efficiencies are shown by traces 2026 and 2028 respectively. In these exemplary embodiments, a source with dual bridge and overhang or "lip" produces the best coil-to-coil efficiency for a span of positions in the Y-axis.

Figure 21B:
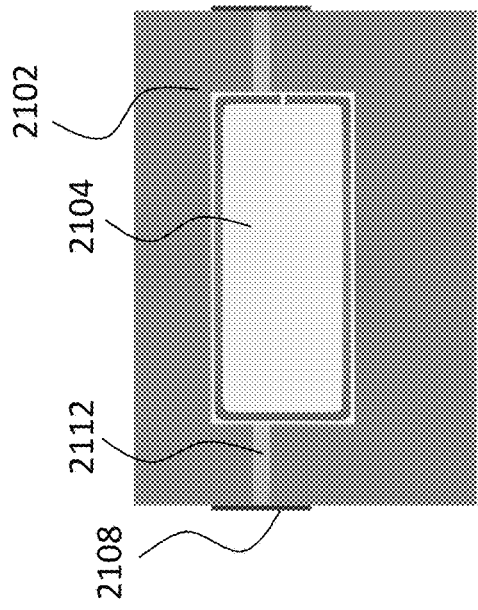
FIGS. 21A-D are schematic diagrams showing different examples of magnetic material configurations.
Figure 21D:
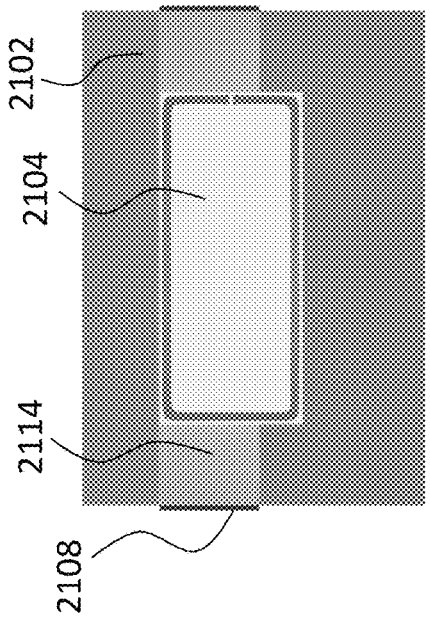
Figure 21A:
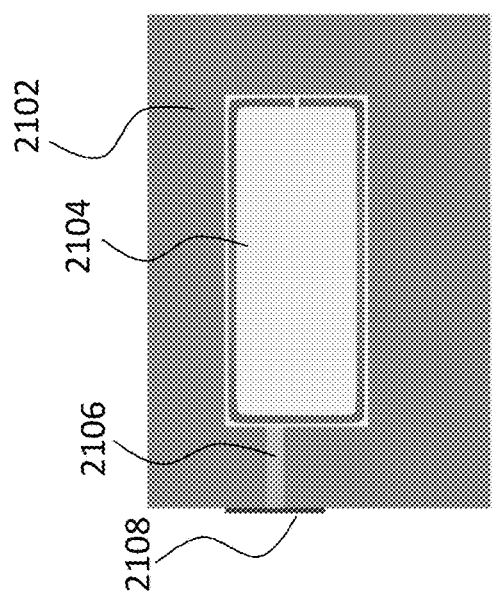
Figure 21C:
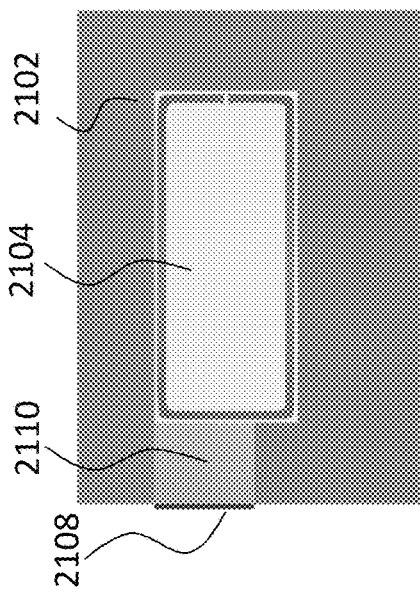

In exemplary embodiments, the width of a bridge made of magnetic material may also affect efficiency of energy transfer. FIGS. 21A-B show examples of devices 2102 with device resonators 2104 that include a thin bridge of magnetic material, single 2106 and dual 2112, respectively. FIGS. 21C-D show device resonators 2104 with a thicker bridge of magnetic material, single 2110 and dual 2114, respectively.

Figure 22:
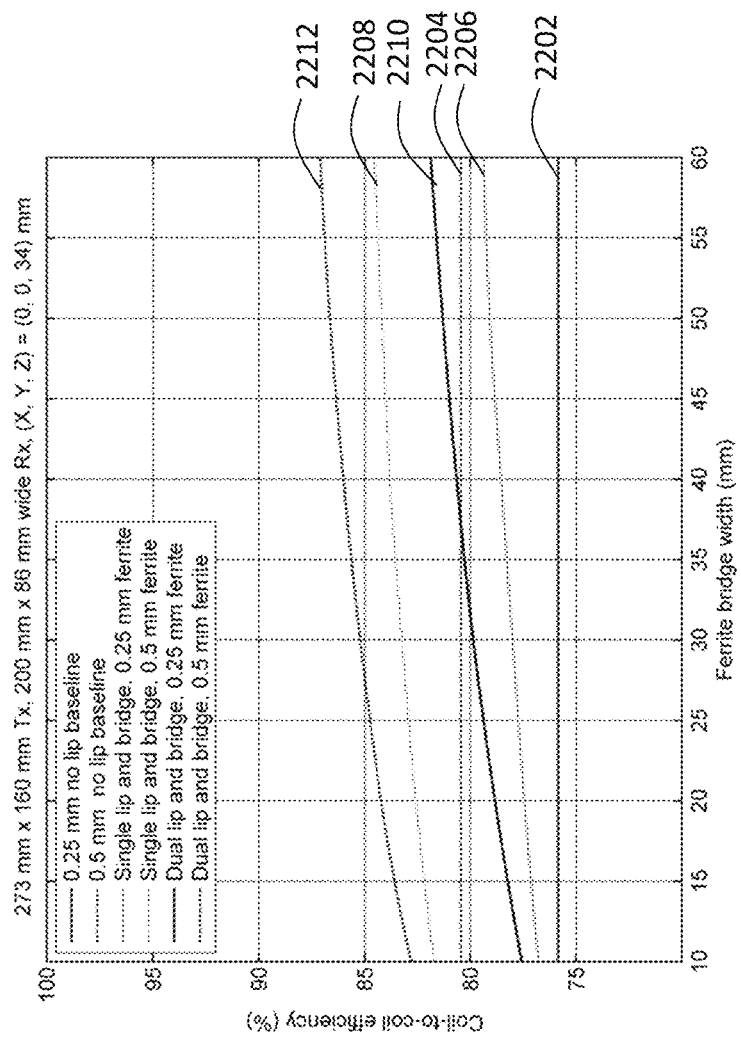
FIG. 22 is a plot showing coil-to-coil efficiency as a function of magnetic material width.

FIG. 22 shows the coil-to-coil coupling efficiency values of the exemplary embodiments shown in FIGS. 21A-21D. FIG. 22 also shows the coil-to-coil coupling efficiency values of a "baseline" measurement of a device resonator with magnetic material that has no bridge or overhang configuration. For a device resonator with magnetic material of 0.25 mm and 0.5 mm thickness, efficiencies are shown in traces 2202 and 2204 respectively. For the arrangement shown in FIG. 21A and FIG. 21C, i.e., a single bridge of 0.25 mm thick ferrite and 0.5 mm thick ferrite, efficiencies are shown in traces 2206 and 2208 respectively. For the arrangement shown in FIG. 21B and FIG. 21D, i.e., a dual bridge of 0.25 mm thick ferrite and 0.5 mm thick ferrite, efficiencies are shown in traces 2210 and 2212 respectively.

Figure 23B:
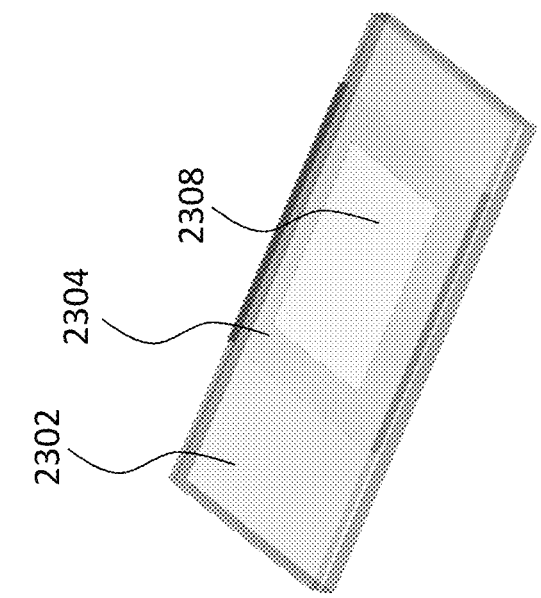
FIGS. 23A-B are schematic diagrams showing different examples of magnetic material configurations.
Figure 23A:
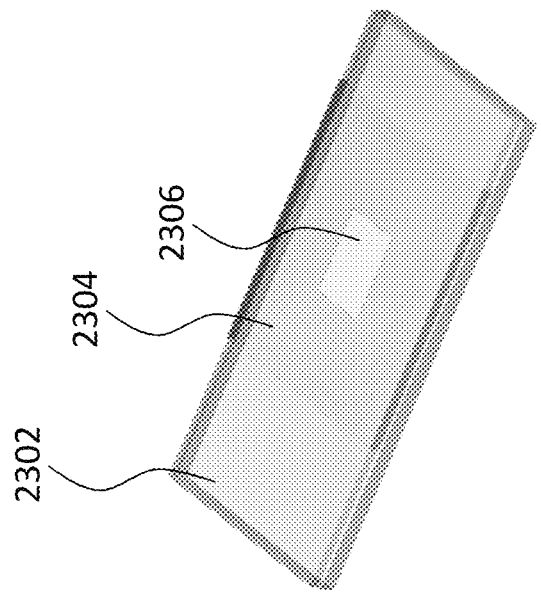
Figure 24:
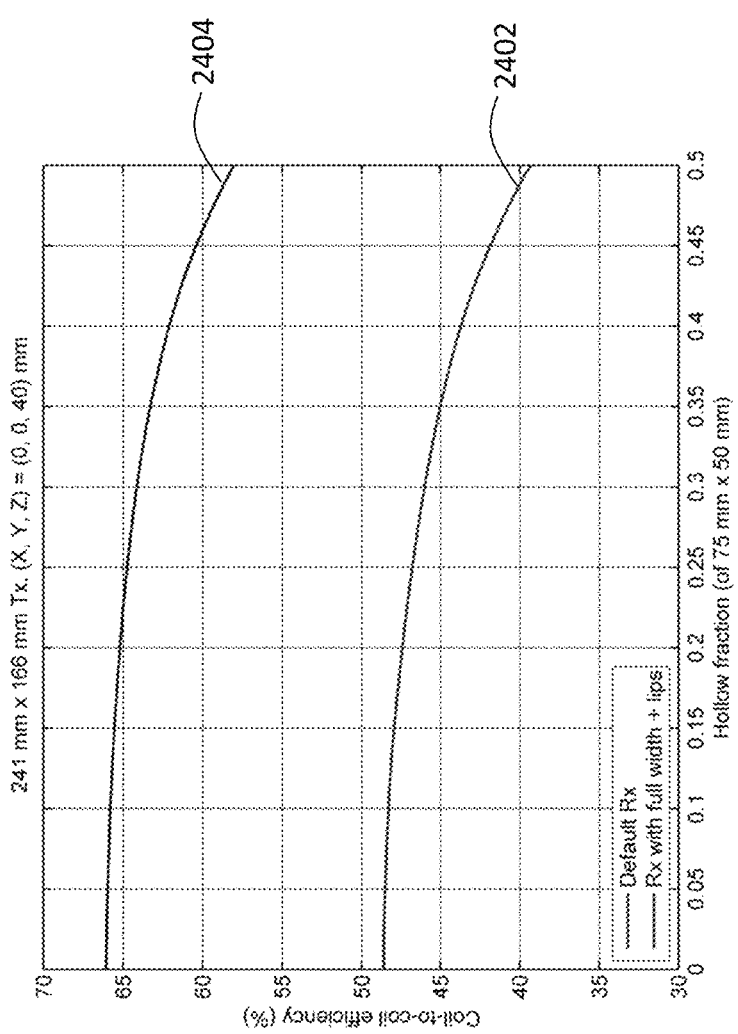
FIG. 24 is a plot showing coil-to-coil efficiency as a function of hollow fraction of a magnetic material.

In exemplary embodiments, the shape of magnetic material may be varied to realize certain performance and/or system parameters such as energy transfer efficiency, resonator weight, resonator cost, and the like. For example, FIGS. 23A-B show two exemplary resonator embodiments in which the weight has been reduced by using magnetic material structures 2304 that have been hollowed out near their centers. In FIG. 23A, 10% of a 75 by 50 by 0.25 mm³ volume 2306 of magnetic material 2304 has been removed from near the center of the slab of magnetic material used on a device resonator 2302. In FIG. 23B, 50% of a 75 by 50 by 0.25 mm³ volume 2308 of magnetic material 2304 has been removed from near the center of the slab of magnetic material used on a device resonator 2302. FIG. 24 shows the coil-to-coil coupling efficiency of the device resonator as a function of the fraction of the magnetic material slab that has been hollowed out. As this fraction increases, the coil-to-coil efficiency decreases. The efficiency calculations shown are for a device with magnetic material that does not cover the width of the device (plot 2402) and a device with magnetic material that covers the width of the device and has overhang (plot 2404). There is a marked increase in the coil-to-coil efficiency for a device with magnetic material that covers the width of the device and has an overhang, as shown in FIGS. 23A-B.

Figure 25A:
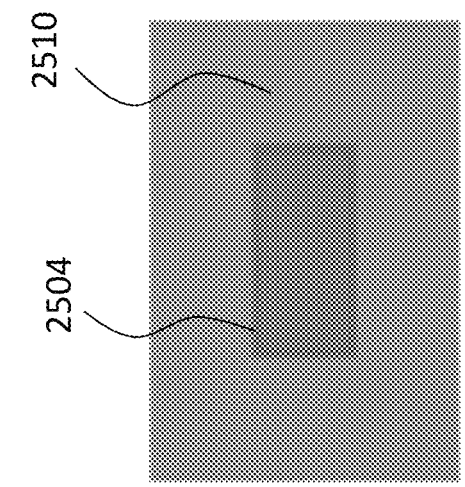
FIGS. 25A-C are schematic diagrams showing different examples of magnetic material configurations.
Figure 25B:
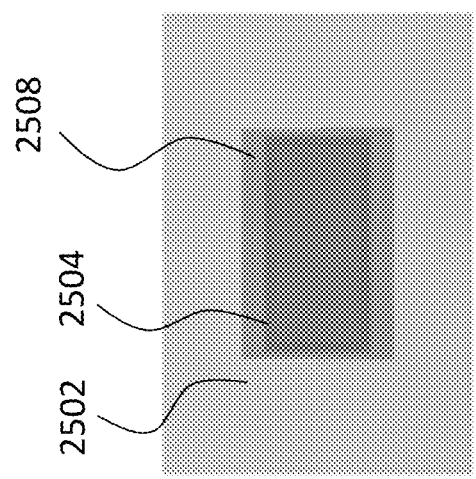
Figure 25C:
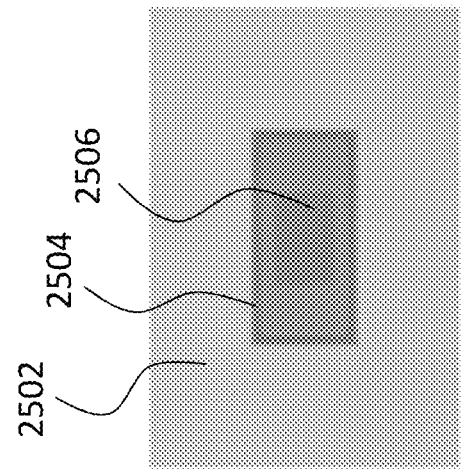

In a wireless energy transfer system, highly conducting and/or metallic materials such as aluminum and/or copper may be used for shielding a resonator to attain high efficiency and coupling and to preserve the high quality factor of the magnetic resonators. In exemplary embodiments, these materials may be placed under, near, or over a resonator coil to shape and minimize loss of the magnetic field near lossy materials, such as other metals. FIGS. 25A-C show three exemplary embodiments in which differently sized highly conducting materials 2506, 2508, 2510 are used to shield device coil 2504 from, for example, the chassis of a device such as a laptop 2502. The chassis of a device may be lossy to magnetic fields and may affect wireless power transfer efficiency. The material used to shield the device coil may be copper, aluminum, and the like. Increasing the size of the shield may decrease magnetic field losses.

In exemplary embodiments, one or more amplifiers may be used to drive one or more source resonators. The use of more than one amplifier may be advantageous for actively tuning resonator circuits and detecting resonator coils that are being used for power transfer. An additional advantage of using more than one amplifier may be to provide protection against the back driving of current. FIG. 26 shows an exemplary embodiment of a circuit where each resonator is driven by its own amplifier. As shown, there are N amplifiers 2602 to drive N resonators 2604. In another exemplary embodiment, more than one amplifier can drive each resonator. For example, N×M amplifiers may be used to drive N resonators, where M is a scaling integer such as 2, resulting in 2 amplifiers driving each resonator. In yet another exemplary embodiment, each amplifier may drive more than one resonator.

Figure 27:
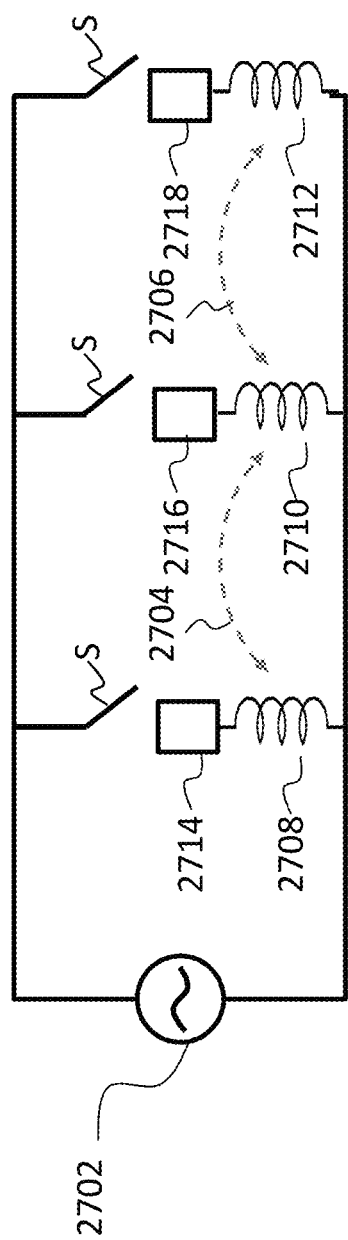
FIG. 27 is a schematic diagram showing an embodiment of a source with switchable elements.

FIG. 27 shows an exemplary embodiment of a single amplifier 2702 driving a circuit that includes one or more resonators, each including an inductor 2708, 2710, 2712 and an element 2714, 2716, 2718 such as a capacitor, inductor, resistor, and the like, that may be switched in or out. There may be mutual inductance 2704, 2706 between resonators. Similarly, one or more resonators may be switched in or out of the circuit using switches "S".

Figure 28:
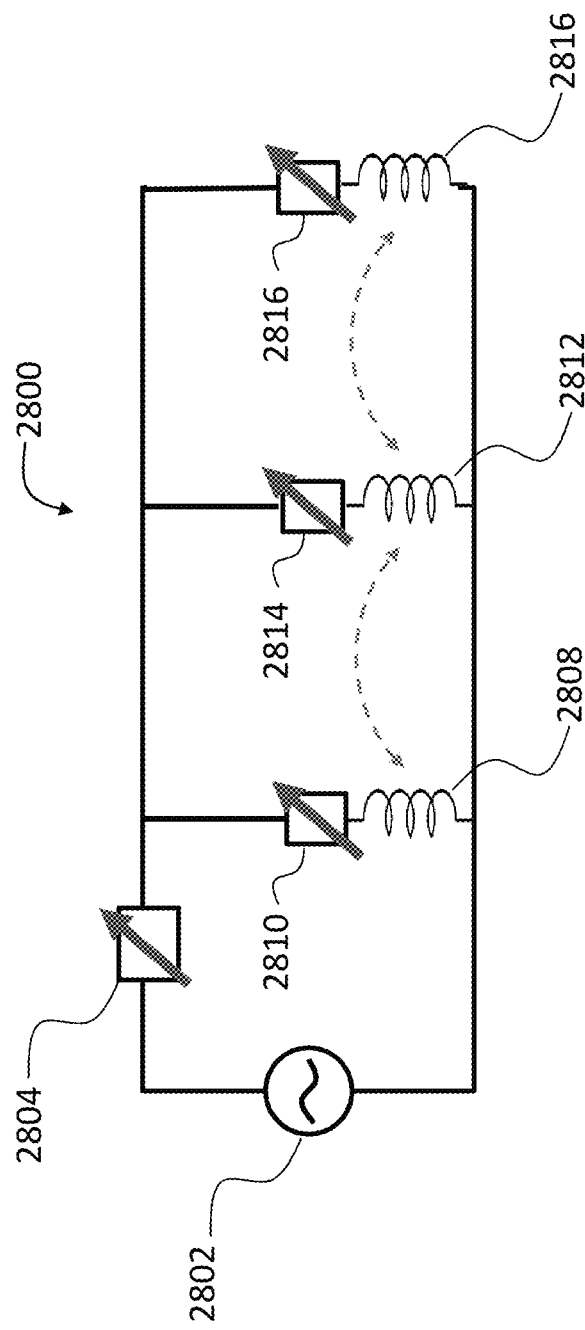
FIG. 28 is a schematic diagram showing an embodiment of a source with tunable elements.

FIG. 28 shows an exemplary embodiment of wireless power source 2800 that includes a single amplifier 2802 driving one or more resonators in parallel. In this exemplary embodiment, the resonators include circuit elements 2804, 2810, 2814, 2816 which are tunable and may be inductors, capacitors, resistors, and the like, as well as inductors 2808, 2812, 2816. The source 2800 can be "automatically" tuned by allowing certain resonators to preferentially draw current from amplifier 2802.

In some embodiments, "automatic tuning" can occur when a device is positioned on or near a source that has inductors 2808, 2812, 2816 in parallel. A device may be able to charge by "detuning" the inductor that it is closer to. For example, in FIG. 28, inductors 2808, 2812, 2816 may be tuned to a particular impedance and the device detunes the inductor it rests on or near.

In other embodiments, the device may be able to charge by "tuning" the inductor that it is closer to. For example, the inductors 2808, 2812, 2816 can each be driven by a power source (e.g., amplifier 2802). These inductors have impedances $Z_1$, $Z_2$, and $Z_3$, respectively, and can be considered "detuned" in the absence of a device placed in proximity to the inductors. However, when a device is positioned on or near one of the inductors, mutual coupling between the device and the inductor can modify the impedance of the source resonator represented by the inductor, which "tunes" the inductor. For example, referring to FIG. 28, suppose a device is placed on or near inductor 2812 with impedance $Z_2$. Coupling between the device and inductor 2812 can change the impedance $Z_2$ of inductor 2812, such that it "tunes" the impedance value $Z_2$ of that particular inductor. In other words, the presence of the device can decrease the impedance $Z_2$ at inductor 2812, such that current from amplifier 2802 is preferentially drawn to inductor 2812, allowing for wireless power transfer to preferentially occur between the resonator represented by inductor 2812 and the device. The impedances $Z_1$ and $Z_3$ of inductors 2808 and 2816 are higher than the impedance $Z_2$ of inductor 2812, so that the amount of power transfer between the resonators represented by inductors 2808 and 2816 and the device is significantly less, and in some embodiments, is even zero.

In general, impedance characteristics of source 2800 are controlled through appropriate selection of various parameters of resonator (e.g., inductor) coils, including the size, shape, thickness, number of turns, and density of turns. In some embodiments, inductors 2808, 2812, and 2816 are designed so that, in the absence of a device positioned in proximity to any of the inductors, the impedances $Z_1$, $Z_2$, and $Z_3$ vary by 10% or less (e.g., 5% or less, 1% or less).

In certain embodiments, inductors 2808, 2812, and 2816 are designed so that when a device is positioned on top of, or near to, a particular one of the inductors, the impedance of that inductor is significantly reduced, thereby causing wireless power transfer between the resonator represented by that inductor and the device, in strong preference to wireless power transfer from the resonators represented by the other inductors. Continuing the example from above, in some embodiments, after a device is positioned on or near inductor 2812, the impedance $Z_2$ is reduced so that the impedances $Z_1$ and $Z_3$ of inductors 2808 and 2816 are each larger than $Z_2$ by a factor of 2 or more (e.g., by a factor of 5 or more, by a factor of 10 or more).

The source shown in FIG. 28 can have certain advantages from a cost standpoint compared to the source shown in FIG. 27, as there are no potentially costly switches used for operation. This may also be preferable from a control standpoint because the source may rely on automatic tuning to achieve higher efficiency at the resonator being activated by a device. In exemplary embodiments, this tuning scheme may be referred to as a "fixed" scheme, as the multiple source resonators are wired to the circuit.

Figure 29:
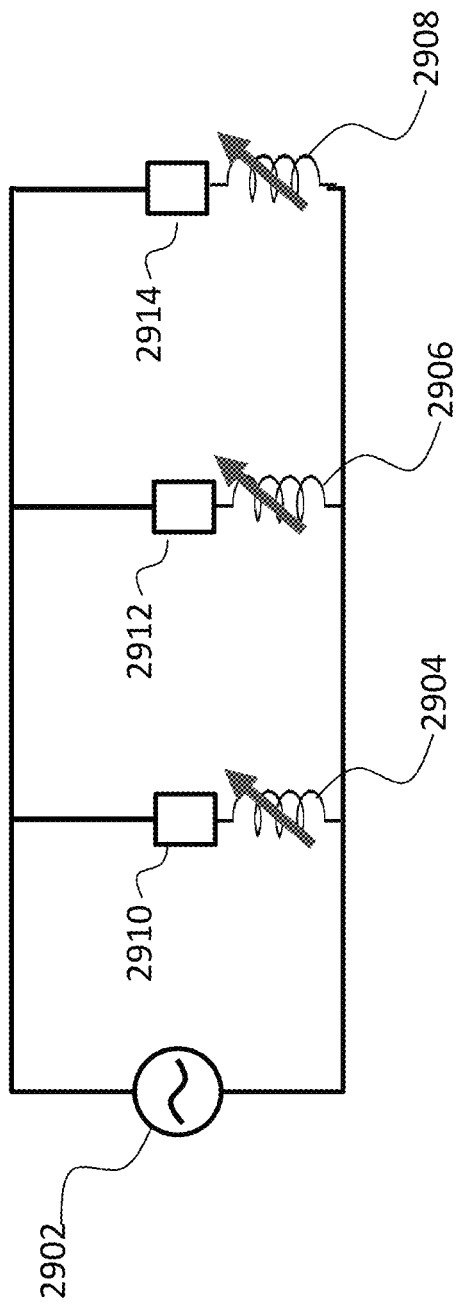
FIG. 29 is a schematic diagram showing another embodiment of a source with tunable elements.

FIG. 29 shows an exemplary embodiment of an amplifier 2902 driving a circuit that includes source resonators with tunable inductors 2904, 2906, 2908 and elements 2910, 2912, 2914 such as capacitors, inductors, resistors, and the like. The inductance of tunable inductors 2904, 2906, 2908 may be changed to tune or detune the one or more resonators, e.g., by a controller or control circuit (not shown in FIG. 29), as discussed previously. In exemplary embodiments, this tuning scheme may also be referred to as a "fixed" scheme, as the multiple source resonators are wired to the circuit.

Figure 30:
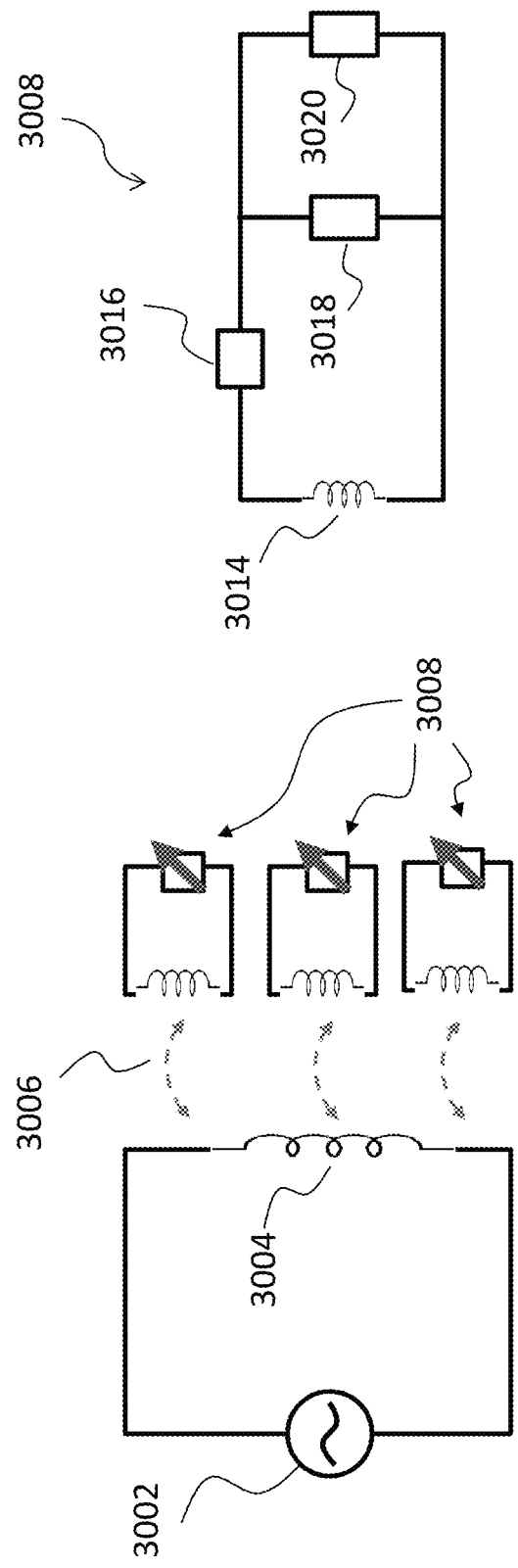
FIG. 30A is a schematic diagram showing an embodiment of a source with one or more resonators.
FIG. 30B is a schematic diagram showing an embodiment of one of the resonators shown in FIG. 30A.

FIGS. 30A-B show exemplary embodiments of wireless power sources where the source resonators and/or tuning components are not permanently fixed or wired to an amplifier. In FIG. 30A, an amplifier 3002 drives an inductor 3004 which is inductively coupled (as shown by arrows 3006) to multiple separate resonators 3008. An example of resonator 3008 is shown in FIG. 30B. The resonator includes an inductor 3014 and additional elements 3016, 3018, 3020 which may be connected in series and/or parallel with inductor 3014. These additional elements 3016, 3018, 3020 may be capacitors, inductors, resistors, switches, diodes, and the like. One advantage to this source is the positional freedom of resonators 3008.

Figure 31:
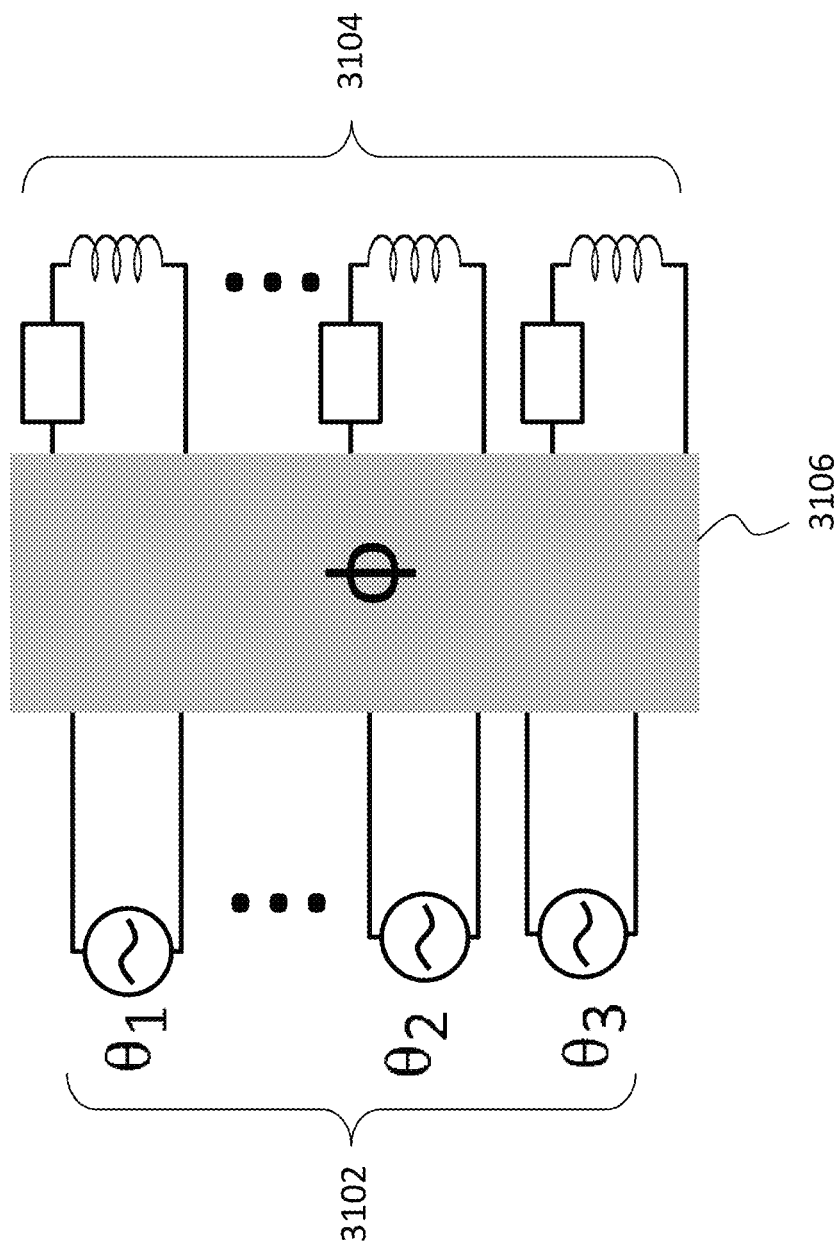
FIG. 31 is a schematic diagram showing an embodiment of an impedance matching network for a source.

FIG. 31 shows one or more amplifiers 3102 connected to a matching network 3106 which may be connected to one or more source resonators 3104. The matching network 3106 may be used to provide impedance matching for one, some, or all of the source resonators 3104. In exemplary embodiments, any of the amplifiers 3102 may be switched to drive one, some, or all of the resonators 3104. In certain embodiments, amplifiers 3102, matching network 3106, and source resonators 3104 can be controlled by a microcontroller (not shown) to determine which amplifiers drive which resonators. In exemplary embodiments corresponding to desktop wireless power transfer systems, the distance, distribution, number of electronic devices that can be powered or charged may be enhanced by the use of passive, intermediate magnetic resonator repeaters. In exemplary embodiments, active magnetic resonator repeaters may be used to enhance, facilitate, or control the distance, distribution, or number of electronic devices that can be powered or charged.

For illustrative purposes, the foregoing description focuses on the use of devices, components, and methods in desktop wireless power transfer applications, e.g., power transfer to electronic devices such as laptops, smartphones, and other mobile electronic devices that are commonly placed on desktops, tabletops, and other user work surfaces. More generally, however, it should be understood that devices that can receive power using the devices, components, and methods disclosed herein can include a wide range of electrical devices, and are not limited to those devices described for illustrative purposes herein. In general, any portable electronic device, such as a cell phone, keyboard, mouse, radio, camera, mobile handset, headset, watch, headphones, dongles, multifunction cards, food and drink accessories, and the like, and any workspace electronic devices such as printers, clocks, lamps, headphones, external drives, projectors, digital photo frames, additional displays, and the like, can receive power wirelessly using the devices, components, and methods disclosed herein.

In this disclosure, certain circuit components such as capacitors, inductors, resistors, diodes, and switches are referred to as circuit "components" or "elements." The disclosure also refers to series and parallel combinations of these components or elements as elements, networks, topologies, circuits, and the like. Further, combinations of capacitors, diodes, transistors, and/or switches are described. More generally, however, where a single component or a specific network of components is described herein, it should be understood that alternative embodiments may include networks for elements, alternative networks, and/or the like.

Other Embodiments

The embodiments described herein merely serve to illustrate, but not limit, the features of the disclosure. Other embodiments are also within the scope of the disclosure, which is determined by the claims.

What is claimed is:

1. A rectification apparatus, comprising:
an asynchronous rectifier, comprising:
an input terminal for receiving an oscillating energy signal from a resonator coil;
at least one rectifying element connected in series with the input terminal;
at least one shorting element connected in parallel with the input terminal to provide a bypass electrical path around the at least one rectifying element for the oscillating energy signal, and comprising at least one switching element configured to selectively activate the bypass path;
an impedance matching network connected to the input terminal and comprising a capacitive element and an inductive element, and configured to adjust an impedance as seen from the resonator coil through the impedance matching network;
a first terminal connected to the at least one rectifying element; and
a second terminal connected to the at least one switching element,
wherein during operation, the asynchronous rectifier is configured to:
connect to control circuitry at the first terminal to allow the control circuitry to measure an electrical parameter of the at least one rectifying element; and
receive at the second terminal a control signal from the control circuitry, and selectively activate the bypass path based on the control signal;
control circuitry comprising at least one of circuit elements and executable instructions, and configured by the at least one of the circuit elements and executable instructions to execute a feedback loop during operation of the rectification apparatus that:
detects the electrical parameter at the first terminal;
generates, based on the detected electrical parameter, a control signal for the at least one shorting element to selectively activate the bypass path; and transmits the control signal to the asynchronous rectifier at the second terminal,
wherein the electrical parameter is a voltage at an output of the at least one rectifying element, and wherein the feedback loop generates the control signal to activate the bypass path when the voltage at the output of the at least one rectifying element is equal to or greater than an upper bound threshold value for the voltage;
wherein the control circuitry comprises a comparator configured to generate the control signal to activate the bypass path when the upper bound threshold value is reached; and
wherein the comparator comprises a resistor connected between input and output terminals of the comparator, and wherein a resistance value of the resistor determines a hysteresis of the feedback loop.

2. The rectification apparatus of claim 1, wherein the electrical parameter comprises a voltage.

3. The rectification apparatus of claim 1, wherein the at least one shorting element comprises a diode.

4. The rectification apparatus of claim 1, wherein the at least one rectifying element comprises at least one diode.

5. The rectification apparatus of claim 1, further comprising a synchronizing element configured to synchronize activation of the bypass path with the oscillating energy signal so that the at least one shorting element is operated using zero voltage switching.

6. The rectification apparatus of claim 1, further comprising a LCL impedance matching network connected to the input terminal.

7. The rectification apparatus of claim 1, wherein the impedance matching network comprises two inductive elements.

8. The rectification apparatus of claim 7, wherein one of the two inductive elements is connected to a terminal of the at least one rectifying element.

9. The rectification apparatus of claim 1, wherein the inductive element is connected in series with the input terminal.

10. The rectification apparatus of claim 1, wherein the capacitive element is connected in parallel with the input terminal.

11. The rectification apparatus of claim 1, wherein the impedance matching network is configured to adjust the impedance as seen from the resonator coil through the impedance matching network so that when the bypass path is activated, the impedance is larger than a load impedance due to a load connected to the first terminal when the bypass path is not activated.

12. A rectification apparatus, comprising:
an asynchronous rectifier comprising:
an input terminal for receiving an oscillating energy signal;
at least one rectifying element connected in series with the input terminal;
at least one shorting element connected in parallel with the input terminal to provide an bypass electrical path around the at least one rectifying element for the oscillating energy signal, and comprising at least one switching element configured to selectively activate the bypass path;
a first terminal connected to the at least one rectifying element; and
a second terminal connected to the at least one switching element,
control circuitry connected to the first and second terminals and comprising at least one of circuit elements and executable instructions, and configured by the at least one of the circuit elements and executable instructions to execute a feedback loop during operation of the rectification apparatus that:
measures an electrical parameter of the at least one rectifying element at the first terminal;
generates, based on the detected electrical parameter, a control signal for the at least one shorting element to selectively activate the bypass path; and
transmits the control signal to the asynchronous rectifier at the second terminal,
wherein the electrical parameter is a voltage at an output of the at least one rectifying element, and wherein the feedback loop generates the control signal to activate the bypass path when the voltage at the output of the at least one rectifying element is equal to or greater than an upper bound threshold value for the voltage;
wherein the control circuitry comprises a comparator configured to generate the control signal to activate the bypass path when the upper bound threshold value is reached; and
wherein the comparator comprises a resistor connected between input and output terminals of the comparator, and a resistance value of the resistor determines a hysteresis of the feedback loop.

13. The rectification apparatus of claim 12, wherein the electrical parameter comprises a voltage.

14. The rectification apparatus of claim 12, wherein the at least one shorting element comprises a diode.

15. The rectification apparatus of claim 12, wherein the at least one rectifying element comprises at least one diode.

16. The rectification apparatus of claim 12, further comprising a synchronizing element configured to synchronize activation of the bypass path with the oscillating energy signal so that the at least one shorting element is operated using zero voltage switching.

17. The rectification apparatus of claim 12, further comprising a LCL impedance matching network connected to the input terminal.

* * * * *